US006959152B2

(12) United States Patent
Fujiwara et al.

(10) Patent No.: US 6,959,152 B2
(45) Date of Patent: Oct. 25, 2005

(54) POLARIZATION SCRAMBLER AND OPTICAL NETWORK USING THE SAME

(75) Inventors: Masamichi Fujiwara, Yokosuka (JP); Mitsuhiro Teshima, Yokosuka (JP); Noboru Takachio, Yokosuka (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 86 days.

(21) Appl. No.: 10/370,888

(22) Filed: Feb. 20, 2003

(65) Prior Publication Data

US 2003/0161638 A1 Aug. 28, 2003

(30) Foreign Application Priority Data

| Feb. 22, 2002 | (JP) | ........................................ | 2002-045956 |
| Apr. 5, 2002 | (JP) | ........................................ | 2002-104254 |
| Jul. 24, 2002 | (JP) | ........................................ | 2002-214849 |

(51) Int. Cl.[7] .......................... H04J 14/00; H04B 10/00; H04B 10/12
(52) U.S. Cl. .......................... 398/81; 398/147; 398/149; 398/152; 398/154
(58) Field of Search .............................. 398/29, 81, 93, 398/147–149, 152, 154, 155, 159, 163, 186, 337.5, 338

(56) References Cited

U.S. PATENT DOCUMENTS

| 6,081,355 A | * | 6/2000 | Sharma et al. ................. 398/90 |
| 6,104,515 A | * | 8/2000 | Cao ............................ 398/147 |
| 6,137,925 A | | 10/2000 | Stimple et al. |
| 6,396,575 B1 | | 5/2002 | Holland |
| 6,483,620 B1 | * | 11/2002 | Epworth et al. ............... 398/29 |
| 6,607,313 B1 | * | 8/2003 | Farries et al. ................ 398/102 |
| 6,646,774 B1 | * | 11/2003 | Willner et al. .............. 359/246 |
| 6,778,782 B1 | * | 8/2004 | Watley et al. .............. 398/147 |

FOREIGN PATENT DOCUMENTS

| JP | 01113735 A | 5/1989 |
| JP | 09008742 A | 1/1997 |
| JP | 09326758 A | 12/1997 |
| JP | 09326767 A | 12/1997 |
| JP | 11239099 A | 8/1999 |
| JP | 2000156672 A | 6/2000 |
| JP | 2000162547 A | 6/2000 |
| JP | 200196523 A | 7/2000 |

OTHER PUBLICATIONS

F. Heismann et al., *Electrooptic Polarization Scramblers for Optically Amplified Long–Haul Transmission Systems*, IEEE Photonics Technology Letters, vol. 6, No. 9, Sep. 1994, pp. 1156–1158.

Max Born et al., *Principles of Optics, Electromagnetic Therory of Propagation Interference and Diffraction of Light*, 4th Edition, London, Pergamon Press, 1970, Chapter 10.8, pp. 544–549.

(Continued)

*Primary Examiner*—M. R. Sedighian
*Assistant Examiner*—Dalzid Singh
(74) *Attorney, Agent, or Firm*—Workman Nydegger

(57) ABSTRACT

To generate light with the degree of polarization zeroed and the spread of an optical spectrum suppressed even with temporal overlapping between optical pulses each of which is polarized orthogonally to the succeeding pulse, a polarization scrambler includes an optical pulse generator that generates optical pulses with an intensity waveform repetition period T/2 and an electrical field repetition period T in which the same intensity waveform is repeated every repetition period T/2 and in which phase is inverted every repetition period T/2, and an orthogonal polarization delay unit which receives each of the optical pulses, separates the optical pulse into two optical pulses with orthogonal states of polarization, and relatively shifts the temporal position of one of the two optical pulses from that of the other optical pulse by $(2n-1)T/4$ (n is a natural number) to generate light in which each pulse is polarized orthogonally to a succeeding pulse.

42 Claims, 43 Drawing Sheets

OTHER PUBLICATIONS

Alan D. Kersey et al., *Analysis of Input–Polarization–Induced Phase Noise in Interferometric Fiber–Optic Sensors and its Reduction Using Polarization Scrambling*, Journal of Lightwave Technology, vol. 8, No. 6, Jun. 1990, pp. 838–845.

M.G. Taylor et al., *Improvement in Performance of Long Haul EDFA Link Using High Frequency Polarisation Modulation*, Electronic Letters, vol. 30, No. 10, May 12, 1994, pp. 805–806.

N.S. Bergano et al., *Bit–synchronous Polarisation and Phase Modulation Scheme for Improving the Performance of Optical Amplifier Transmission Systems*, Electronic Letters, vol. 32, No. 1, Jan. 4, 1996, pp. 52–54.

Masamichi Fujiwara et al., *Novel Polarization Scrambling Technique for Carrier–Distributed WDM Networks*, Sep. 12, 2002.

K.I. Suzuki et al., *Unrepeatered 40Gbit/s RZ Signal Transmission over 240km conventional Singlemode Fibre*, Electronic Letters, vol. 34, No. 8, Apr. 16, 1998, pp. 799–800.

Yutaka Miyamoto et al., *Optical Modulation Format for High–Capacity System with Ultra–High Speed Channels*, OECC/IOOC 2001 Conference Incorporating ACOFT, Jul. 2001, pp. 172–175.

\* cited by examiner 41-1 OPTICAL PHASE MODULATOR 41-2 OPTICAL PHASE MODULATOR

400ps

400ps

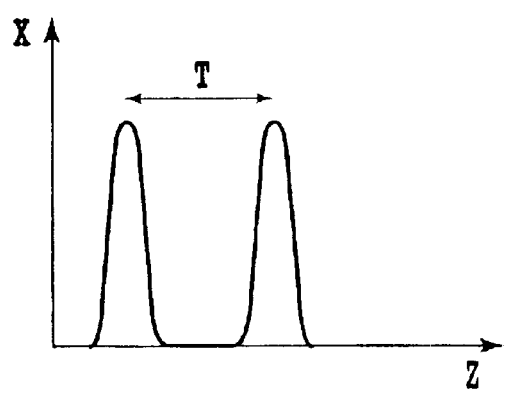 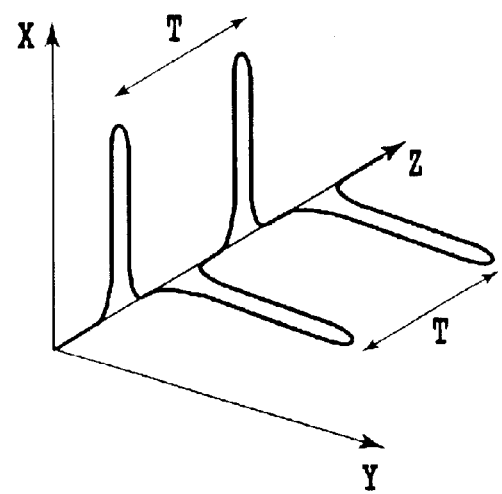
FIG.21B  FIG.21C

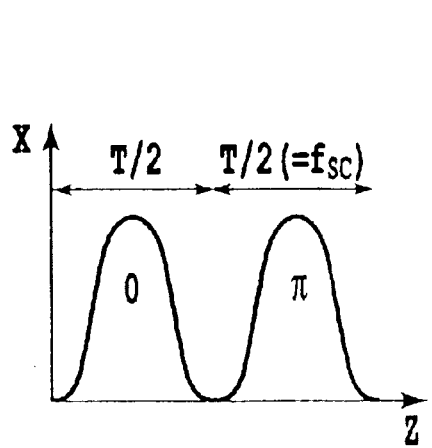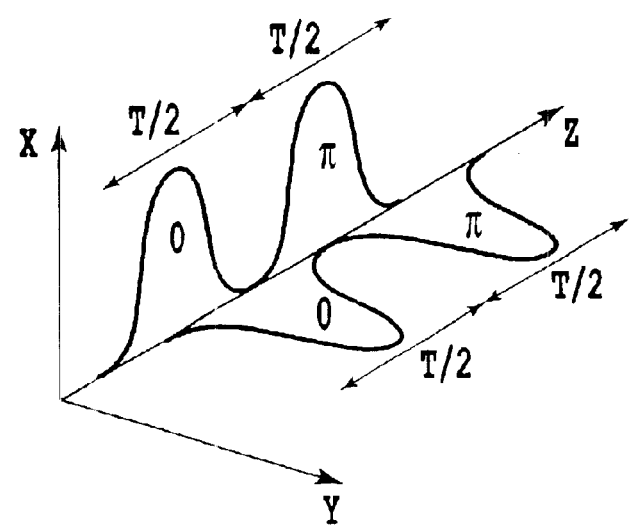
FIG.30B  FIG.30C

POLARIZATION SCRAMBLER AND OPTICAL NETWORK USING THE SAME

This application claims priority from Japanese Patent Application Nos. 2002-045956 filed Feb. 22, 2002, 2002-104254 filed Apr. 5, 2002 and 2002-214849 filed Jul. 24, 2002, which are incorporated hereinto by reference.

BACKGROUND OF THE INVENTION

1. Field of the Invention

The present invention relates to a polarization scrambler that makes the degree of polarization(DOP) of optical carrier zero. For long-haul optical amplifier transmission system, much attention is paid to polarization scrambling in which to improve degradation of transmission performance caused by the polarization dependent gain (PDG) in optical amplifiers, a transmitter scrambles the state of polarization (SOP) of optical carrier for depolarization.

Furthermore, the present invention relates to an optical network configured to input a continuous wave (CW) transmitted via an optical fiber from a light source arranged at one node, to an optical intensity modulator at the other node, modulates the CW using a signal supplied by another network, and transmits the modulated signal light to a next node, wherein a polarization scrambling frequency and a modulation signal bit rate are synchronized to each other by using, taking the polarization dependency of an optical intensity modulator into consideration, polarization scrambling in which the SOP of the CW output from the light source at the one node is scrambled at high speed to depolarize the CW.

Moreover, the present invention relates to an optical network configured to input a CW transmitted via an optical fiber from a light source arranged at one node, to an optical intensity modulator at the other node, modulates the CW using an externally supplied signal, and transmits the modulated signal light to a next node, wherein a polarization scrambling frequency and a modulation signal bit rate are not synchronized to each other by using, taking the polarization dependency of an optical intensity modulator into consideration, polarization scrambling in which the SOP of the CW output from the light source at the one node is scrambled at high speed to depolarize the CW.

2. Description of the Related Art

Polarization Scrambler

In an example of a configuration of a conventional long-haul optical amplifier transmission system, an optical transmitter section is composed of a light source that outputs an optical carrier, an optical modulator that modulates the optical carrier using a data signal to output an optical signal, a polarization scrambler that polarization-scrambles the optical signal, an oscillator that provides the polarization scrambler with a signal with a repetition period, and an optical amplifier that amplifies the polarization-scrambled optical signal. The optical signal output by the optical transmission section is transmitted to an optical receiver section via an optical fiber transmission line and the optical amplifier. The optical receiver section is composed of an optical amplifier, an optical band pass filter (BPF) that reduces the effects of the amplified spontaneous emission (ASE) noise provided by the optical amplifier, and a photodetector that converts an optical signal to an electrical signal to output a received signal.

In this case, the optical amplifier in the transmission line has a polarization dependent gain (PDG) of about 0.1 dB owing to polarization hole burning (PHB). In long-haul transmission system, the effects of PDG are accumulated by multiple optical amplifiers connected together, which fluctuates received optical power. In particular, a decrease in received optical power causes Signal to Noise Ratio (SNR) to be significantly degraded.

(Example of Configuration of First Polarization Scrambler)

The polarization scrambler is an optical phase modulator having a Y axis (phase modulation axis) capable of phase modulation and an X axis which is orthogonal to the Y axis and which is not substantially affected by phase modulation. The oscillator applies a repetition period signal to the optical phase modulator. Incident light traveling through the optical phase modulator in the direction of a Z axis is incident so that its polarization axis lies at an angle of 45° with the X and Y axes. A repetition period signal from the oscillator causes phase modulation only on the Y axis. This causes the SOP of the incident light to be rotated (scrambled) to average the effects of PDG of the multiple optical amplifiers connected together. Consequently, the fluctuation of received optical power can be suppressed.

To maximize the effects of polarization scrambling, all SOP must be allowed to occur uniformly on a time average basis, i.e. the degree of polarization (DOP) must be zeroed. Further, the value for the repetition period of a phase modulated signal has only to be smaller than a time constant (up to 0.1 ms) for PHB in the optical amplifier. In particular, it has been pointed out that polarization scrambling can be improved by using a repetition signal frequency that is about double that of a modulation signal bit rate clock or higher (Reference 1: IEEE Photon. Technol. Lett., vol.6, pp.1156 to 1158).

Description will be given of conditions for zeroing the DOP. In general, electrical fields (an electrical field Ex in the direction of the X axis and an electrical field Ey in the direction of the Y axis) having their amplitudes and phases modulated and traveling in the direction of the Z axis can be described as:

$$Ex(t) = a_1(t) \exp i[(\omega_c t - kz) - \phi_1(t)] \qquad (1)$$

$$Ey(t) = a_2(t) \exp i[\omega_c t - kz] + \phi_2(t)] \qquad (2)$$

where $\omega_c$, k, and t denote the angular momentum frequency, wave number, and time of the electrical fields, respectively. $a_1(t)$, $a_2(t)$, $\phi_1(t)$, and $\phi_2(t)$ denote a modulated amplitude in the direction of the X axis, a modulated amplitude in the direction of the Y axis, a modulated phase in the direction of the X axis, and a modulated phase in the direction of the Y axis, respectively.

The DOP in output from the polarization scrambler can be varied depending on a phase difference applied to the X and Y axes:

$$\delta = \phi_2 - \phi_1 \qquad (3).$$

The DOP depends on the form of a phase modulation function. However, the condition for achieving a zero degree of polarization if a sine wave is used is:

$$\delta = 0.7655\pi \sin 2\pi f_{sc} t \qquad (4)$$

(Reference 5: IEEE J.Lightwave Technol., vol.8, pp.838 to 845, 1990). In this equation, $f_{sc}$ denotes a polarization scrambling (rotating) frequency. For the polarization scrambler shown in the first configuration example, described above, this condition corresponds to:

$$\phi_1 = 0 \qquad (5)$$

$$\phi_2 = 0.7655\pi \sin 2\pi f_{sc} t \qquad (6)$$

(Example of Configuration of Second Polarization Scrambler)

The above described polarization scrambler using an optical modulator has a simple configuration. However, since phase modulation is carried out on only one of the polarization axes, it markedly spreads an optical spectrum. Thus, if a polarization scrambler (optical phase modulator) is used for a wavelength division multiplexing (WDM) transmission system, cross talk may occur between adjacent wavelength channels. This hinders an increase in the spectrum density of WDM signals.

To solve this problem, a polarization scrambling method has been proposed which disperses phase modulation to two axes (Reference 2: Japanese Patent Application Laid-open No. 9-326767 (1997)). With this polarization scrambling method, the phase modulation carried out only on the Y axis (phase modulation axis) is also carried out on the X axis (non-phase-modulation axis), which is orthogonal to the Y axis. Accordingly, repetition period signals provided to the X and Y axes have opposite phases. With this method, the amount of phase modulation applied to the Y axis is dispersed to the two orthogonal axes. Thus, it is possible to accomplish polarization scrambling with the spread of an optical spectrum suppressed.

Specifically, two of the above described optical phase modulators are provided, and a polarization scrambler is arranged between these two optical phase modulators to rotate polarization through 90°. Further, a phase adjuster is used so that repetition period signals applied to the optical phase modulators by an oscillator have opposite phases.

With this configuration, linearly polarized light is incident on a first one of the two optical phase modulators at an angle of 45° with the X and Y axes. Further, light is incident on a second optical phase modulator after having its SOP rotated through 90° so that X axis components that have not been subjected to phase modulation at the first optical phase modulator align with the Y axis. Accordingly, when phase modulation is evenly applied to the phase modulation axis of both modulators with opposite phases, Conditional Expression (4) for a zero degree of polarization changes to:

$$\phi_1 = (0.7655\pi/2)\sin 2\pi f_{sc} t \quad (7)$$

$$\phi_2 = -(0.7655\pi/2)\sin 2\pi f_{sc} t \quad (8)$$

(Example of Configuration of Third Polarization Scrambler)

On the other hand, the polarization scrambling method includes the use of optical short pulses (Reference 3: Japanese Patent Application Laid-open No. 9-326758 (1997)) as well as the above described use of phase modulation. This method comprises associating one bit of a data signal with a plurality of optical short pulses and making the SOP of each optical short pulses within one bit to have different SOP to depolarize the data signal (zero degree of polarization). Depolarization by this method will be described below.

Electrical fields (an electrical field Ex in the direction of the X axis and an optical electrical field Ey in the direction of the Y axis) having their amplitudes and phases modulated and traveling in the direction of the Z axis are expressed by Equations (1) and (2).

On the assumption that components in the direction of the Y axis each have its phase delayed by $\epsilon$ compared to a corresponding component in the direction of the X axis, the intensity $I(\theta; \epsilon)$ of light is considered which has passed through a polarizer having a transmission axis in a direction extending at an angle $\theta$ with the positive X axis. In this case, an electrical field vector in the $\theta$ direction is expressed by:

$$E(t;\theta;\epsilon) = E_x \cos\theta + E_y \exp(i\epsilon)\sin\theta \quad (9)$$

The time average of the intensity is given by:

$$I(\theta;\epsilon) = \langle E(t;\theta;\epsilon)E^*(t;\theta;\epsilon)\rangle = J_{xx}\cos^2\theta + J_{yy}\sin^2\theta + J_{xy}\exp(-i\epsilon)\cos\theta\sin\theta + J_{yx}\exp(i\epsilon)\sin\theta\cos\theta \quad (10)$$

In this equation, $J_{xx}$, $J_{yy}$, $J_{xy}$, and $J_{yx}$ correspond to the elements of the coherency matrix below.

$$J = \begin{pmatrix} \langle ExEx^* \rangle & \langle ExEy^* \rangle \\ \langle EyEx^* \rangle & \langle EyEy^* \rangle \end{pmatrix} \quad (11)$$

$$= \begin{pmatrix} \langle a_1^2 \rangle & \langle a_1 a_2 \exp[i(\phi_1-\phi_2)] \rangle \\ \langle a_1 a_2 \exp[-i(\phi_1-\phi_2)] \rangle & \langle a_2^2 \rangle \end{pmatrix}$$

The diagonal elements of J are actual numbers, and the sum of the diagonal elements indicates the total intensity of light.

$$TrJ = J_{xx} + J_{yy} = \langle E_x E_x^* \rangle + \langle E_y E_y^* \rangle \quad (12)$$

The non-diagonal elements are generally complex numbers and have the following relationship:

$$J_{xy} = J_{yx}^* \quad (13)$$

$$|J_{xy}| = |J_{yx}| \leq (J_{xx})^{1/2}(J_{yy})^{1/2} \quad (14)$$

In this case, light with a zero degree of polarization refers to such light that the value for Equation (10) does not depend on $\theta$ or $\epsilon$. A necessary and sufficient condition for this light is:

$$J_{xy} = J_{yx} = 0 \quad (15)$$

$$J_{xx} = J_{yy} \quad (16)$$

(Reference 4: M. Born and E. Wolf, Principle of Optics, 4th ed, London: Pergamon Press, 1970, chapter 10.8, pp.809–816 formula (27)).

The orthogonal polarization components of scrambled light now have equal power, and Conditional Expression (16) is thus met. Accordingly, the DOP is zeroed provided that Conditional Expression (15) is established. That is, provided that there is no temporal overlapping between optical pulses each of which is polarized orthogonally to the succeeding pulse, $a_1(t) \times a_2(t)$ is zero at all points of time regardless of the phase of the optical pulses. It is thus possible to zero the DOP of scrambled light. Reference 3, utilizing optical short pulses, is based on this principle.

However, if there is no temporal overlapping between optical pulses each of which is polarized orthogonally to the succeeding pulse, scrambled light has reduced power. On the other hand, to increase the power of the scrambled light, it is necessary to zero the DOP of the scrambled light in order to cause temporal overlapping between optical pulses each of which is polarized orthogonally to the succeeding pulse. Reference 3 and others have not clarified such a method.

Optical Network

In a basic configuration of a conventional optical network, two nodes are connected together via two optical fibers. In this configuration, a CW output by a light source arranged at a first node is transmitted to a second node via a first optical fiber. An optical intensity modulator at the second node uses a data signal to modulate the CW and transmits the modulated signal light back to a receiver at the first node via a second optical fiber.

Such optical networks include an access network in which a user terminal having no light sources is assumed as a second node and in which an optical carrier supplied by a station (first node) is modulated using a data signal supplied by a user'network (for example, LAN (Local Area Network) and is then transmitted to the station (first node) as an upstream signal. In such an optical network, while an optical carrier passes through an optical fiber in a transmission line, its SOP varies temporarily arbitrarily. An optical intensity modulator used by the user needs to have insignificant polarization dependency. Optical intensity modulators meeting this condition include an electro-absorption (EA) modulator and a semiconductor optical amplifier (SOA) modulator. The use of such an optical intensity modulator enables the construction of the above described optical network.

However, the EA modulator may suffer a heavy transmission loss, so that if it is used to construct the above described optical network, the SNR of a received signal is significantly degraded. Furthermore, in recent years, efforts have been made to develop an EA-DFB laser comprising a DFB laser (Distributed-Feedback Laserdiode) and an EA modulator integrated together. Accordingly, it is very rare that the unitary EA modulator is produced as a device. As a result, it is impossible to expect manufacturing costs to be successfully reduced on the basis of mass production. On the other hand, the SOA modulator does not suffer transmission loss owing to its amplification function. However, it is quicker in response than an erbium doped fiber amplifier (EDFA). As a result, it markedly degrades the waveform of a signal of a Gbit/s order.

On the other hand, an $LiNbO_3$ optical intensity modulator has polarization dependency. However, the above described optical network does not allow the use of a polarization-dependent optical intensity modulator for the previously described reason. In this regard, the polarization-dependent optical intensity modulator can be used in the network if a polarization controller is provided in front of the optical intensity modulator. However, when WDM signals are transmitted, different polarization controllers are required for the respective wavelengths. This is disadvantageous in terms of costs. However, advantageously, the $LiNbO_3$ optical intensity modulator suffers a lighter transmission loss and lower costs than the EA modulator and can carry our modulation at higher speed than the SOA modulator.

Thus, for an optical network such as the one described above in which a light source and an optical intensity modulator are separated from each other via an optical fiber, a configuration has been proposed which enables the use of a polarization-dependent optical intensity modulator such as an $LiNbO_3$ optical intensity modulator (Reference 8: Japanese Patent Application Laid-open No. 2000-196523). This improved configuration solves the problem with the polarization dependency of a second node polarization-dependent optical intensity modulator by arranging, behind the light source, a polarization scrambler and an oscillator that drives the polarization scrambler and regularly rotating (scrambling) the SOP of an optical carrier to zero the DOP of the optical carrier. This configuration requires only one polarization scrambler to transmit WDM signals. It is thus possible to reduce costs compared to the previously described configuration comprising as many polarization controllers as the wavelengths.

The previously described examples of configurations of the first to third polarization scramblers are available as polarization scramblers. However, if an electric signal that drives the polarization scrambler and a data signal bit rate clock are used asynchronously, jitters may occur in a received signal eye diagram (this will be described later). To avoid these jitters, it is necessary to match polarization scrambling frequency with a natural-number multiple of the data signal bit rate clock and synchronize their phases to each other.

However, with the above described improved configuration, it is difficult to match polarization scrambling frequency with a natural-number multiple of the data signal bit rate clock and further synchronize their phases to each other. For example, the first node at which the polarization scrambler is arranged is separated via the optical fiber from the second node at which the polarization-dependent optical intensity modulator is arranged. It is thus possible but not practical to synchronize their phases to each other using a coaxial cable or the like. Accordingly, it is necessary to provide a simple method that achieves phase synchronization regardless of this distance.

Further, to use a polarization scrambler to avoid the polarization dependency of an element inserted into the transmission line as described above, a polarization scrambling (rotation) frequency is used which is double that of the data signal bit rate clock (or higher) (Reference 6: Electron. Lett., vol.30, pp.806 to 807, 1994). This is probably due to the sampling theorem that a "signal must be sampled at least twice during each period or cycle of its highest frequency component".

However, if polarization is rotated at a polarization scrambling frequency which is double that of the data signal bit rate clock (or higher), then modulation causes an optical spectrum to be spread as the polarization scrambling frequency increases. Thus, disadvantageously, the waveform of a signal is dispersed in the transmission line and thus degraded markedly. Further, when WDM signals are transmitted, the spread of the optical spectrum may hinder an increase in the spectrum density of WDM signals. The polarization scrambling frequency is desirably set to be lower than the double of that of the data signal bit rate clock.

To realize this, a method has been proposed in which for a polarization scrambler of the first or second configuration, the data signal bit rate clock is synchronized to a sine wave electric signal driving the polarization scrambler, to set the polarization scrambling frequency equal to that of the data signal bit rate clock, thus narrowing the spectrum of output light from the polarization scrambler (Reference 7: Electron. Lett., vol.32, pp.52 to 54, 1996). However, with this method, it is essential to synchronize the phase of the data signal bit rate clock to the phase of the sine wave electric signal driving the polarization scrambler. Consequently, a simple phase synchronization method is required as in the case in which jitters must be avoided.

Thus, the two points described below can be given as guidelines for implementing an optical network using the above described improved configuration.

① To obtain a received signal that is not degraded by jitters, certain measures must be taken to synchronize the phase of the data signal bit rate clock to the phase of the electric signal driving the polarization scrambler. This phase synchronization method also contributes to narrowing the spectrum of output light from the polarization scrambler of the first or second configuration.

② The received signal is allowed to be degraded by jitters. The electric signal driving the polarization scrambler and the data signal bit rate clock are set to be asynchronous. The polarization scramble frequency is set to be lower than the double of that of the data bit rate clock to narrow the spectrum of output light from the polarization scrambler. This method requires no phase synchronization means and enables the network configuration to be simplified compared to ①.

SUMMARY OF THE INVENTION

It is an object of the present invention to provide a polarization scrambler which zeroes the degree of polarization even if there is temporal overlapping between optical pulses each of which is polarized orthogonally to the succeeding pulse and which enables the generation of light with the spread of an optical spectrum suppressed.

It is a further object of the present invention to provide an optical network that enables a data signal bit rate clock input to a polarization-dependent optical intensity modulator to be synchronized easily to the phase of an electric signal driving a polarization scrambler.

It is another object of the present invention to provide an optical network which makes the electric signal driving the polarization scrambler and the data signal bit rate clock asynchronous and which suppresses the spread of an optical spectrum caused by the polarization scrambler.

A polarization scrambler according to the present invention comprises an optical pulse generator that generates optical pulses with an intensity waveform period T/2 and an electrical field period T in which the same intensity waveform is repeated every repetition period T/2 and in which phase is inverted every repetition period T/2, and an orthogonal polarization delay unit which receives each of the optical pulses, separates the optical pulse into two optical pulses with orthogonal states of polarization, and relatively shifts the temporal position of one of the two optical pulses from that of the other optical pulse by (2n−1)T/4 (n is a natural number) to generate light in which each pulse is polarized orthogonally to a succeeding pulse.

The optical pulse generator comprises a light source that generates a CW and an optical intensity modulator which has an input signal $\phi(t)$ (t denotes time) and such a transmission characteristic that for a particular input signal $\phi_0$, output optical electrical fields are expressed by:

$$E(\phi(t)-\phi_0)=-E(-\phi(t)-\phi_0) \ (\neq 0)$$

the optical intensity modulator being driven by the input signal $\phi(t)$ having such a period T that:

$$\phi(t)-\phi_0=\phi(t-T)-\phi_0=-\phi(t-T/2)-\phi_0 \ (\neq 0).$$

The optical pulse generator modulates uses the input signal $\phi(t)$ of the period T to modulate the CW to generate optical pulses with a period T/2 (the period of T if the electrical fields are included) which provide electrical fields expressed by:

$$E(t)=E(\phi(t)).$$

Furthermore, the present invention provides an optical network in which a CW transmitted via an optical fiber from a light source arranged at one node is input to an optical intensity modulator at the other node, the optical intensity modulator then modulating the CW using an externally input data signal, the resulting modulated signal light being transmitted to a next node, the one node comprising a polarization scrambler converting the CW output by the light source into scrambled light with a zero degree of polarization and then outputting the scrambled light, wherein the other node comprises a polarization-dependent optical intensity modulator used as an optical intensity modulator, clock electric signal extracting means by splitting part of power of the input scrambled light, converting this part into an electric signal, and extracting from the electric signal a clock electric signal with a frequency n times (n is an natural number) as high as that of an electric signal driving an optical pulse generator in the polarization scrambler, and phase synchronization means by synchronizing a phase of a data signal bit rate clock to a phase of the extracted clock electric signal and modulating the synchronized data signal to the polarization-dependent optical intensity modulator.

Thus, the phase of the data signal bit rate clock input to the polarization-dependent optical intensity modulator can be synchronized to the phase of the electric signal driving the polarization scrambler. This suppresses jitters in modulated signal light output by the polarization-dependent optical intensity modulator.

Further, the present invention provides an optical network in which a CW transmitted via an optical fiber from a light source arranged at one node is input to an optical intensity modulator at the other node and is then modulated using an externally input data signal, the resulting modulated signal light being transmitted to a next node, the one node comprising a polarization scrambler to convert the CW output by the light source into scrambled light with a zero degree of polarization, wherein a polarization-dependent optical intensity modulator is used as an optical intensity modulator at the other node and wherein when a bit rate of a data signal from the other node is defined as B (bps), an electric signal driving the polarization scrambler at the one node and the data signal are asynchronous, and a polarization scramble frequency $f_{sc}$ (Hz) of the scrambled light is such that $B \leq f_{sc} < 2B$. Here, $f_{sc} \geq B$ is a condition required to zero the DOP within one bit of a data signal.

As described above, the polarization scrambler of the present invention can zero the DOP in scrambled light, while causing temporal overlapping between optical pulses each of which is polarized orthogonally to the succeeding pulse. It can also generate polarized scrambled light with the spread of an optical spectrum suppressed.

Furthermore, when a polarization-dependent optical intensity modulator is used as an optical intensity modulator that modulates scrambled light transmitted via an optical fiber, the optical network of the present invention can extract a clock electric signal corresponding to a value n times (n is a natural number) as large as the value of frequency of the electric signal driving the polarization scrambler. Consequently, the phase of the data signal bit rate clock input to the polarization-dependent optical intensity modulator can be synchronized to the phase of the sinusoidal signal driving the polarization scrambler. This suppresses jitters in modulated signal light output by the polarization-dependent optical intensity modulator.

Moreover, according to the present invention, a polarization-dependent optical intensity modulator is used as an optical intensity modulator that modulates scrambled light transmitted via an optical fiber, and the electric signal driving the polarization scrambler and the data signal bit rate clock input to the polarization-dependent optical intensity modulator are asynchronous. However, by setting the polarization scramble frequency $f_{sc}$ of the scrambled light so that $B \leq f_{sc} < 2B$, an optical network can be constructed which suppresses the spread of an optical spectrum caused by polarization scrambling.

The above and other objects, effects, features and advantages of the present invention will become more apparent from the following description of embodiments thereof taken in conjunction with the accompanying drawings.

BRIEF DESCRIPTION OF THE DRAWINGS

FIGS. 21A to 21C are diagrams showing a first example of configuration of a polarization scrambler 14 according to the fifth embodiment;

FIGS. 30A to 30C are diagrams showing an example of basic configuration of the polarization scrambler 14;

DETAILED DESCRIPTION OF PREFERRED EMBODIMENTS

Conventional Polarization Scrambler

Figure 1A:
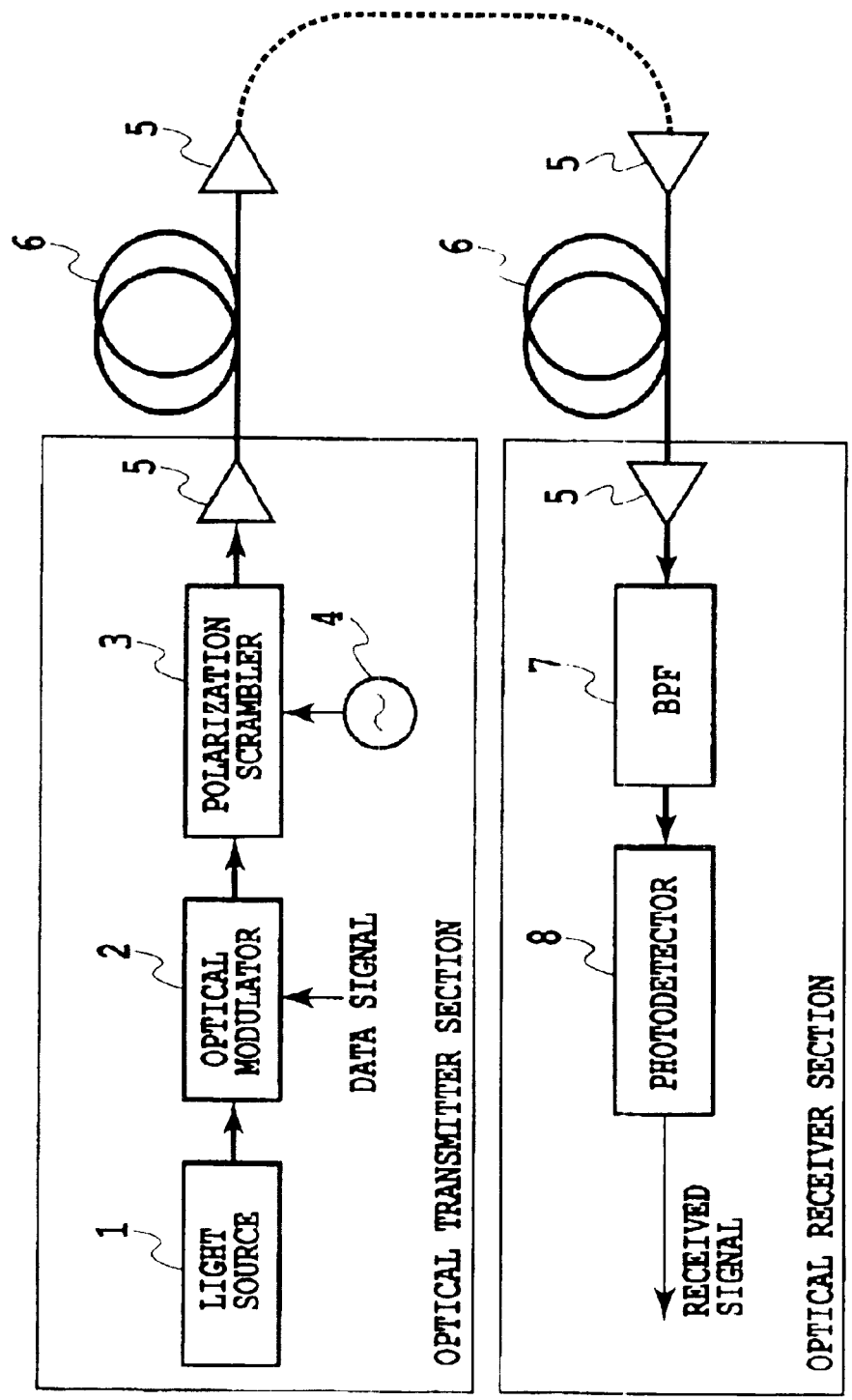
FIGS. 1A and 1B are diagrams showing an example of configuration of a long-haul optical amplifier transmission system using a conventional polarization scrambler.
Figure 1B:
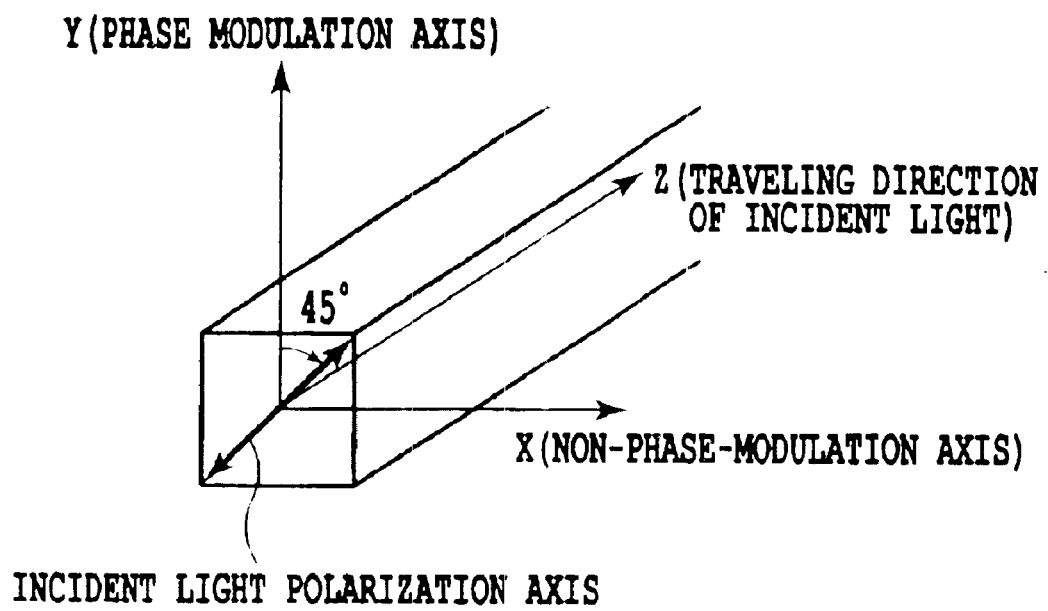

FIGS. 1A and 1B are diagrams showing an example of configuration of a long-haul optical amplifier transmission system using a polarization scrambler. In these figures, an optical transmitter section is composed of a light source 1 that outputs an optical carrier, an optical modulator 2 that modulates the optical carrier using a data signal to output an optical signal, a polarization scrambler 3 that subjects the optical signal to polarization scrambling, an oscillator 4 that provides the polarization scrambler 3 with a repetition period signal, and an optical amplifier 5 that amplifies polarized scrambled light. An optical signal output by the optical transmitter section is transmitted to an optical receiver section via an optical fiber transmission line 6 and the optical amplifier 5. The optical receiver section is composed of the optical amplifier 5, an optical band pass filter (BPF) 7 that suppresses the effects of ASE noise provided by the optical amplifier 5, and a photodetector 8 that converts an optical signal to an electrical signal and outputs a received signal.

As shown in FIG. 1B, the polarization scrambler 3 is an optical phase modulator having a Y axis (phase modulation axis) to which phase modulation is applied and an X axis (non-phase-modulation axis) which is orthogonal to the Y axis and which is not substantially affected by phase modulation. The oscillator 4 applies a repetition period signal to the polarization scrambler. Incident light traveling through the optical phase modulator in the direction of the Z axis is incident so that a polarization axis is at an angle of 45° with the X and Y axes. The repetition period signal from the oscillator 4 subjects only the Y axis to phase modulation. This causes the SOP of the incident light to be rotated (scrambled) to average the effects of PDG of the multiple optical amplifiers connected together. Consequently, the fluctuation of power of received light can be suppressed.

To maximize the effects of polarization scrambling, all SOP must be allowed to occur uniformly on a time average basis, i.e. the DOP must be zeroed. Further, the value for the repetition period of a phase modulated signal has only to be higher than a time constant (up to 0.1 ms) for PHB in the optical amplifier. In particular, it has been pointed out that polarization scrambling can be improved by using a signal frequency about double that of a modulation signal bit rate clock or higher (Reference 1: IEEE Photon. Technol. Lett., vol.6, pp.1156 to 1158).

Description will be given of conditions for zeroing the DOP. In general, electrical fields (an electrical field Ex in the direction of the X axis and an electrical field Ey in the direction of the Y axis) having their amplitudes and phases modulated and traveling in the direction of the Z axis can be described as:

$$Ex(t)=a_1(t)\exp i[(\omega_c t-kz)-\phi_1(t)] \quad (1)$$

$$Ey(t)=a_2(t)\exp i[\omega_c t-kz]-\phi_2(t)] \quad (2)$$

where $\omega_c$, k, and t denote the angular momentum frequency, wave number, and time of the electrical fields, respectively. $a_1(t)$, $a_2(t)$, $\phi_1(t)$, and $\phi_2(t)$ denote a modulated amplitude in the direction of the X axis, a modulated amplitude in the direction of the Y axis, a modulated phase in the direction of the X axis, and a modulated phase in the direction of the Y axis, respectively.

The DOP in an output from the polarization scrambler can be varied depending on a phase difference applied to the X and Y axes:

$$\delta=\phi_2-\phi_1 \quad (3).$$

The DOP depends on the form of a phase modulation function. However, the condition for achieving a zero degree of polarization if a sine wave is used is:

$$\delta=0.7655\pi \sin 2\pi f_{sc} t \quad (4)$$

(Reference 5: IEEE J.Lightwave Technol., vol.8, pp.838 to 845, 1990). In this equation, $f_{sc}$ denotes a polarization scrambling frequency. For the polarization scrambler shown in the first configuration example, described above, this condition corresponds to:

$$\phi_1=0 \quad (5)$$

$$\phi_2=0.7655\pi \sin 2\pi f_{sc} t \quad (6)$$

(Example of Configuration of Second Polarization Scrambler)

Figure 2:
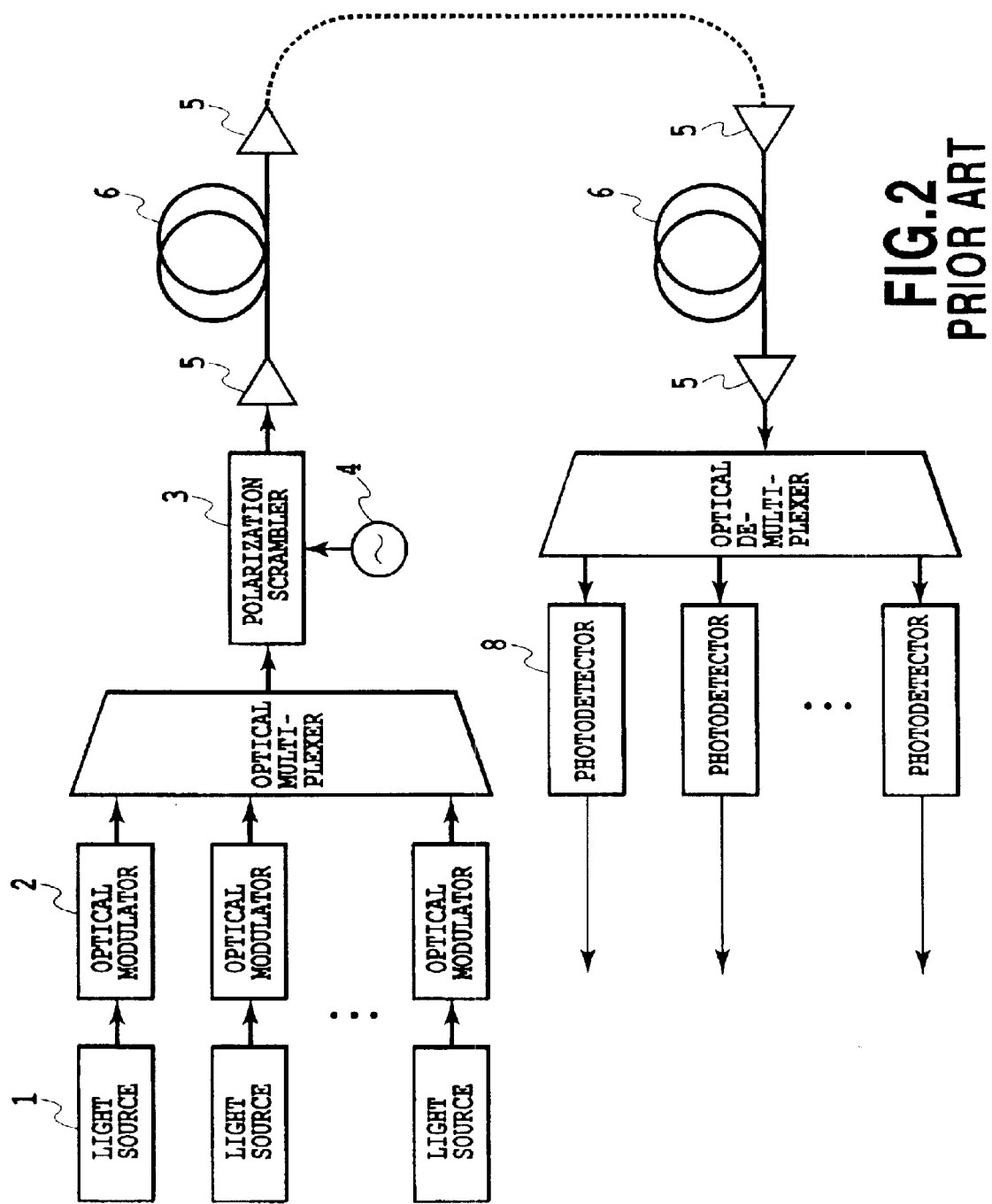
FIG. 2 is a diagram showing an example of configuration of a wavelength division multiplexing (WDM) transmission system using the conventional polarization scrambler.

The above described polarization scrambler using an optical modulator shown in FIG. 1B has a simple configuration. However, since phase modulation is carried out on only one of the polarization axes, it markedly spreads an optical spectrum. Thus, if a polarization scrambler (optical phase modulator) 3 is used for a wavelength division multiplexing (WDM) transmission system shown in FIG. 2, cross talk may occur between adjacent wavelength channels. This hinders an increase in the spectrum density of WDM signals.

To solve this problem, a polarization scrambling method has been proposed which disperses phase modulation to two axes (Reference 2: Japanese Patent Application Laid-open No. 9-326767 (1997)). With this polarization scrambling method, the phase modulation carried out only on the Y axis (phase modulation axis) in FIG. 1B is also carried out on the X axis (non-phase-modulation axis), which is orthogonal to the Y axis. Accordingly, repetition period signals provided to the X and Y axes have opposite phases. With this method, a phase modulation index applied to the Y axis is dispersed to the two orthogonal axes. Thus, it is possible to accomplish polarization scrambling with the spread of an optical spectrum suppressed compared to the polarization scrambler in FIG. 1B.

Figure 3A:
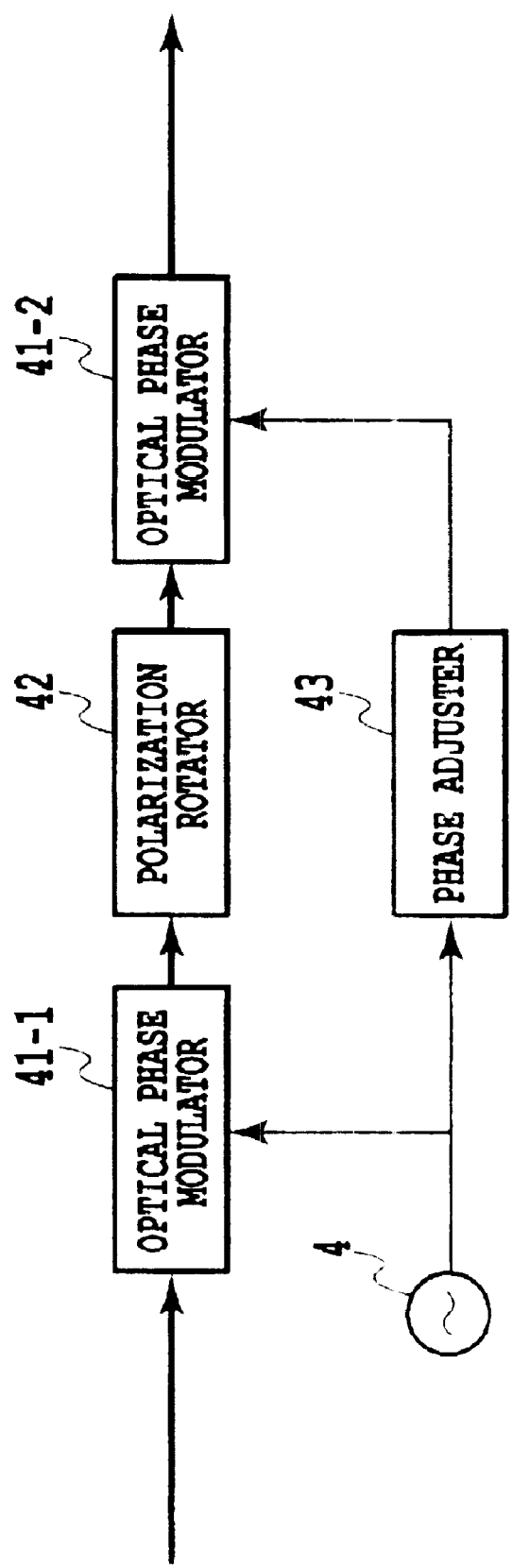
FIGS. 3A to 3C are diagrams showing an example of configuration of the conventional polarization scrambler.
Figure 3B:
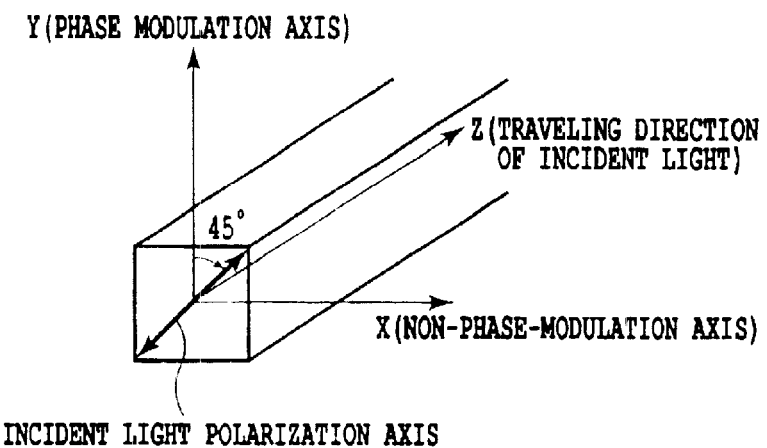
Figure 3C:
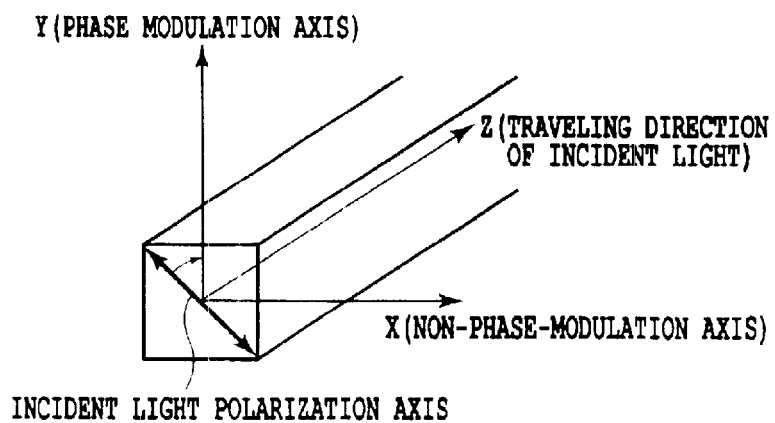

Specifically, two of the optical phase modulator shown in FIG. 1B are provided, and a polarization scrambler 42 is arranged between these two optical phase modulators 41-1 and 41-2 to rotate polarization through 90° as shown in FIGS. 3A, 3B, and 3C. Further, a phase adjuster 43 is used so that repetition period signals applied to the optical phase modulators by an oscillator 4 have opposite phases.

With this configuration, linearly polarized light is incident on a first one of the two optical phase modulators at an angle of 45° with the X and Y axes. Further, light is incident on a second optical phase modulator after having its SOP rotated through 90° so that X axis components that have not been subjected to phase modulation at the first optical phase modulator align with the Y axis. Accordingly, when phase modulation is evenly applied to the phase modulation axis of both modulators with opposite phases, Conditional Expression (4) for a zero degree of polarization changes to:

$$\phi_1=(0.7655\pi/2)\sin 2\pi f_{sc} t \quad (7)$$

$$\phi_2=-(0.7655\pi/2)\sin 2f_{sc} t \quad (8)$$

(Example of Configuration of Third Polarization Scrambler)

On the other hand, the polarization scrambling method includes the use of optical short pulses (Reference 3: Japanese Patent Application Laid-open No. 9-326758 (1997)) as well as the above described use of phase modulation. This method comprises associating one bit of a data signal with a plurality of optical short pulses and making the SOP of each optical short pulse within one bit to have different SOP to depolarize the signal (zero degree of polarization). Depolarization by this method will be described below.

Electrical fields (an electrical field Ex in the direction of the X axis and an electrical field Ey in the direction of the Y axis) having their amplitudes and phases modulated and traveling in the direction of the Z axis are expressed by Equations (1) and (2).

On the assumption that components in the direction of the Y axis each have its phase delayed by $\epsilon$ compared to a corresponding component in the direction of the X axis, the intensity $I(\theta; \epsilon)$ of light is considered which has passed through a polarizer having a transmission axis in a direction extending at an angle $\theta$ with the positive X axis. In this case, an electrical field vector in the $\theta$ direction is expressed by:

$$E(t;\theta;\epsilon)=E_x \cos \theta + E_y \exp(i\epsilon)\sin \theta \quad (9)$$

The time average of the intensity is given by:

$$I(\theta;\epsilon)=<E(t;\theta;\epsilon)E^*(t;\theta;\epsilon)>=J_{xx} \cos^2\theta+J_{yy} \sin^2\theta+J_{xy}\exp(-i\epsilon) \cos \theta \sin \theta+J_{yx}\exp(i\epsilon)\sin \theta \cos \theta \quad (10)$$

In this equation, $J_{xx}$, $J_{yy}$, $J_{xy}$, and $J_{yx}$ correspond to the elements of the coherency matrix below.

$$J = \begin{pmatrix} <ExEx^*> & <ExEy^*> \\ <EyEx^*> & <EyEy^*> \end{pmatrix} \quad (11)$$

$$= \begin{pmatrix} <a_1^2> & <a_1 a_2 \exp[i(\phi_1-\phi_2)]> \\ <a_1 a_2 \exp[-i(\phi_1-\phi_2)]> & <a_2^2> \end{pmatrix}$$

The diagonal elements of J are actual numbers, and the sum of the diagonal elements indicates the total intensity of light.

$$TrJ=J_{xx}+J_{yy}=<E_x E_x^*>+<E_y E_y^*> \quad (12)$$

The non-diagonal elements are generally complex numbers and have the following relationship:

$$J_{xy}=J_{yx}^* \quad (13)$$

$$|J_{xy}|=|J_{yx}|\leq (J_{xx})^{1/2}(J_{yy})^{1/2} \quad (14)$$

In this case, light with a zero degree of polarization refers to such light that the value for Equation (4) does not depend on $\theta$ or $\epsilon$. A necessary and sufficient condition for this light is:

$$J_{xy}=J_{yx}=0 \quad (15)$$

$$J_{xx}=J_{yy} \quad (16)$$

(Reference 4: M. Born and E. Wolf, Principle of Optics, 4th ed, London: Pergamon Press, 1970, chapter 10.8, pp.809–816 formula (27)).

The orthogonal polarization components of scrambled light now have equal power, and Conditional Expression (16) is thus met. Accordingly, the DOP is zeroed provided that Conditional Expression (15) is established. That is, provided that there is no temporal overlapping between optical pulses each of which is polarized orthogonally to the succeeding pulse, $a_1(t) \times a_2(t)$ is zero at all points of time regardless of the phase of the optical pulses. It is thus possible to zero the DOP of scrambled light. Reference 3, utilizing optical short pulses, is based on this principle.

Conventional Optical Network

Figure 4A:
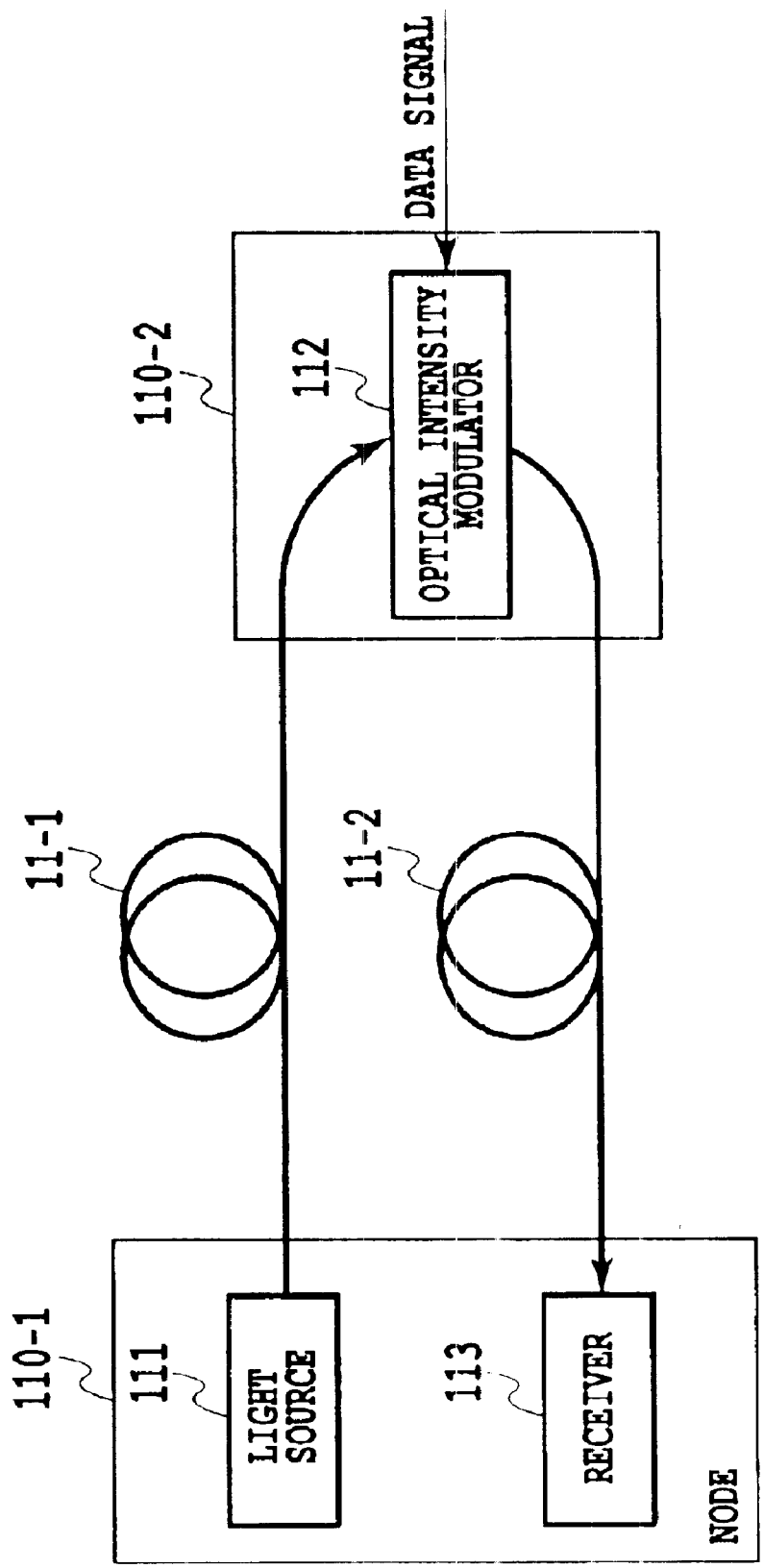
FIGS. 4A and 4B are diagrams showing a basic configuration of a conventional optical network.
Figure 4B:
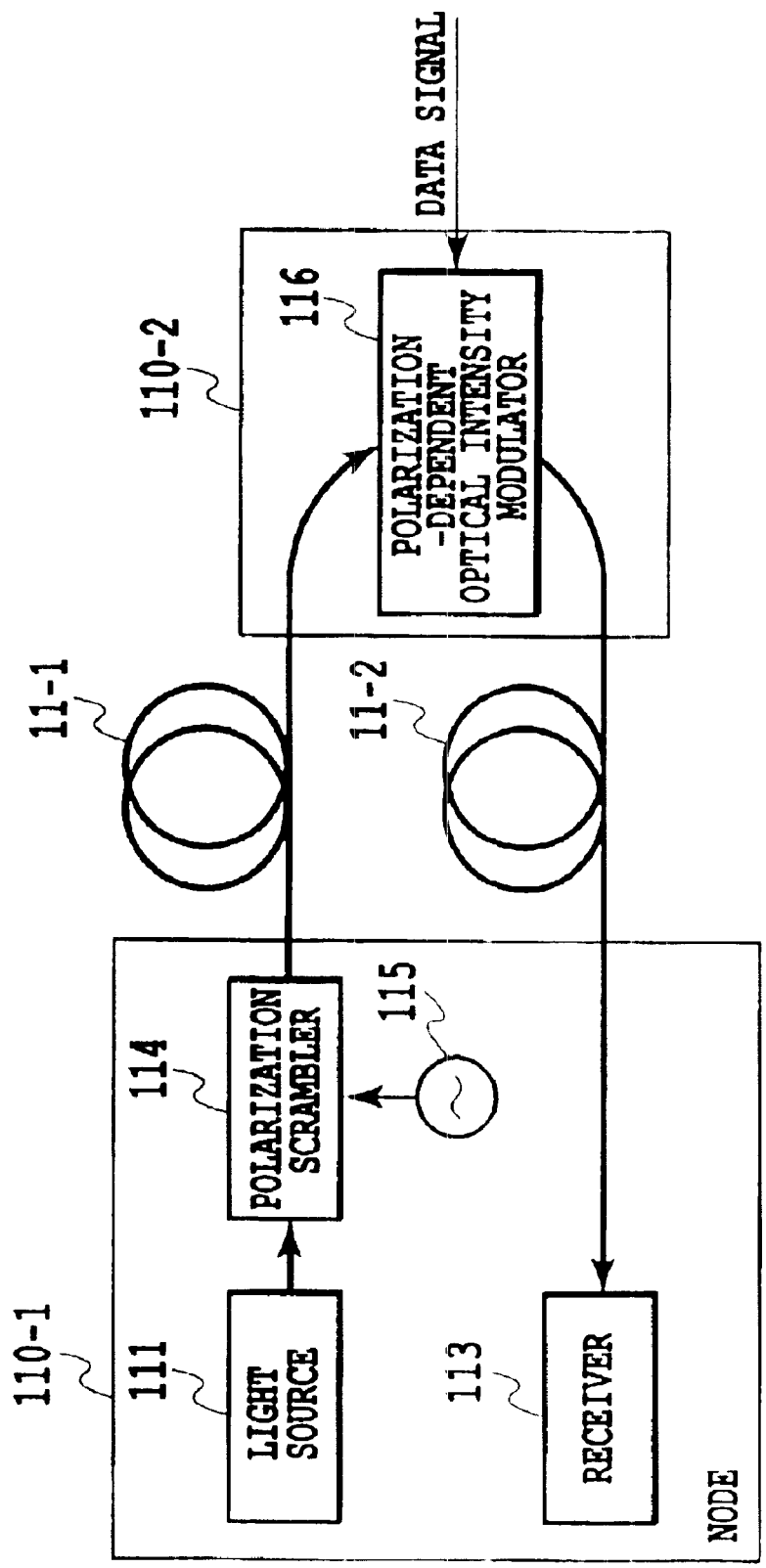

FIGS. 4A and 4B show a basic configuration of an optical network. In FIG. 4A, nodes 110-1 and 110-2 are connected together via two optical fibers 11-1 and 11-2. In this configuration, a CW output by a light source 111 arranged at the node 110-1 is transmitted to the node 110-2 via the optical fiber 11-1. An optical intensity modulator 12 at the node 110-2 uses a transmitted signal to modulate the CW and transmits the modulated signal light back to a receiver 113 at the node 110-1 via the optical fiber 11-2.

Such optical networks include an access network in which a user terminal having no light sources is assumed as the node 110-2 and in which an optical carrier supplied by a station (node 110-1) is modulated using a transmitted signal supplied by a user' network (for example, LAN (Local Area Network) and is then transmitted to the station (node 110-1) as an upstream signal. In such an optical network, while an optical carrier passes through an optical fiber in a transmission line, its SOP varies temporarily arbitrarily. An optical intensity modulator used by the user needs to have insignificant polarization dependency as a transmission characteristic. Optical intensity modulators meeting this condition include an electro-absorption (EA) modulator and a semiconductor optical amplifier (SOA) modulator. The use of such an optical intensity modulator enables the construction of the optical network shown in FIG. 4A.

However, the EA modulator may suffer a heavy transmission loss, so that if it is used to construct the optical network shown in FIG. 4A, the SNR of a received signal is significantly degraded. Furthermore, in recent years, efforts have been made to develop an EA-DFB laser comprising a DFB laser (Distributed-Feedback Laserdiode) and an EA modulator integrated together. Accordingly, it is very rare that the unitary EA modulator is produced as a device. As a result, it is impossible to expect manufacturing costs to be successfully reduced on the basis of mass production. On the other hand, the SOA modulator does not suffer transmission loss owing to its amplification function. However, it is quicker in response than an erbium doped fiber amplifier (EDFA). As a result, it markedly degrades the waveform of a signal of a Gbit/s order.

On the other hand, a LiNbO3 optical intensity modulator has a polarization dependent. However, the optical network shown in FIG. 4A does not allow the use of a polarization-dependent optical intensity modulator for the previously described reason. In this regard, the polarization-dependent optical intensity modulator can be used in the network if a polarization controller is provided in front of the optical intensity modulator. However, when WDM signals are transmitted, different polarization controllers are required the respective wavelengths. This is disadvantageous in terms of costs. However, advantageously, the $LiNbO_3$ optical intensity modulator suffers a lighter transmission loss and lower costs than the EA modulator and can carry our modulation at higher speed than the SOA modulator.

Thus, for the optical network shown in FIG. 4A in which the light source and the optical intensity modulator are separated from each other via the optical fibers, a configuration has been proposed which enables the use of a polarization-dependent optical intensity modulator such as an $LiNbO_3$ optical intensity modulator (Reference 8: Japanese Patent Application Laid-open No. 2000-196523). As shown in FIG. 4B, this configuration solves the problem with the polarization dependency of the node polarization-dependent optical intensity modulator 116 at the node 110-2 by arranging, behind the light source 111, a polarization scrambler 114 and an oscillator 115 that drives the polarization scrambler 114 and regularly rotating (scrambling) the SOP of an optical carrier to zero the degree of polarization of the optical carrier. This configuration requires only one polarization scrambler to transmit WDM signals. It is thus possible to reduce costs compared to the previously described configuration comprising as many polarization controllers as the wavelengths.

For such an optical network, the previously described examples of configurations of the first to third polarization scramblers are available as polarization scramblers.

Figure 5A:
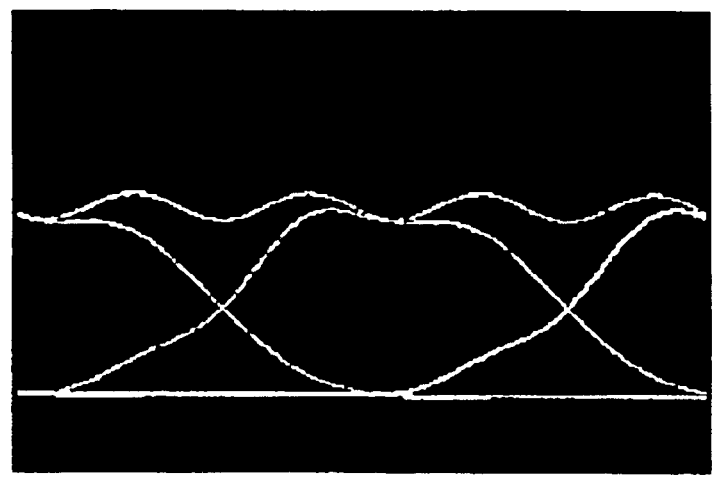
FIGS. 5A and 5B are diagrams showing the relationship between the frequency of a sinusoidal signal driving the conventional polarization scrambler and an eye opening.

FIG. 5A shows an example of calculations for an eye diagram of the case in which the first polarization scrambler the configuration of which is shown in FIG. 1B is applied to the optical transmission system in FIG. 4B (pseudo random pattern=$2^{7-1}$). In this case, an output from the polarization scrambler is assumed to have a zero degree of polarization. A sinusoidal signal driving the polarization scrambler is assumed to have a frequency of 5 GHz. A data signal is assumed to have a bit rate of 2.5 Gbit/s. It is further assumed that a received electric signal is passed through a low pass filter whose 3 dB-bandwidth is seven-tenths of the bit rate of the data signal.

Figure 5B:
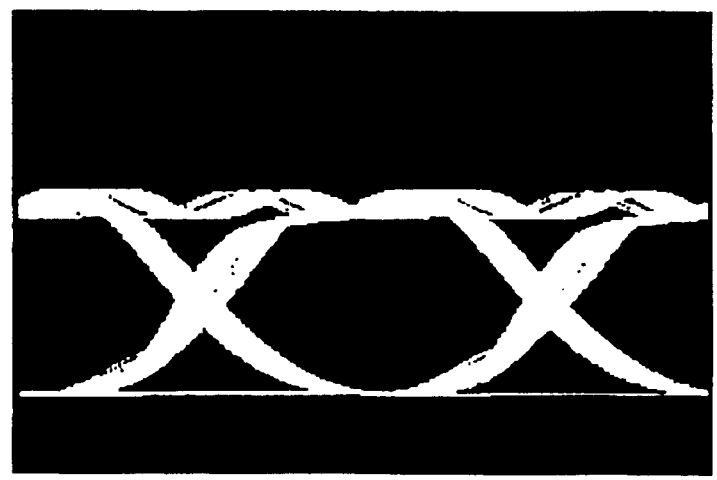

Further, FIG. 5B shows an example of calculations for an eye diagram of the case in which the frequency of the sinusoidal signal driving the polarization scrambler is 5.01 GHz. As is apparent from the figure, jitters occur when the frequency of the sinusoidal signal changes from 5 GHz to 5.01 GHz. To avoid these jitters, it is generally necessary to match the polarization scrambling frequency with a natural number multiple of the data signal bit rate clock and synchronize their phases to each other.

However, with the configuration shown in FIG. 4B, it is difficult to match polarization scrambling frequency with a natural-number multiple of the data signal bit rate clock and further synchronize their phases to each other. For example, the node 110-1 at which the polarization scrambler 114 is arranged is separated via the optical fiber 11-1 from the node 110-2 at which the polarization-dependent optical intensity modulator 116 is arranged. It is thus possible but not practical to synchronize their phases to each other using a coaxial cable or the like. Accordingly, it is necessary to provide a simple method that achieves phase synchronization regardless of this distance.

Further, to use a polarization scrambler to avoid the polarization dependency of an element inserted into the transmission line as described above, a polarization scrambling (rotating) frequency is used which is double that of the data signal bit rate clock (or higher) (Reference 6: Electron. Lett., vol.30, pp.806 to 807, 1994). This is probably due to the sampling theorem that a "signal must be sampled at least twice during each period or cycle of its highest frequency component".

However, if polarization is scrambled at a polarization scrambling frequency which is double that of the data signal bit rate clock (or higher), then modulation causes an optical spectrum to be spread as the polarization scrambling frequency increases. Thus, disadvantageously, the waveform of a signal is dispersed in the transmission line and thus degraded markedly. Further, when WDM signals are transmitted, the spread of the optical spectrum may hinder an increase in the spectrum density of WDM signals. The polarization scrambling frequency is desirably set to be lower than the double of that of the transmitted signal bit rate clock.

To realize this, a method has been proposed in which for a polarization scrambler of the first or second configuration, the data signal bit rate clock is synchronized to a sine wave electric signal driving the polarization scrambler, to set the polarization scrambling frequency equal to that of the data signal bit rate clock, thus narrowing the spectrum of output light from the polarization scrambler (Reference 7: Electron. Lett., vol.32, pp.52 to 54, 1996). However, with this method, it is essential to synchronize the phase of the data signal bit rate clock to the phase of the sine wave electric signal driving the polarization scrambler. Consequently, a simple phase synchronization method is required as in the case in which jitters must be avoided.

Thus, the two points described below can be given as guidelines for implementing an optical network using the above described improved configuration.

① To obtain a received signal that is not degraded by jitters, certain measures must be taken to synchronize the phase of the data signal bit rate clock to the phase of the electric signal driving the polarization scrambler. This phase synchronization method also contributes to narrowing the spectrum of output light from the polarization scrambler of the first or second configuration.

② The received signal is allowed to be degraded by jitters. The electric signal driving the polarization scrambler and the data signal bit rate clock are set to be asynchronous. The polarization scrambling frequency is set to be lower than the double of that of the data signal bit rate clock to narrow the spectrum of output light from the polarization scrambler. This method requires no phase synchronization means and enables the network configuration to be simplified compared to ①.

Polarization Scrambler

With reference to the drawings, detailed description will be given of an embodiment of a polarization scrambler according to the present invention. In the drawings, components having similar functions are denoted by the same reference numerals.

(Embodiment of Polarization Scrambler of Present Invention)

Figure 6A:
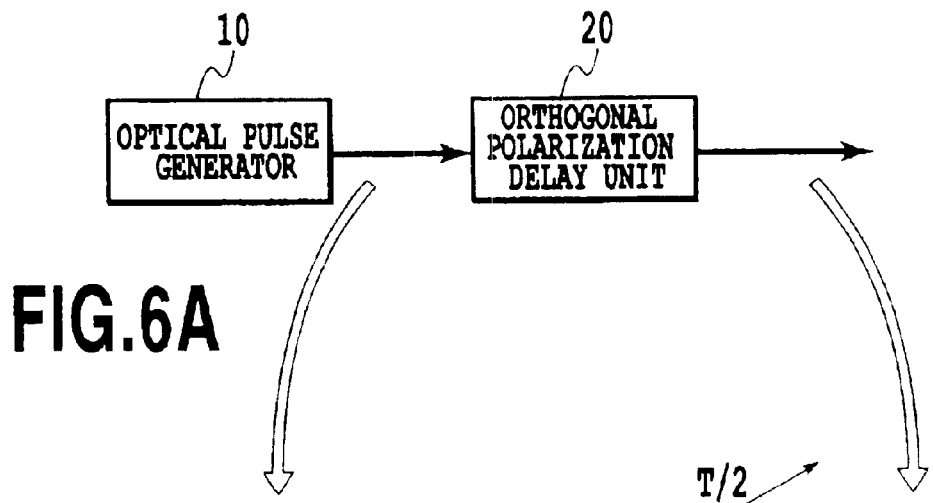
FIGS. 6A to 6C are diagrams showing an embodiment of a polarization scrambler according to the present invention.
Figure 6B:
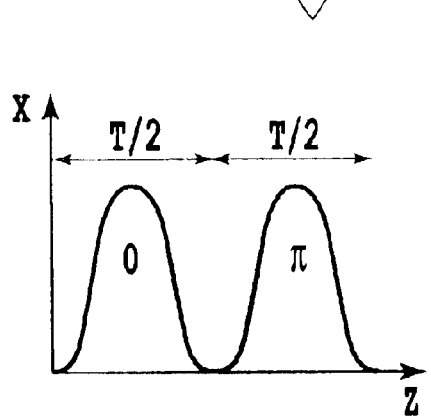
Figure 6C:
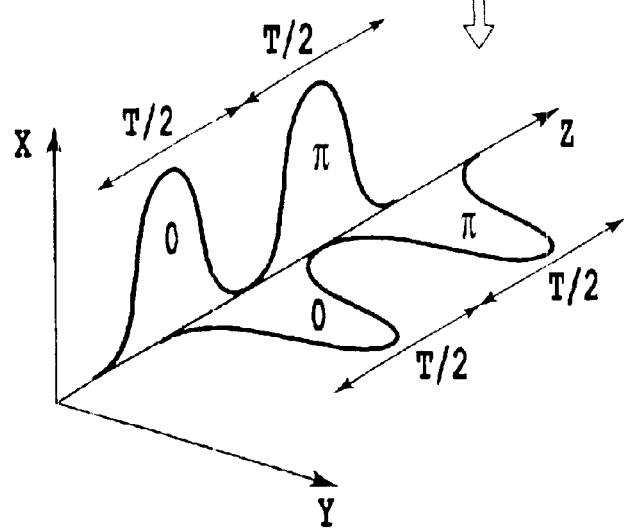

FIGS. 6A, 6B, and 6C show an embodiment of a polarization scrambler according to the present invention. In the figures, the polarization scrambler of the present invention is composed of an optical pulse generator 10 that generates optical pulses (for example, FIG. 6B) with an intensity waveform period T/2 and an electrical field period T in which the same intensity waveform is repeated every repetition period T/2 and in which phase is inverted every repetition period T/2, and an orthogonal polarization delay unit 20 that receives each of the optical pulses, separates the optical pulse into two optical pulses with orthogonal SOP, and relatively shifts the temporal position of one of the two optical pulses from that of the other optical pulse by (2n−1)T/4 (n is a natural number) to generate light in which each pulse is polarized orthogonally to the succeeding pulse (for example, FIG. 6C).

Figure 7A:
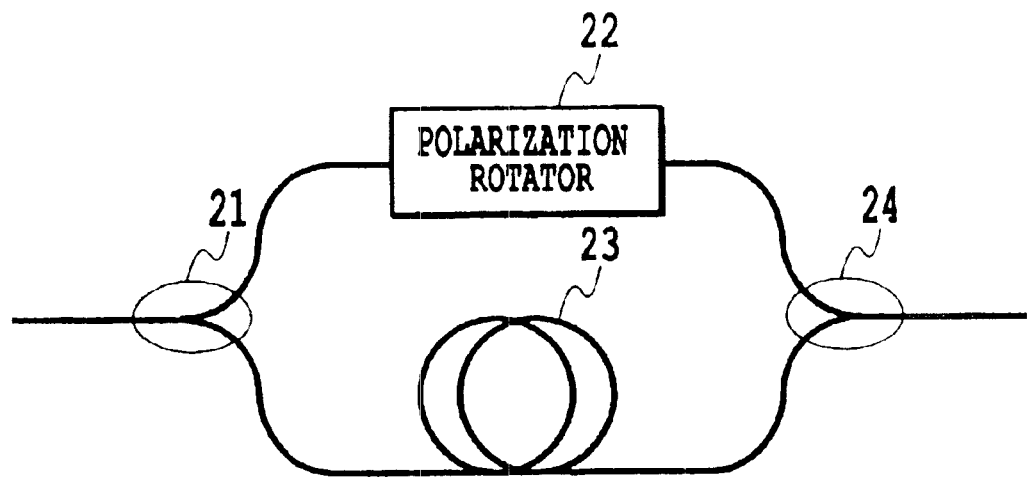
FIGS. 7A and 7B are diagrams showing an example of configuration of an orthogonal polarization delay unit 20.
Figure 7B:
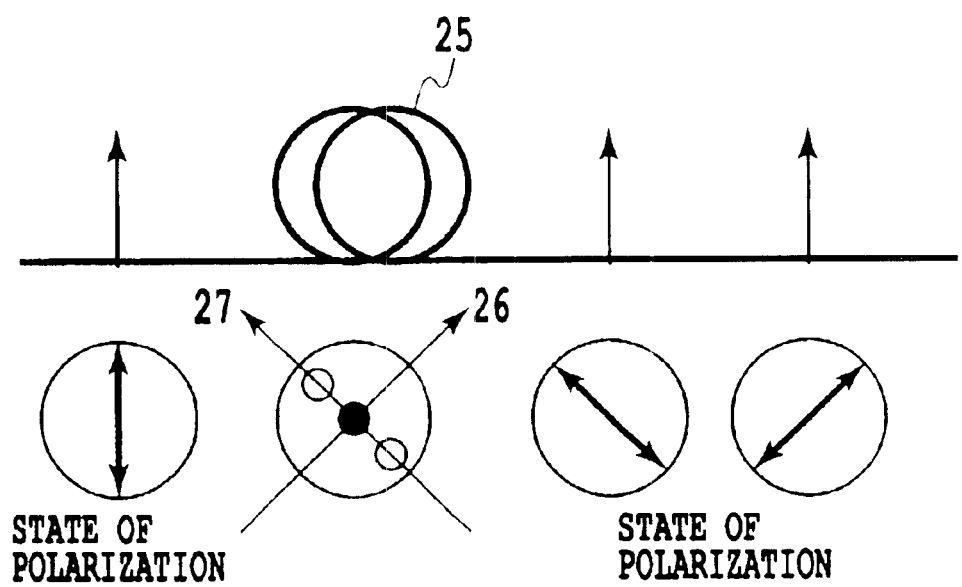

FIGS. 7A and 7B show an example of configuration of the orthogonal polarization delay unit 20 (Reference 3). The orthogonal polarization delay unit 20 shown in FIG. 7A is composed of an optical splitter 21 that splits an input optical pulse into two pieces having equal optical power, a polarization rotator 22 that makes the polarization of the two optical pulses orthogonal to each other, a delay line 23 that relatively shifts the temporal position of one of the two pulses from that of the other pulse by (2n−1)T/4, and an optical multiplexer 24 that multiplexes the optical pulses with their polarization and temporal positions described above. In this case, the polarization rotator 22 is arranged in one of the paths for the respective optical pulses, while the delay line 23 is arranged in the other path. However, instead of this relative arrangement, the polarization rotator 22 and the delay line 23 may both be arranged in one of the two paths.

The orthogonal polarization delay unit 20 shown in FIG. 7B uses a polarization maintaining fiber 25. Optical pulses are input to the delay unit so that the ratio of power to a fast axis 26 of the polarization maintaining fiber 25 and power to its slow axis 27 is 1:1. As a result, one optical pulse is separated into two optical pulses with orthogonal SOP. Therefore, light is generated so that each pulse is polarized orthogonally to the succeeding pulse.

(First Example of Configuration of Optical Pulse Generator 10)

Figure 8:
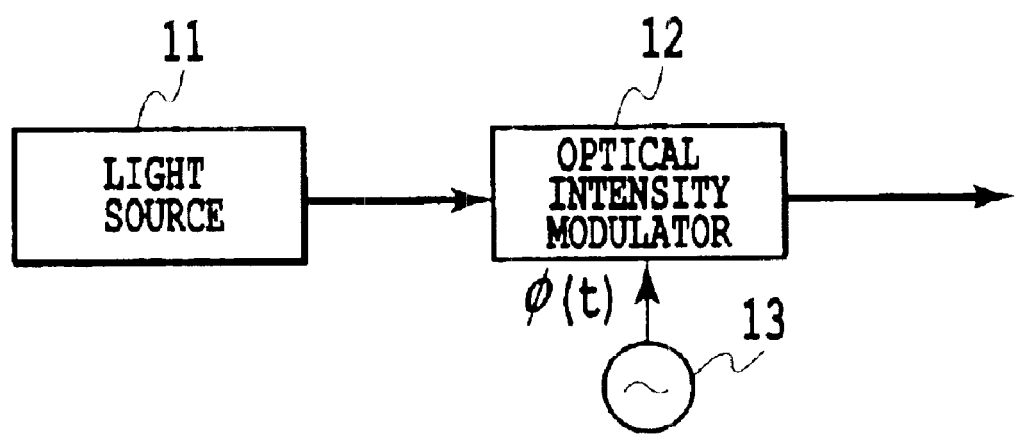
FIG. 8 is a diagram showing a first example of configuration of an optical pulse generator 10.
Figure 9:
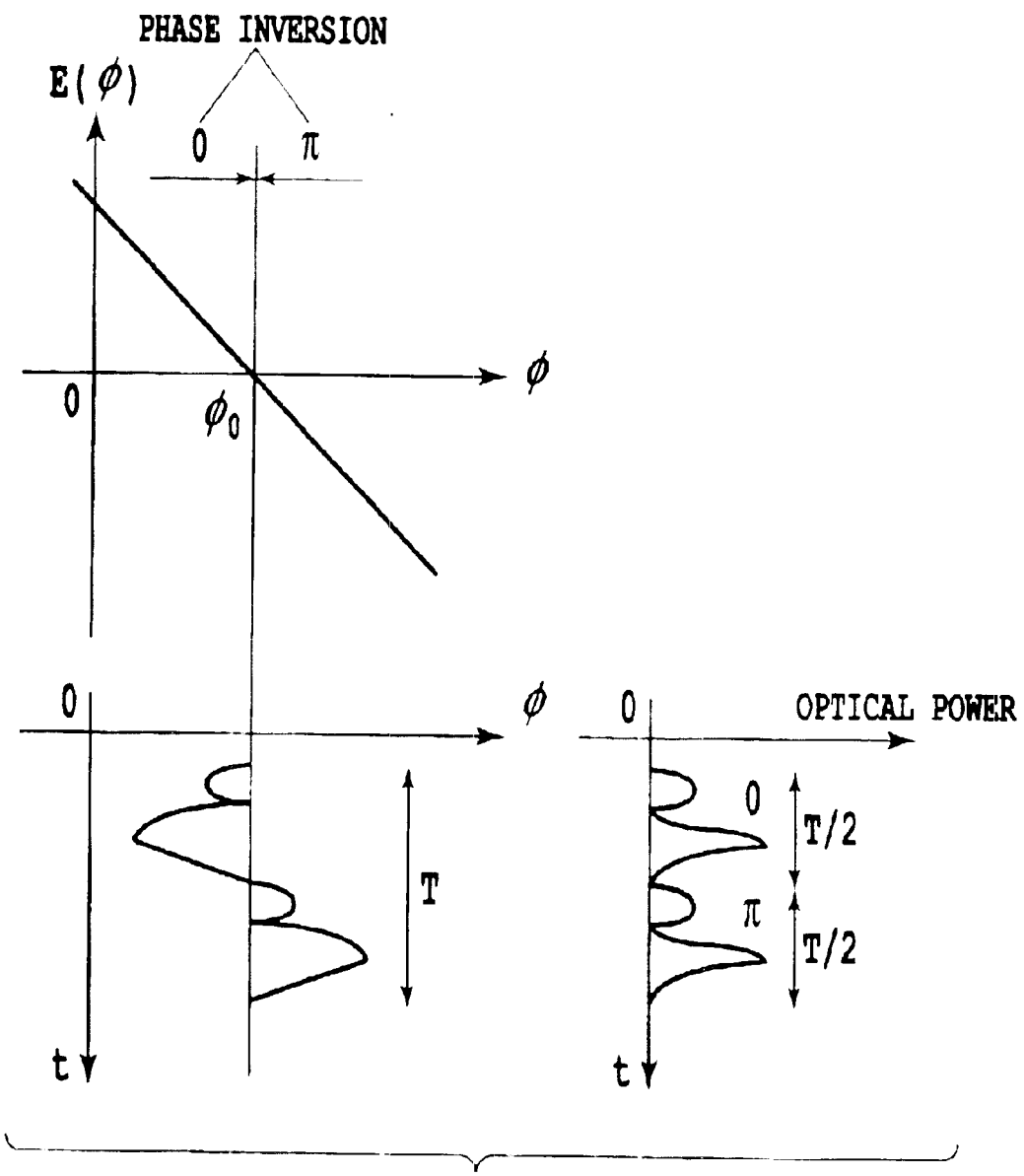
FIG. 9 is a chart showing the transmission characteristics of an optical intensity modulator 12.

FIG. 8 shows a first example of configuration of the optical pulse generator 10. In this figure, the optical pulse generator 10 is composed of a light a light source that generates a CW, an optical intensity modulator 12, and an oscillator 13. For example, as shown in FIG. 9, the optical intensity modulator 12 has an input signal $\phi(t)$ and such a transmission characteristic that for a particular input signal $\phi_0$, output optical electrical fields are expressed by:

$$E(\phi(t)-\phi_0)=-E(-\phi(t)-\phi_0) \tag{17}$$

Further, the optical intensity modulator 12 is driven by the input signal $\phi(t)$ having such a repetition period T that:

$$\phi(t)-\phi_0=\phi(t-T)-\phi_0=-\phi(t-T/2)-\phi_0 \tag{18}$$

That is, the optical intensity modulator 12 has equal transmission characteristic absolute values around $\phi_0$. It thus uses the input signal $\phi(t)$ of the repetition period T, output by the oscillator 13, to generate optical pulses with the repetition period T/2 (the repetition period T if the optical electrical fields are included).

(Second Example of Configuration of Optical Pulse Generator 10)

Figure 10:
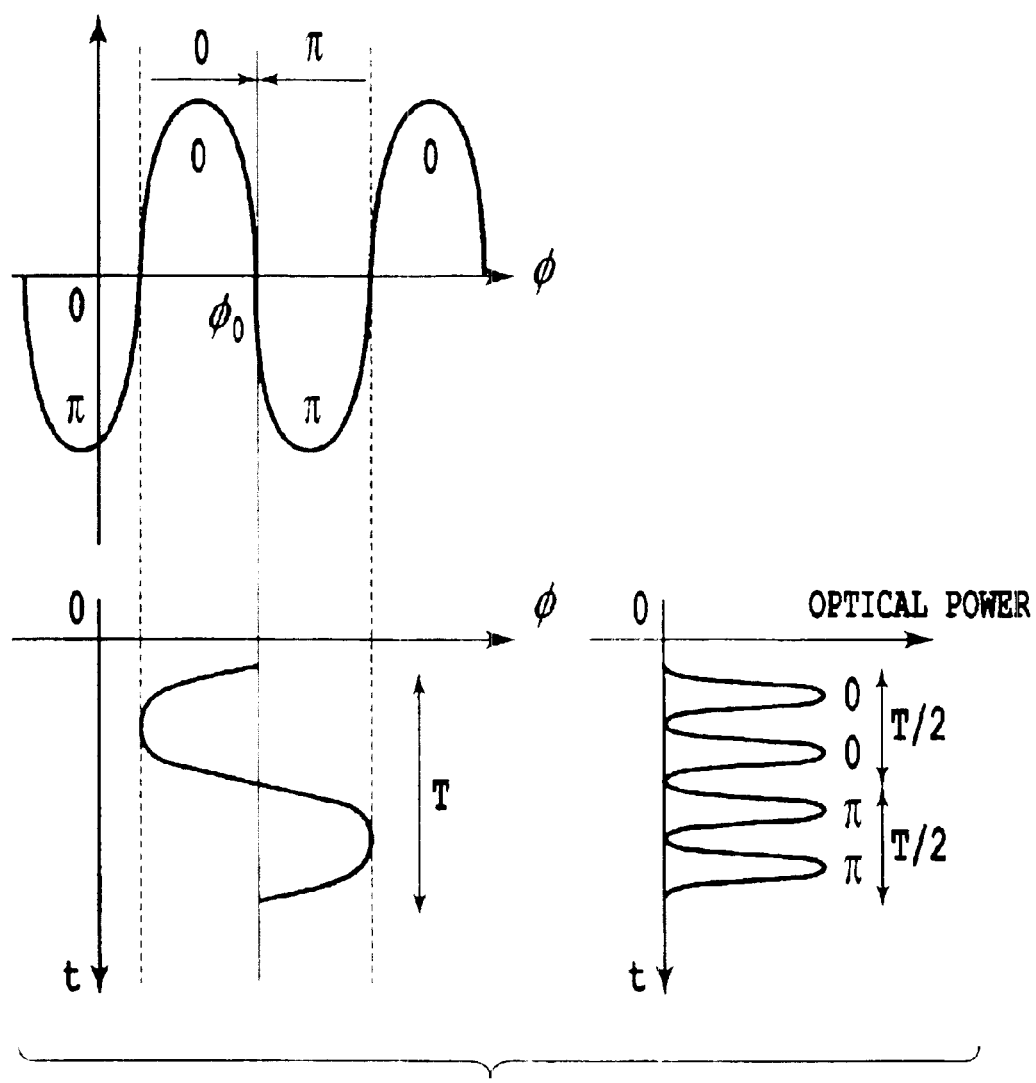
FIG. 10 is a chart showing the transmission characteristics of the optical intensity modulator 12.

The optical intensity modulator 12 of the optical pulse generator 10, shown in FIG. 8, may have the input signal $\phi(t)$ and such a transmission characteristic that output electrical fields are periodical relative to the particular input signal $\phi_0$ and may be driven by the input signal $\phi(t)$ with the repetition period T, as shown in FIG. 10. With this configuration, by increasing the amplitude of the input signal $\phi(t)$, polarization scrambling speed can be increased with the frequency of the input signal fixed.

(Third Example of Configuration of Optical Pulse Generator 10)

Figure 11A:
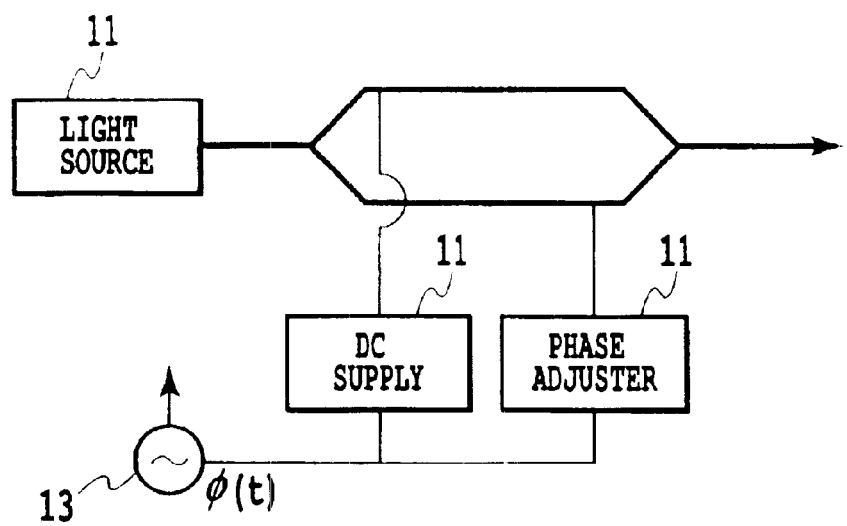
FIGS. 11A and 11B are diagrams showing a third example of configuration of the optical pulse generator 10.
Figure 11B:
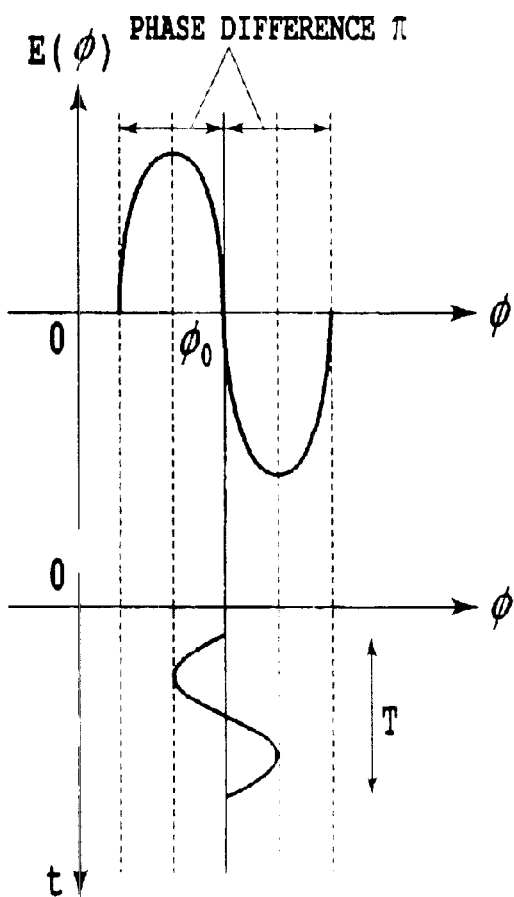

FIGS. 11A and 11B show a third example of configuration of the optical pulse generator 10. In this figure, the optical pulse generator 10 is the light source 11 that generates a CW, a Mach Zehnder type optical intensity modulator 14, an oscillator 13 that drives the Mach Zehnder type optical intensity modulator 14, a DC supply 15, and a phase adjuster

16. The Mach Zehnder type optical intensity modulator 14 receives an input CW from the light source 11 and carries out amplitude modulation according to a relative phase difference applied to the paths into which optical power is evenly split. In particular, if the two paths are subjected to phase modulation using signals with an equal magnitude and opposite phases (opposite signs), a sinusoidal electrical field transmission characteristic such as the one shown in FIG. 1B is obtained. In this regard, φ denotes a difference in phase between the signals with the opposite phases, and $\phi_0$ denotes a time average difference (an amount enough to cause a difference π in phase between the two separated paths). Optical pulses are generated by phase modulation using sinusoidal signals with opposite phases that cause the phase difference π on a peak-to-peak basis. However, the time average difference $\phi_0$ and phase difference applied to the two sinusoidal signals by the DC supply 15 and the phase adjuster 16, respectively.

Description will be given of how to zero the DOP of optical pulses (scrambled light) obtained by the configuration including the optical pulse generator 10 and the orthogonal polarization delay unit 20. The optical pulse generator 10 generates optical pulses with a period T/2 (a period T if the optical electrical fields are included) which involve optical electrical fields expressed by:

$$E(t)=E(\phi(t)) \tag{19}$$

In this regard, when t denotes time and T denotes the period of φ, E and φ are functions that meet the following relationships:

$$E(\phi)=-E(-\phi)\ (\neq 0) \tag{20}$$

$$\phi(t)=\phi(t-T)=-\phi(t-T/2) \tag{21}$$

(for simplification, in Equations (17) and (18), it is assumed that $\phi_0=0$).

Here, if the orthogonal polarization delay unit 20 is configured as shown in FIG. 7A, then optical power is evenly split by the optical splitter 21. Accordingly, orthogonally polarized optical pulses have equal optical power, and Conditional Expression (16) is thus met. Consequently, the degree of polarization of scrambled light is zeroed provided that Conditional Expression (15) is established. Here, since:

$$Ex(t)=E(\phi(t)) \tag{22}$$

$$Ey(t)=E(\phi(t-T/4)) \tag{23}$$

the following equation holds water.

$$\begin{aligned}
J_{xy} &= <Ex(t)Ey(t)> \\
&= \lim_{T\to\infty}\frac{1}{T}\int_{-T/2}^{T/2} E(\phi(t))E(\phi(t-T/4))\,dt \\
&= \frac{1}{T}\int_0^T E(\phi(t))E(\phi(t-T/4))\,dt \\
&= \frac{1}{T}\int_0^{T/4}(\phi(t))E(\phi(t-T/4))\,dt + \frac{1}{T}\int_{T/4}^{T/2} E(\phi(t))E(\phi(t-T/4))\,dt + \\
&\quad \frac{1}{T}\int_{T/2}^{3T/4} E(\phi(t))E(\phi(t-T/4))\,dt + \frac{1}{T}\int_{3T/4}^{T} E(\phi(t))E(\phi(t-T/4))\,dt \\
&= \frac{1}{T}\int_0^{T/4} E(\phi(t))E(\phi(t-T/4))\,dt + \frac{1}{T}\int_0^{T/4} E(\phi(t'+T/4))E(\phi(t'))\,dt' + \\
&\quad \frac{1}{T}\int_o^{T/4} E(\phi(t''+T/2))E(\phi(t''+T/4))\,dt'' + \\
&\quad \frac{1}{T}\int_0^{T/4} E(\phi(t'''+3T/4))E(\phi(t'''+T/2))\,dt''' \\
&= \frac{1}{T}\int_o^{T/4}(\phi(t))E(\phi(t-T/4))\,dt + \frac{1}{T}\int_0^{T/4} -E(\phi(t'-T/4))E(\phi(t'))\,dt' + \\
&\quad \frac{1}{T}\int_0^{T/4} E(\phi(t''))E(\phi(t''-T/4))\,dt'' + \\
&\quad \frac{1}{T}\int_0^{T/4} -E(\phi(t'''-T/4))E(\phi(t'''))\,dt''' \\
&= 0
\end{aligned} \tag{24}$$

This indicates that the degree of polarization is zero. This equation involves substitution expressions t'=t−T/4, t''=t−T/2, t'''=t−3T/4, and Equations (20) to (23).

(Comparison of Present Configuration with Conventional Configuration)

Figure 12A:
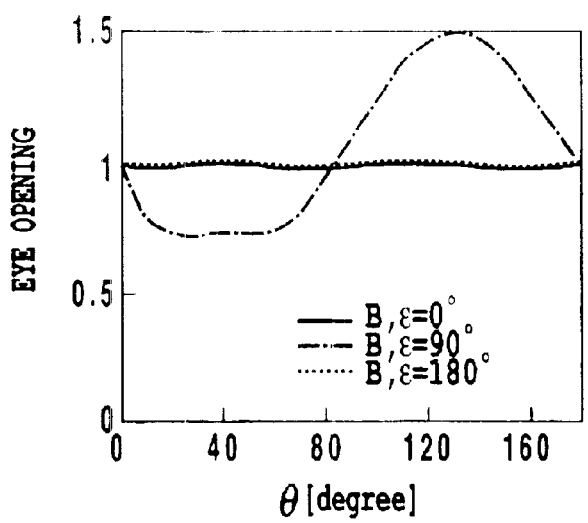
FIGS. 12A to 12C are charts illustrating how an input repetition signal period is determined according to a conventional configuration and the present configuration.
Figure 12B:
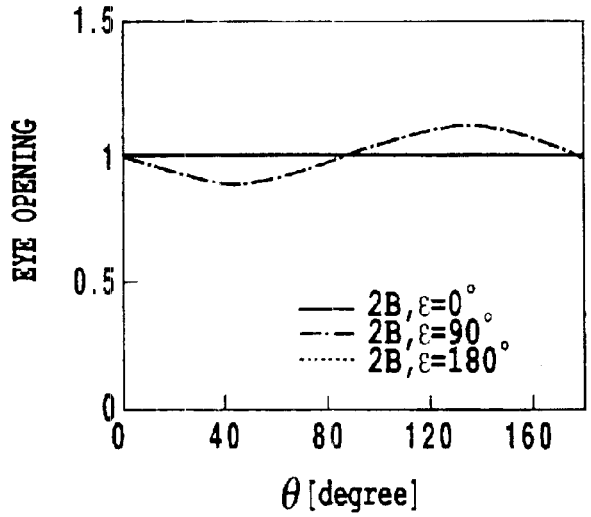
Figure 12C:
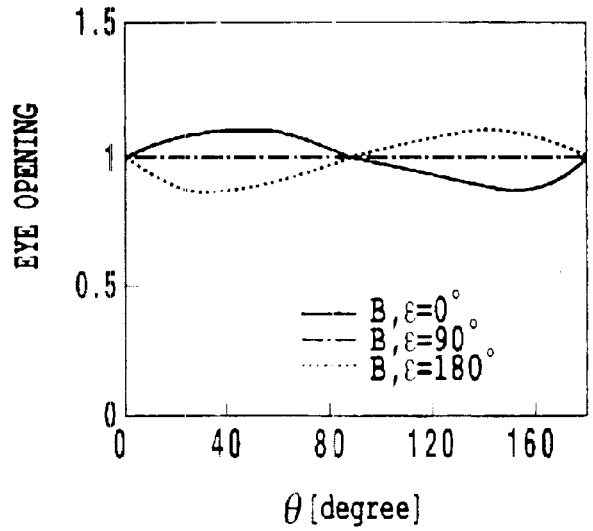

The characteristics of light with a zero degree of polarization generated by the polarization scrambler of the conventional configuration in FIGS. 1A–1B or 3A–3C will be compared with those of light with a zero degree of polarization generated by the polarization scrambler of the present configuration in FIGS. 11A, and 11B. First, the repetition period of an input signal for each polarization scrambling method is determined. FIGS. 12A, 12B, and 12C show an eye opening vs. calculation parameters θ and ε observed when light modulated using a data signal with a bit rate B is subjected to polarization scrambling and then passed through a polarizer that allows signal polarization to pass through (if the transmission path has an extreme polarization characteristic).

The input signal repetition period is desirably T=2/mB (m is a natural number). Accordingly, FIGS. 12A to 12C indicate the results of calculations for the conventional configuration with an input signal repetition period T=1/B, the conventional configuration with an input signal repetition period T=1/2B, and the present configuration with the input signal repetition period T=1/B, respectively. Actually, in the polarization scrambler of the conventional configuration, the X and Y axes are subjected to phase modulation using input signals expressed by:

$$\phi_{PM1}=(0.7655/2)\pi \sin 2\pi(t/T) \quad (25)$$

$$\phi_{PM2}=(0.7655/2)\pi \sin 2\pi(t/T) \quad (26),$$

respectively, according to Equations (7) and (8). In the polarization scrambler of the present invention, the paths created by the Mach Zehnder type optical intensity modulator are subjected to phase modulation using input signals expressed by:

$$\phi_{pulse1}=(1/2)\pi \sin 2\pi(t/T)+\phi_0 \quad (27)$$

$$\phi_{pulse2}=-(1/2)\pi \sin 2\pi(t/T) \quad (28)$$

The modulator is driven by a sinusoidal signal. FIGS. 12B and 12C indicate that similar eye openings are obtained by the conventional configuration with the input signal repetition period T=1/2B and the present configuration with the input signal repetition period T=1/B. Accordingly, the calculations below are executed under these conditions.

Figure 13A:
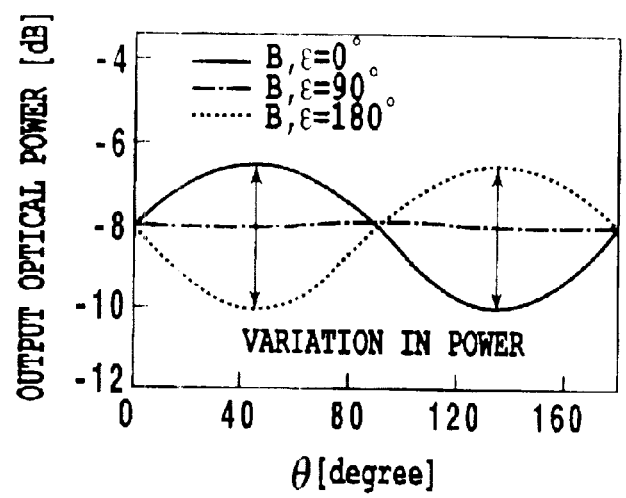
FIGS. 13A to 13C are charts showing a comparison of the conventional configuration with the present configuration.
Figure 13B:
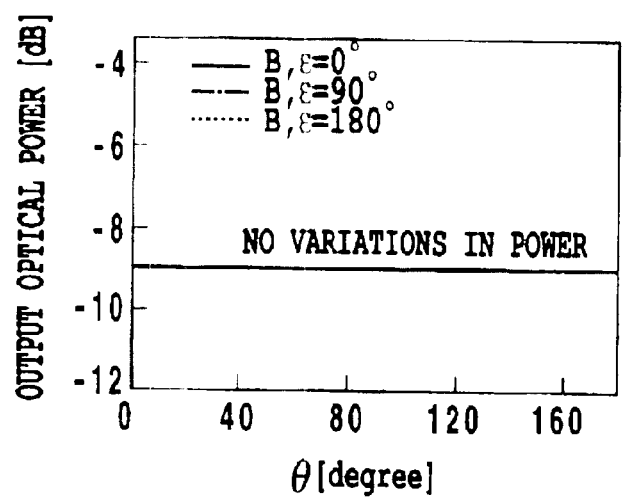
Figure 13C:
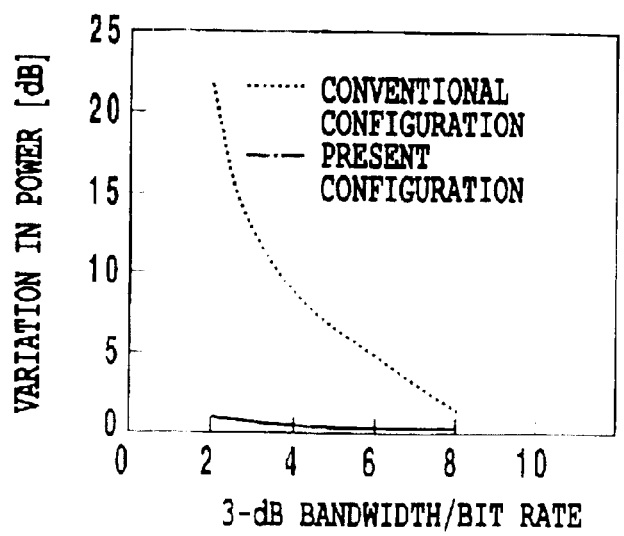

FIGS. 13A, 13B, and 13C show the output power of light passed through a Gauss type optical filter whose 3 dB-bandwidth is 6B, before the polarizer and twice after it for each polarization scrambler. In this regard, if light is not passed through any optical filters, the output power from the polarizer does not fluctuate owing to the zero degree of polarization condition. On the axis of ordinates, the power of a CW from the light source is 0 dB. As shown in FIG. 13A, the output optical power varies depending on θ and ε, i.e. the SOP input to the polarizer. However, the power does not substantially vary in FIG. 13B. This is because the spread of an optical spectrum causes the optical filter to cut off the spectrum, so that the DOP deviates from zero.

Furthermore, FIG. 13C shows the results of calculations for a variation in power if the 3-dB bandwidth of the optical filter is varied. The solid line in the figure indicates the present configuration, while the broken line indicates the conventional configuration. This figure indicates that the polarization scrambler of the present configuration undergoes substantially no variations in power even with a variation in the 3-dB bandwidth of the optical filter. A variation in optical power varies the power input to the optical amplifier, inserted into the transmission path, to vary temporal SNR. Thus, the present configuration is also more advantageous then the conventional configuration in terms of the SNR.

Figure 14A:
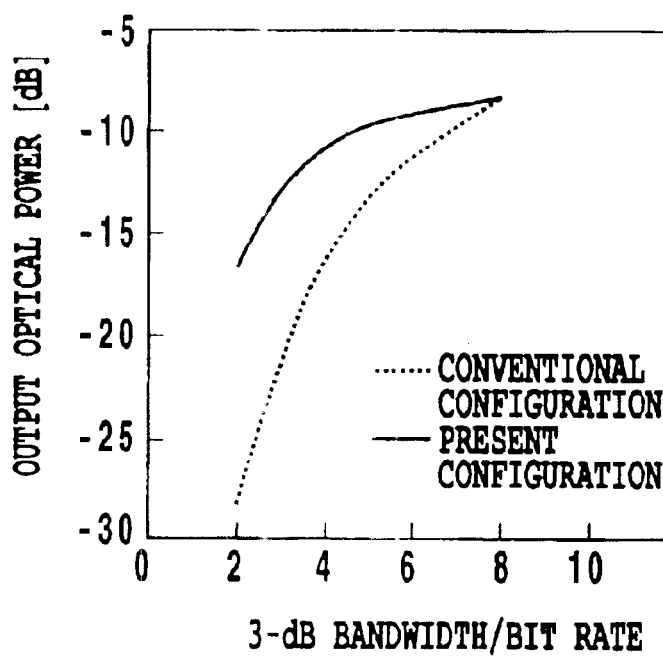
FIGS. 14A and 14B are charts showing a comparison of the conventional configuration with the present configuration.
Figure 14B:
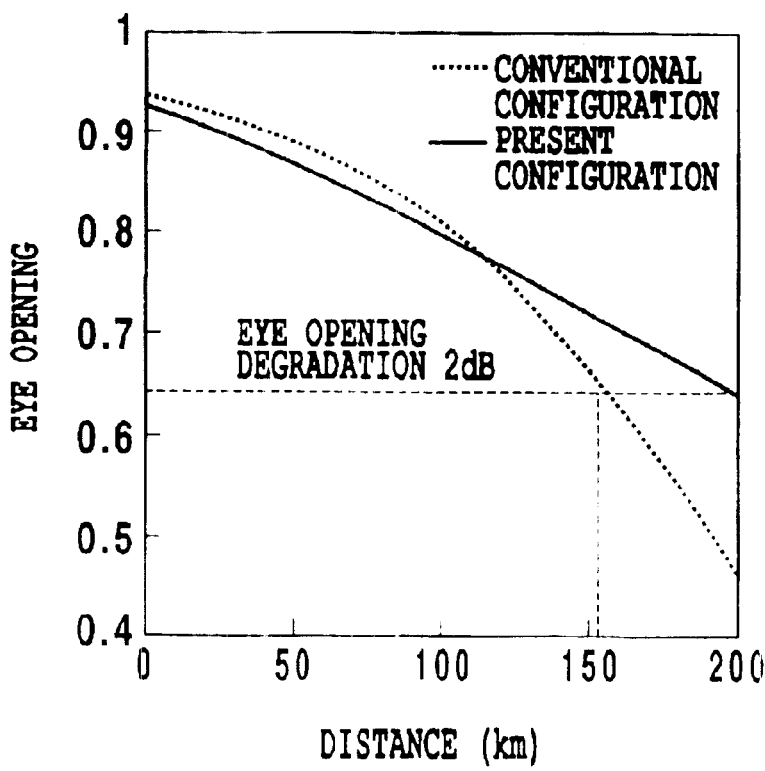

FIG. 14A shows the results of calculations for the minimum optical power obtained if the 3-dB bandwidth of the optical filter is varied. The solid line in the figure indicates the present configuration, while the broken line indicates the conventional configuration. The minimum optical power as used herein refers to the worst value based on the SOP input to the polarizer. This figure indicates that the present configuration provides a smaller optical spectrum than the conventional configuration. FIG. 14A (and FIG. 13B) involves a power loss of up to 2 dB resulting from generation of optical pulses. Consequently, if the axis of ordinates indicates relative average power, each of the results of calculations for the present configuration is +2 dB. Further, the small spread of an optical spectrum is also indicated by the suppression of degradation of the eye opening caused by chromatic dispersion in the transmission line. FIG. 14B shows the results of calculations for the eye opening observed when light of wavelength 1,550 nm and data signal bit rate 2.5 Gbit/s which has been subjected to polarization scrambling is passed through the polarizer (not through the optical filter) and then transmitted over a single mode fiber (SMF) with a chromatic dispersion of 16 ps/nm/km. For the eye opening, the worst value based on the SOP input to the polarizer is plotted. As shown in the figure, the polarization scrambler of the present invention allows light to be transmitted over a longer distance than the conventional configuration before the same level of eye opening degradation occurs.

(Example of Configuration of Optical Transmitter Using Polarization Scrambler of Present Invention)

Figure 15A:
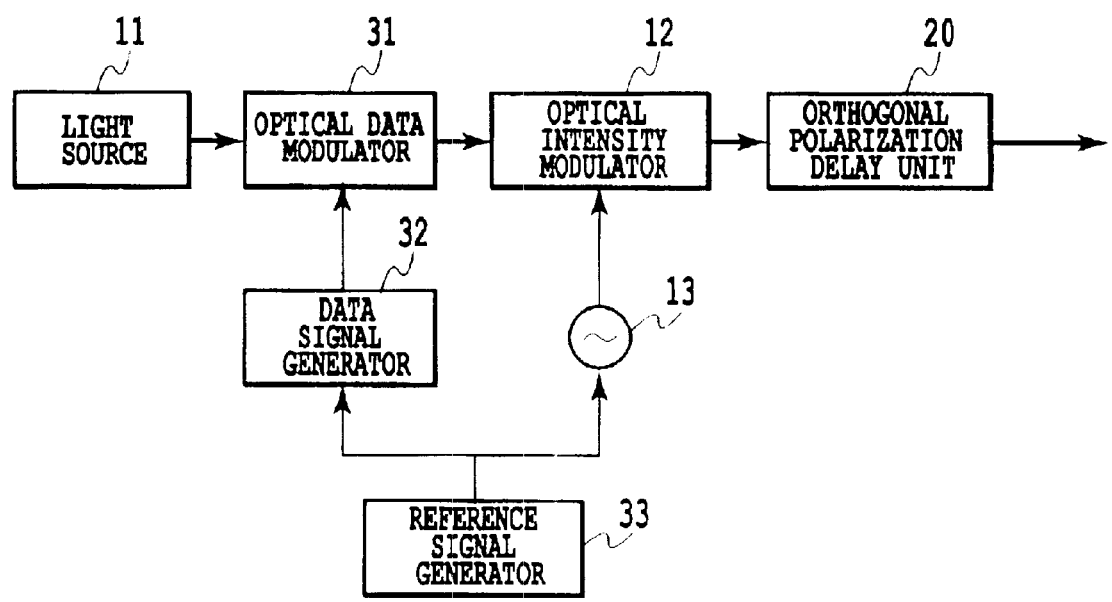
FIGS. 15A and 15B are diagrams showing an example of configuration of an optical transmitter using the polarization scrambler according to the present invention.
Figure 15B:
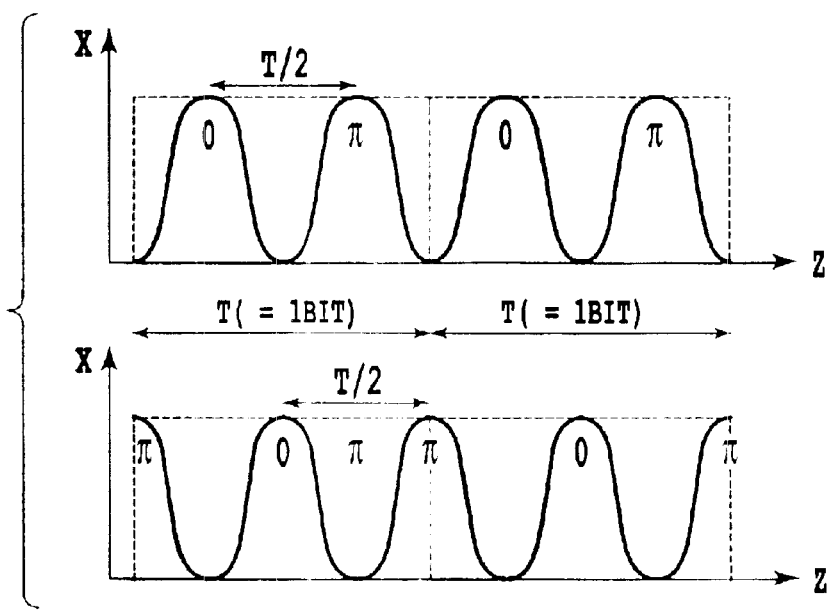

FIGS. 15A and 15B shows an example of configuration of an optical transmitter using the polarization scrambler of the present invention. In these figures, an optical data modulator 31 is arranged between the light source 11 and the optical intensity modulator 12, both constituting the polarization scrambler of the present invention. The optical data modulator 31 is driven by a data signal output by the data signal generator 32. A reference frequency generator 33 supplies a predetermined frequency signal to a data signal generator 32 and the oscillator 13 in order to synchronize the data signal bit rate clock to an electric signal output by the oscillator 13. If required, a reference frequency signal may have its frequency multiplied or divided using a frequency multiplier/divider.

A CW output by the light source 11 is input to the optical data modulator 21. The CW is then modulated by a data signal with a bit rate B output by the data signal generator 32. The modulated light is then input to the optical intensity modulator 12. The optical intensity modulator 12 is driven by a repetition signal of period T/2 mB output by the oscillator 13. It thus generates optical pulses that have their phase inverted within one bit of a signal. The optical pulses are input to the orthogonal polarization delay unit 20. The orthogonal polarization delay unit 20 generates signal light with a zero degree of polarization in which each pulse is polarized orthogonally to the succeeding pulse within one bit of a signal because of the configuration shown in FIGS. 7A and 7B.

With the present configuration, as shown in FIG. 15B (in the case of m=2), signal light traveling in the direction of Z axis always has the same relative temporal position within one bit to be sampled together with X and Y polarization components without slippage. This eliminates the adverse effects of jitters caused by a frequency difference, from the waveform of a received signal obtained after photodetector. Further, phase synchronization enables the simultaneous elimination of adverse effects of jitters resulting from a phase difference. In this regard, a clock signal extracted from one of the signals may be used instead of the reference frequency signal supplied by the reference frequency generator 33.

First Optical Network

An embodiment of a first optical network according to the present invention will be described below in detail with reference to the drawings. In the drawings, components having similar functions are denoted by the same reference numerals.

The polarization scramblers described above with reference to FIGS. 1A–1B, 3A–3C and FIGS. 6A to 15B are applicable to the first optical network, described later.

(First Embodiment)

Figure 16:
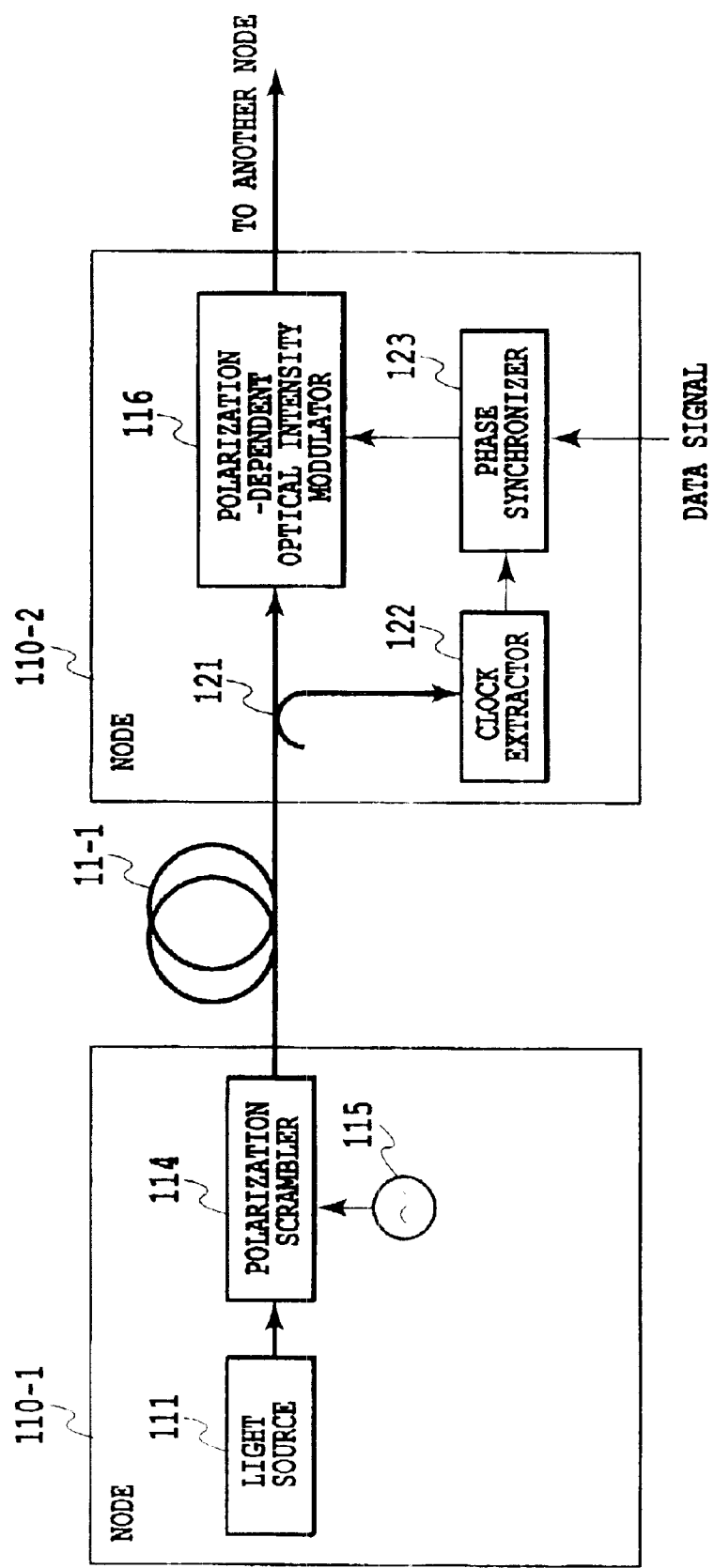
FIG. 16 is a diagram showing a first embodiment of a first optical network according to the present invention.

FIG. 16 shows a first embodiment of the first optical network of the present invention. In this case, an optical transmission system operating between two nodes will be described by way of example. In this figure, the light source 111, polarization scrambler 114, and oscillator 115 arranged at the node 110-1, and the polarization-dependent optical intensity modulator 116 arranged at the node 110-2 and connected to the node 110-1 via the optical fiber 11-1 are similar to those shown in FIG. 4B. The present embodiment is also provided with a node 110-2, an optical splitter 121, a clock extractor 122, and a phase synchronizer 123.

A CW output by the light source 111 is input to the polarization scrambler 114, driven by a sinusoidal signal from the oscillator, and is output as scrambled light with a zero degree of polarization. This scrambled light is transmitted from the node 110-1 to the node 110-2 via the optical fiber 11-1. The light is then split by the optical splitter 121. One of the scramble beams obtained is input to the clock extractor 121. The clock extractor 121 then extracts a clock electric signal having a frequency n (n is a natural number) times as high as that of a sinusoidal signal driving the polarization scrambler 114. This clock electric signal is input to the phase synchronizer 123. The phase synchronizer 123 then synchronizes a data signal bit rate clock input from the exterior of the node 110-2, to the extracted clock electric signal. The data signal synchronized to the sinusoidal signal driving the polarization scrambler 114 is input to the polarization-dependent optical intensity modulator 116. Using the input signal, the polarization-dependent optical intensity modulator 116 modulates the other scrambled beam from the optical splitter 121 and then outputs the modulated signal.

With this configuration, if a polarization scrambler without any temporal variations in intensity, e.g. the one shown in FIGS. 1A–1B and 3A–3C and using phase modulation is used, a clock electric signal can be extracted by injecting local light into scrambled light for heterodyne detection.

Thus, the data signal bit rate clock input to the polarization-dependent optical intensity modulator 116 can be synchronized to the sinusoidal signal driving the polarization scrambler 114. This suppresses jitters in modulated signal light output by the polarization-dependent optical intensity modulator 116.

(Second Embodiment)

Figure 17:
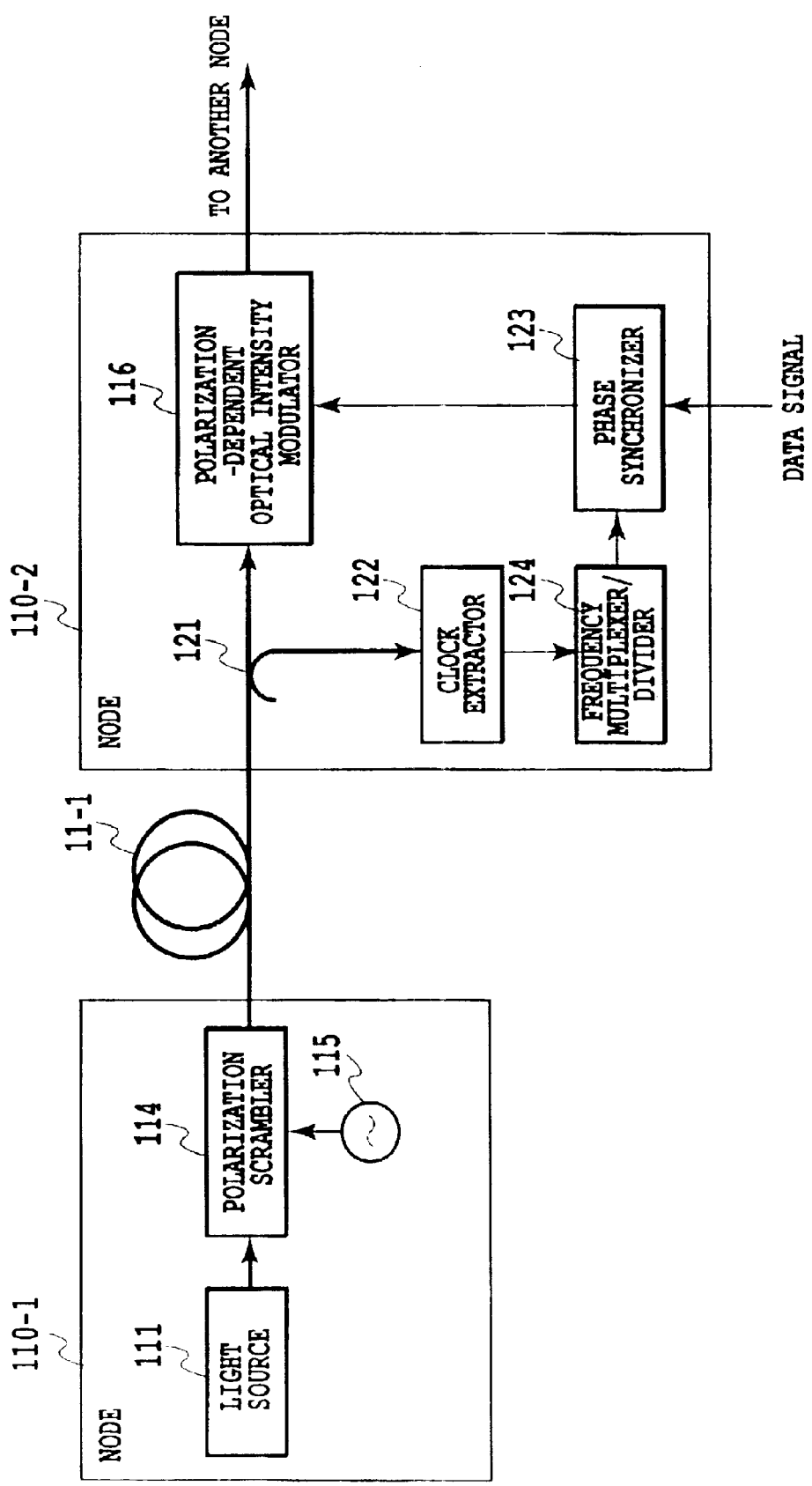
FIG. 17 is a diagram showing a second embodiment of the first optical network according to the present invention.

FIG. 17 shows a second embodiment of the first optical network of the present invention. The present embodiment is characterized in that at the node 110-2 according to the first embodiment, a frequency multiplier/divider 124 is arranged between the clock extractor 122 and the phase synchronizer 123 to multiply or divide the frequency of a clock electric signal. The configuration of the node 110-1 is similar to that in the first embodiment.

(Third Embodiment)

Figure 18:
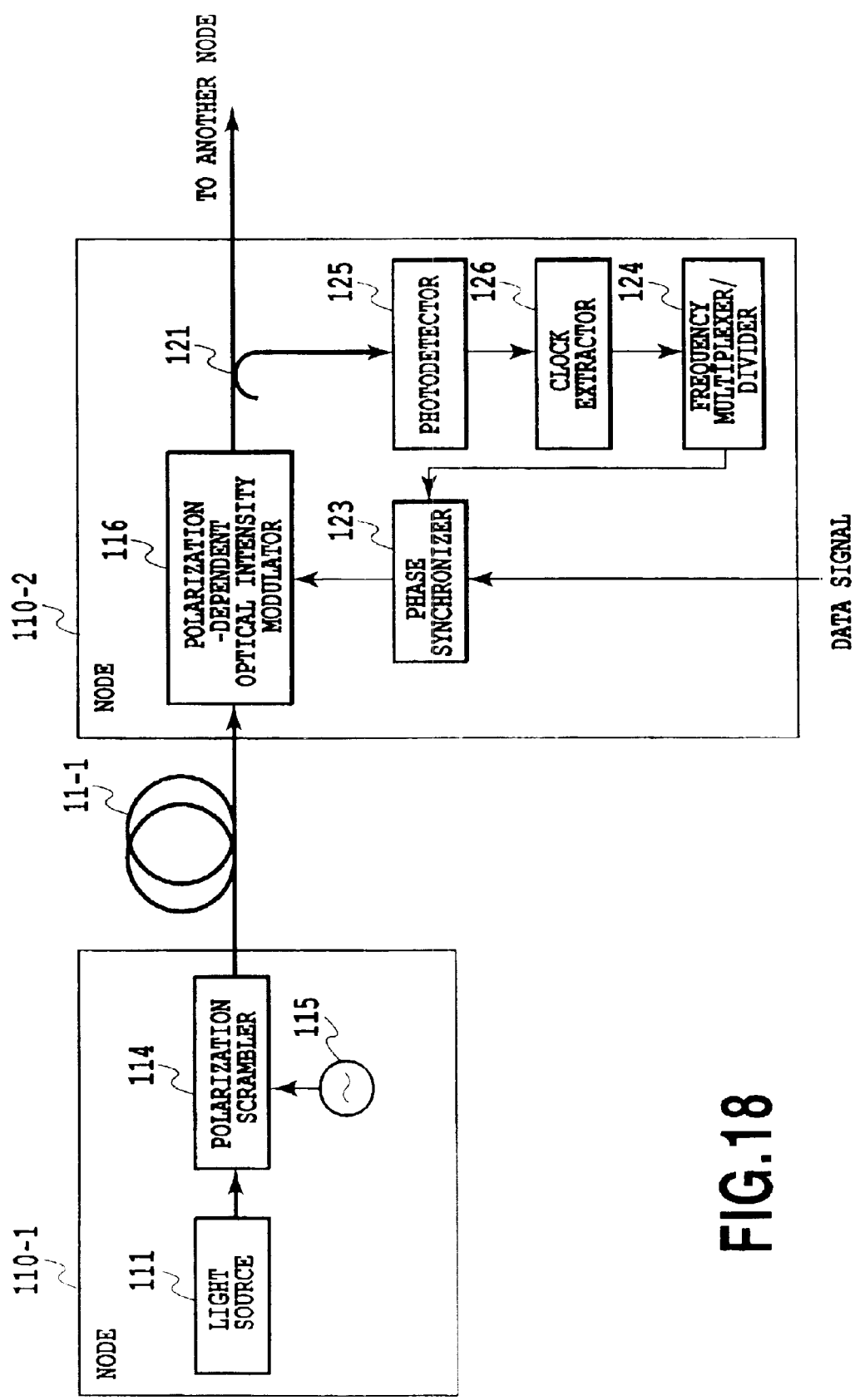
FIG. 18 is a diagram showing a third embodiment of the first optical network according to the present invention.

FIG. 18 shows a third embodiment of the first optical network of the present invention. The present embodiment is characterized in that at the node 110-2 according to the second embodiment, the optical splitter 121 is provided in front of the polarization-dependent optical intensity modulator 116 and a photodetector 125 converts signal light from the optical splitter into an electric signal so that a clock extractor 126 extracts a clock electric signal. The configuration of the node 110-1 is similar to that in the first embodiment.

With this configuration, even if a polarization scrambler without any temporal variations in intensity, e.g. the one shown in FIGS. 1A–1B and 3A–3C and using phase modulation is used, an output from the polarization-dependent optical intensity modulator 116 has its intensity modulated (this intensity modulation is different from that carried out by a data signal) owing to its polarization dependency. As a result, a clock electric signal can be extracted easily from an output electric signal from the photodetector 125.

(Fourth Embodiment)

Figure 19:
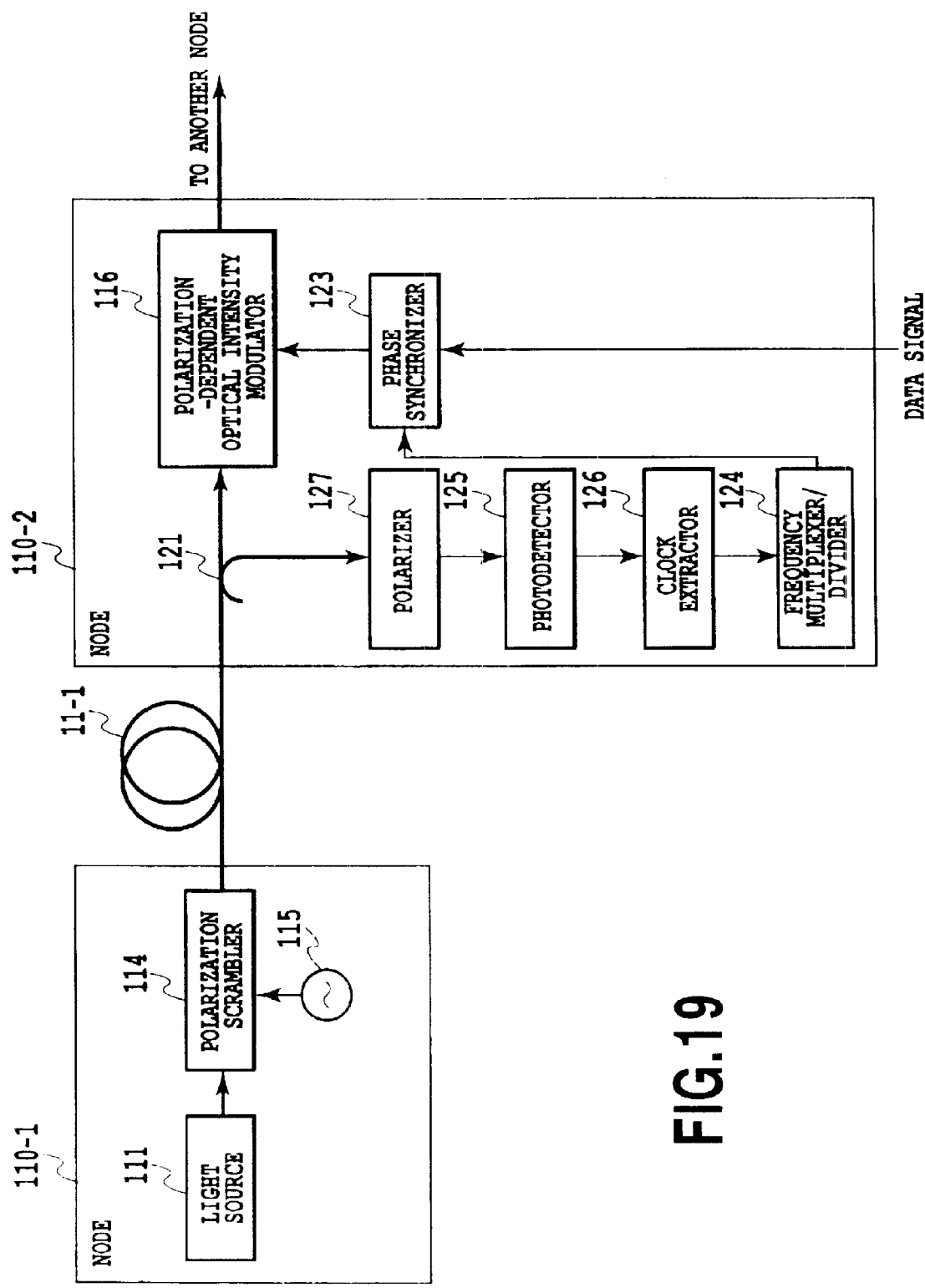
FIG. 19 is a diagram showing a fourth embodiment of the first optical network according to the present invention.

FIG. 19 shows a fourth embodiment of the first optical network of the present invention. The present embodiment is characterized in that at the node 110-2 according to the second embodiment, a polarizer 127 is inserted between the optical splitter 121 and the photodetector 125 so that the photodetector 125 can convert scrambled light from the optical splitter 121 preceding the polarization-dependent optical intensity modulator 116, into an electric signal and so that the clock extractor 126 can then extract a clock electric signal. The polarizer 127 allows single polarization of the scrambled light to pass through. Accordingly, output light from the polarizer 127 is always subject to intensity modulation according to the frequency of the scrambled light. Consequently, even if for example, the polarization scrambler shown in FIGS. 1A–1B and 3A–3C and using phase modulation is used, a clock electric signal can be extracted easily from an output electric signal from the photodetector 125.

(Fifth Embodiment)

Figure 20:
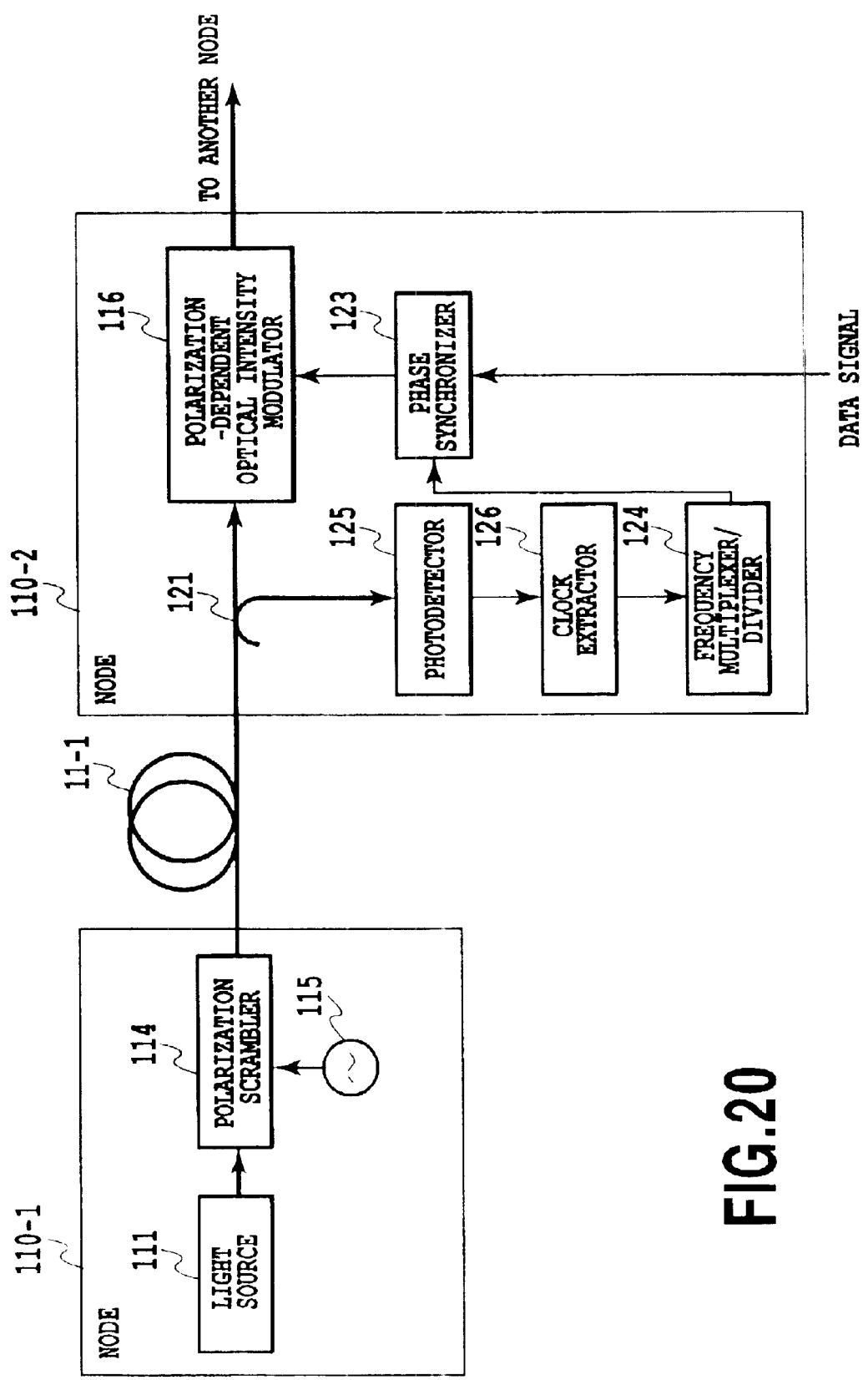
FIG. 20 is a diagram showing a fifth embodiment of the first optical network according to the present invention.

FIG. 20 shows a fifth embodiment of the first optical network of the present invention. According to the present embodiment, at the node 110-2 according to the fourth embodiment, by limiting the configuration of the polarization scrambler 114, a clock electric signal can be extracted using the photodetector 125 and the clock extractor 126 and without using the polarizer 127. An example of configuration of the polarization scrambler 114 used in this embodiment will be shown below.

(First Example of Configuration of Polarization Scrambler)

Figure 21A:
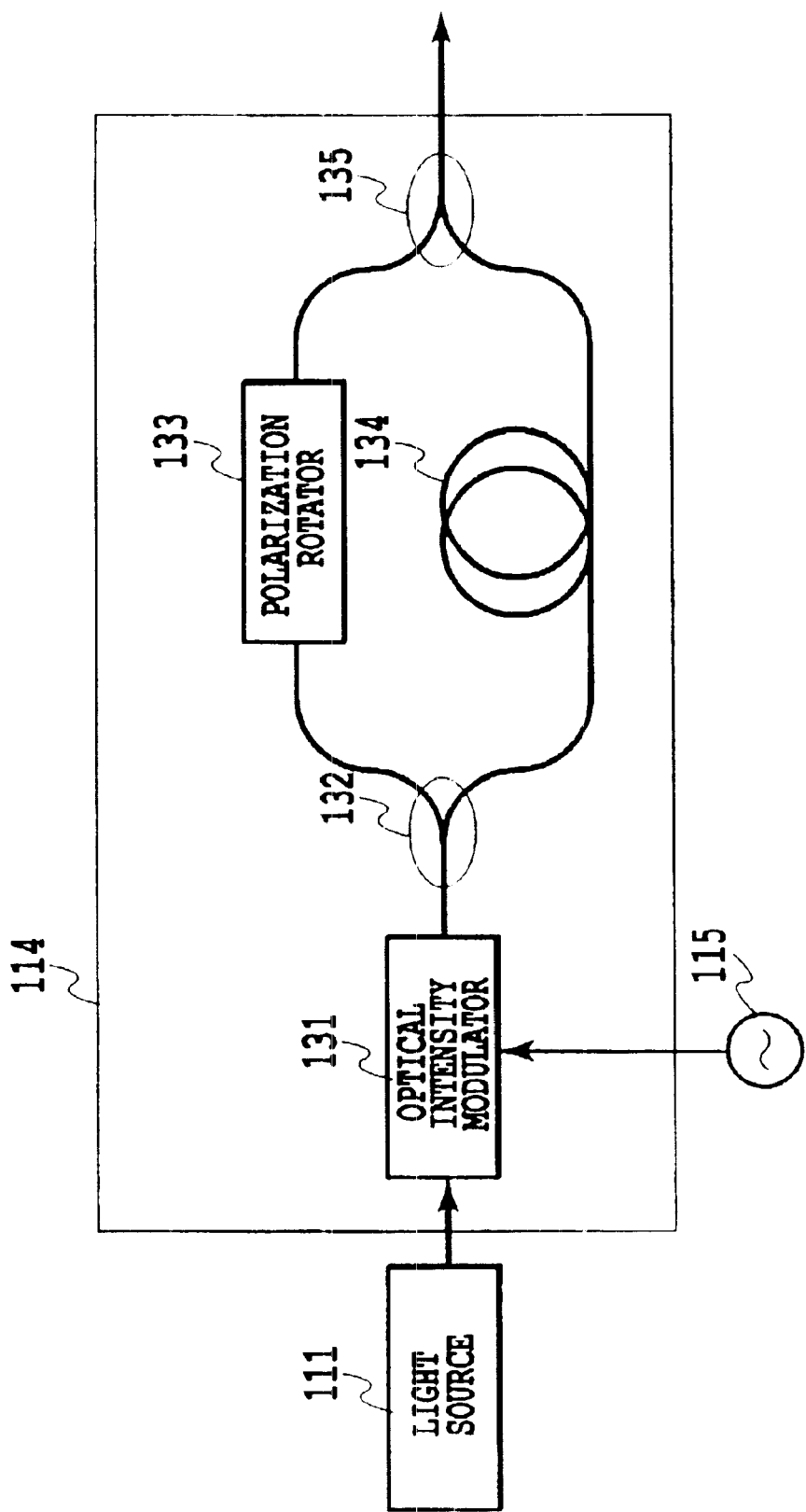

FIGS. 21A, 21B, and 21C show an example of configuration of the polarization scrambler 14 according to the fifth embodiment.

In these figures, the polarization scrambler 114 is composed of an optical intensity modulator 131 that modulates a CW from the light source 111 using a sinusoidal signal from the oscillator 115, an optical splitter 132 that splits each output optical pulse from the optical intensity modulator 131 into two pieces, a polarization rotator 133 that makes the polarization of the two optical pulses orthogonal to each other, a delay line 134 that relatively shifts the temporal position of one of the two pulses from that of the other pulse by $(2n-1)T/2$ (n is a natural number), and an optical multiplexer 24 that multiplexes the optical pulses with their polarization and temporal positions described above. In this case, the polarization scrambler 133 is arranged in one of the paths obtained by the splitting, while the delay line 134 is arranged in the other path. However, instead of this relative arrangement, the polarization rotator 133 and the delay line 134 may both be arranged in one of the two paths.

The optical intensity modulator 131 modulates a CW from the light source 111 using a sinusoidal signal from the oscillator 115, to output optical pulses (for example, FIG. 21B) with the repetition period T the temporal positions of which are sufficiently separated from one another. The arrangements succeeding the optical splitter 132 receive and separate each of the optical pulses into two pieces. Then, they relatively shift the temporal position of one of the two optical pulses from the temporal position of the other optical pulse by $(2n-1)T/2$ to generate scrambled light (for example, FIG. 21C) in which each pulse is polarized orthogonally to the succeeding pulse. This scrambled light has its intensity temporally modulated. Accordingly, a clock electric signal can be extracted easily from an output from the photodetector 125 at the node 110-2. Further, this scrambled light has a zero degree of polarization. The reason will be described below.

Equations (1), (2), and (9) to (16) are applied, which have been described in the chapter "Conventional Polarization Scrambler", previously described, as a "third example of configuration of the polarization scrambler" (Reference 4: M. Born and E. Wolf, Principle of Optics, 4th ed, London: Pergamon Press, 1970, chapter 10.8, pp.809–816 formula (27)).

The orthogonally polarized components of the scrambled light now have their power evenly split by the optical splitter 132, and Conditional Expression (10) is thus met. Accordingly, the scrambled light has a zero degree of polarization provided that Conditional Expression (9) holds water. Actually, in the scrambled light, there is no temporal overlapping between optical pulses each of which is polarized orthogonally to the succeeding optical pulse. Consequently, $a_1(t) \times a_2(t)$ is zero at all points of time regardless of the phase of the optical pulses. Therefore, Conditional Expression (9) is established, thus indicating that the scrambled light has a zero degree of polarization.

(Second Example of Configuration of Polarization Scrambler)

Figure 22A:
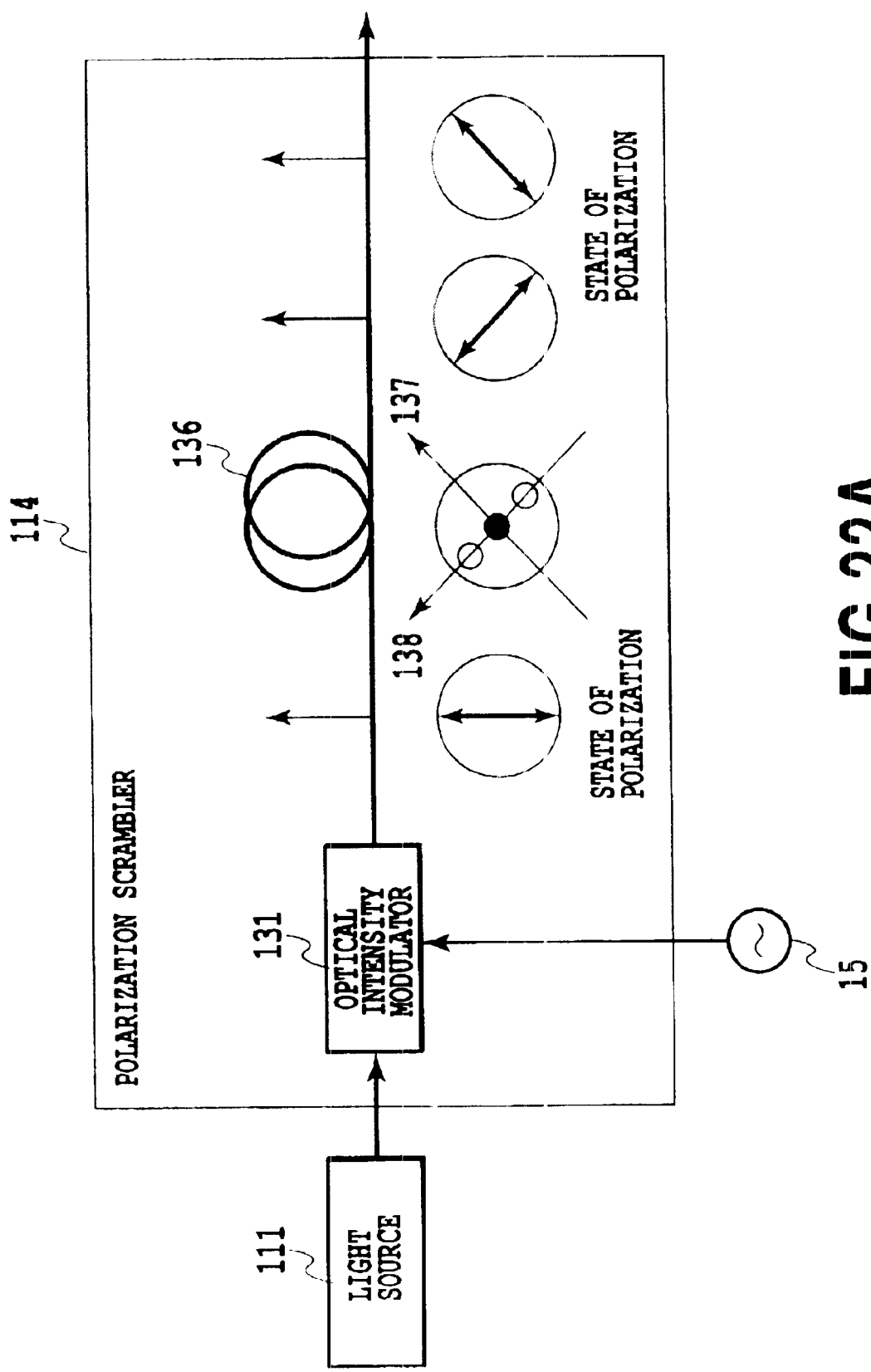
FIGS. 22A to 22C are diagrams showing a second example of configuration of the polarization scrambler 14 according to the fifth embodiment.
Figure 22B:
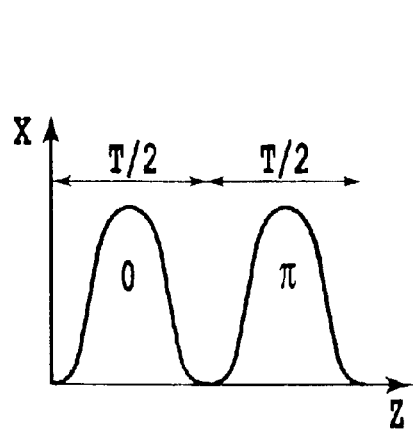
Figure 22C:
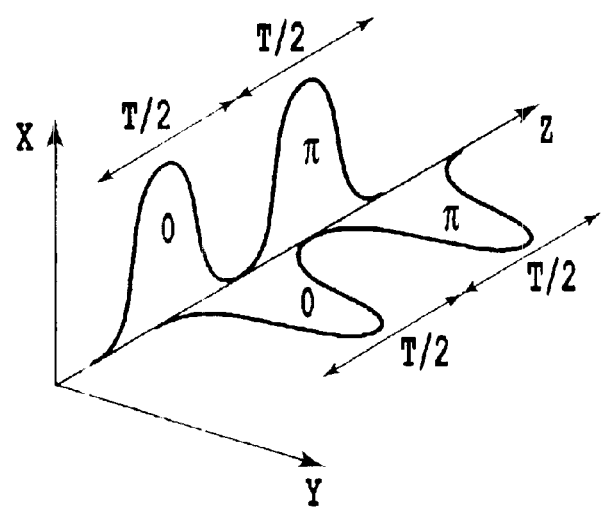

FIGS. 22A, 22B, and 22C show a second example of configuration of the polarization scrambler 114 according to the fifth embodiment.

In these figures, the polarization scrambler 114 is composed of the optical intensity modulator 131 that modulates a CW from the light source 111 using a sinusoidal signal from the oscillator 115, and a polarization maintaining fiber 136 that receives output optical pulses from the optical intensity modulator 131. The optical intensity modulator 131 generates optical pulses with the repetition period T (FIG. 22B) in which the same intensity waveform is repeated every repetition period T/2 and in which phase is inverted every repetition period T/2. The optical pulses are input so that the ratio of power to a fast axis 137 of the polarization maintaining fiber 136 and power to its slow axis 138 is 1:1. The length of the polarization maintaining fiber 136 is set so as to provide a delay (2n−1)T/4 between optical pulses passed through the fast axis 137 and the slow axis 138. As a result, one optical pulse is separated into two optical pulses with orthogonal SOP. Therefore, light is generated so that each pulse is polarized orthogonally to the succeeding pulse as shown in FIG. 22C.

Figure 23:
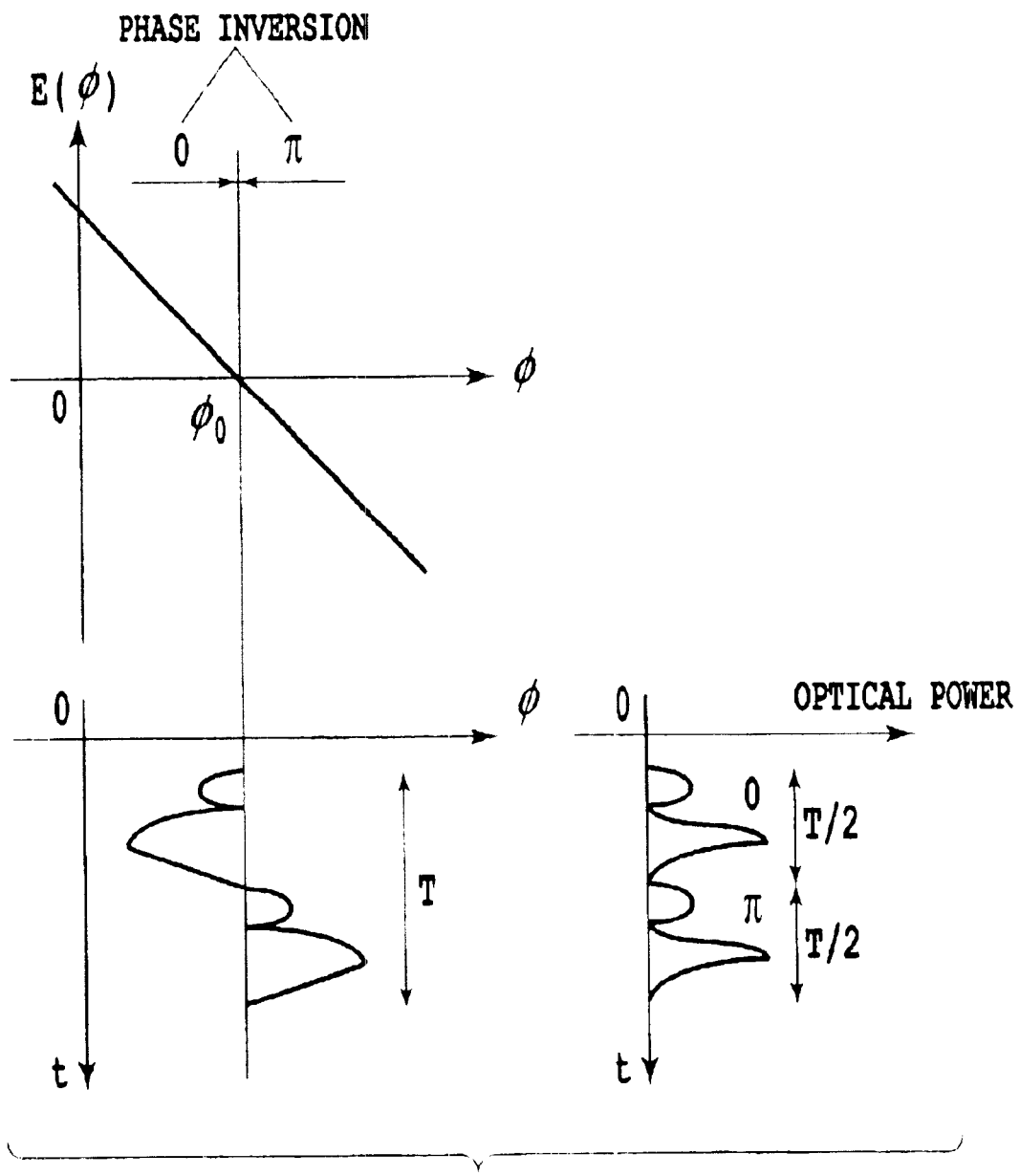
FIG. 23 is a chart showing the transmission characteristics of an optical intensity modulator 31.

For example, as shown in FIG. 23, the optical intensity modulator 131 has the input signal $\phi(t)$ and such a transmission characteristic that for the particular input signal $\phi_0$, output electrical fields are expressed by:

$$E(\phi(t)-\phi_0) = -E(-\phi(t)-\phi_0).$$

Further, the optical intensity modulator 131 is driven by the input signal $\phi(t)$ having such a repetition period T that:

$$\phi(t)-\phi_0 = \phi(t-T)-\phi_0 = -\phi(t-T/2)-\phi_0.$$

That is, the optical intensity modulator 131 has equal transmission characteristic absolute values around $\phi_0$. It thus uses the input signal $\phi(t)$ of the repetition period T, output by the oscillator 115, to generate optical pulses with a period of T/2 (a period of T if the electrical fields are included).

An output from the polarization scrambler has a zero degree of polarization even if the pulses temporally overlap each other. The reason will be described below. First, optical pulses are incident on the polarization maintaining fiber 136 at an angle of 45° with the fast and slow axes 137 and 138.

Accordingly, the orthogonally polarized optical pulses have equal power, and Conditional Expression with a zero degree of polarization (16) is thus met. Further, if it is assumed $\phi_0=0$ for simplification, then Equation (24) is applied, which has been described in the chapter "Conventional Polarization Scrambler", previously described, as a "third example of configuration of the polarization scrambler". Then, the same results are produced, indicating a zero degree of polarization. This calculation involves substitution expressions $$t' = t-T/4, \; t'' = t-T/2, \text{ and } t''' = t-3T/4.$$

With such a polarization scrambler, the scrambled light has a zero degree of polarization even of its optical pulses temporally overlap each other. Therefore, such a polarization scrambler reduces a modulation loss (pulse loss) in the optical intensity modulator 131 compared to the polarization scrambler according to the first example of configuration.

(Third Example of Configuration of Polarization Scrambler)

Figure 24A:
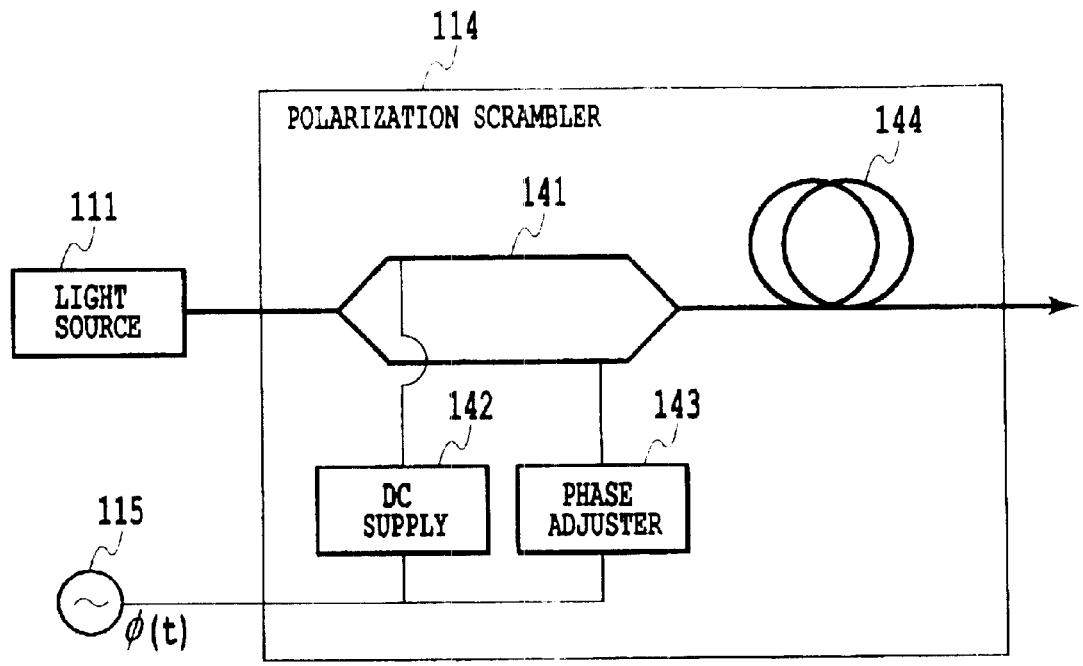
FIGS. 24A and 24B are diagrams showing a third example of configuration of the polarization scrambler 14 according to the fifth embodiment.
Figure 24B:
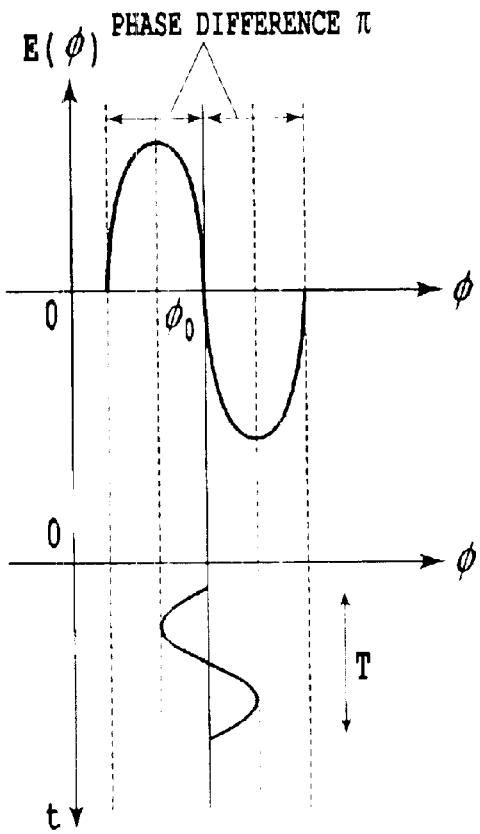

FIGS. 24A and 24B show a third example of configuration of the polarization scrambler 114 according to the fifth embodiment.

In these figures, the polarization scrambler 114 is composed of a Mach Zehnder type optical intensity modulator 14 that receives a CW from the light source 11, a DC supply 142 and a phase adjuster 143 that receive a sinusoidal signal from the oscillator 115 and output a signal driving the Mach Zehnder type optical intensity modulator 141, and a polarization maintaining fiber 144 that receives output optical pulses from the Mach Zehnder optical intensity modulator 141.

Operations of the Mach Zehnder type optical intensity modulator 141, DC supply 142, and phase adjuster 143 are similar to those described for the "third example of configuration of the optical pulse generator 10" in the chapter "Conventional Polarization Scrambler", previously described with reference to FIGS. 11A and 11B. In particular, when two paths are subjected to phase modulation using signals with an equal magnitude and opposite phases (opposite signs), a sinusoidal electrical field transmission characteristic such as the one shown in FIG. 24B is obtained. Optical pulses generated are input to the polarization maintaining optical fiber 144 and converted into scrambled light in which each pulse is polarized orthogonally to the succeeding pulse as in the case with the second example of configuration.

As shown in the fifth embodiment, the polarization scrambler 114 must be configured as shown in FIGS. 21A to 24B so that photodetector 125 can convert scrambled light from the optical splitter 121, arranged in front of the polarization-dependent optical intensity modulator 116, into an electric signal and so that the clock extractor 126 can then extract a clock electric signal. This is because a polarization scrambler using phase modulation does not temporally vary the intensity, so that photoelectric conversion of scrambled light does not allow a clock electric signal to be extracted from an output electric signal.

(Sixth Embodiment)

Figure 25:
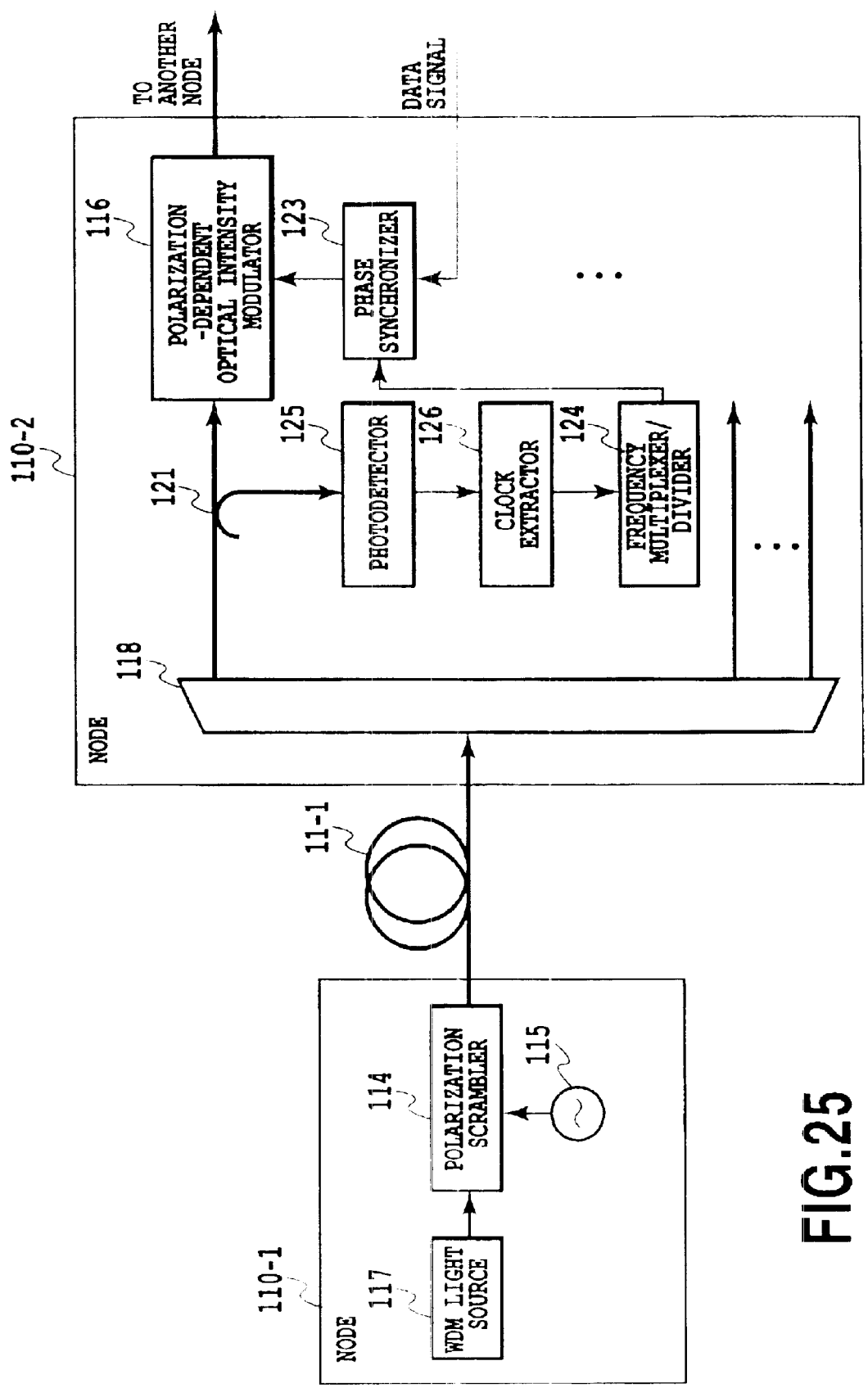
FIG. 25 is a diagram showing the fifth embodiment of the first optical network according to the present invention.

FIG. 25 shows a sixth example of configuration of the first optical network of the present invention. In the present embodiment, a WDM light source 117 that generates CW with the respective wavelengths is used in place of the light source 111 at the node 110-1 according to the fifth embodiment (FIG. 20). Then, the polarization scrambler 114 converts the CW with the respective wavelengths together into scrambled beams with a zero degree of polarization. At the node 110-2, the optical splitter 118 splits each of the scrambled beams with the respective wavelengths to extract a clock electric signal as in the case with the fifth embodiments. Then, the data signal bit rate clock is synchronized to the clock electric signal. In addition, any of the above embodiments may also be used as a configuration in which the polarization scrambler 114 and the node 110-2 extract a clock electric signal.

(Seventh Embodiment)

Figure 26:
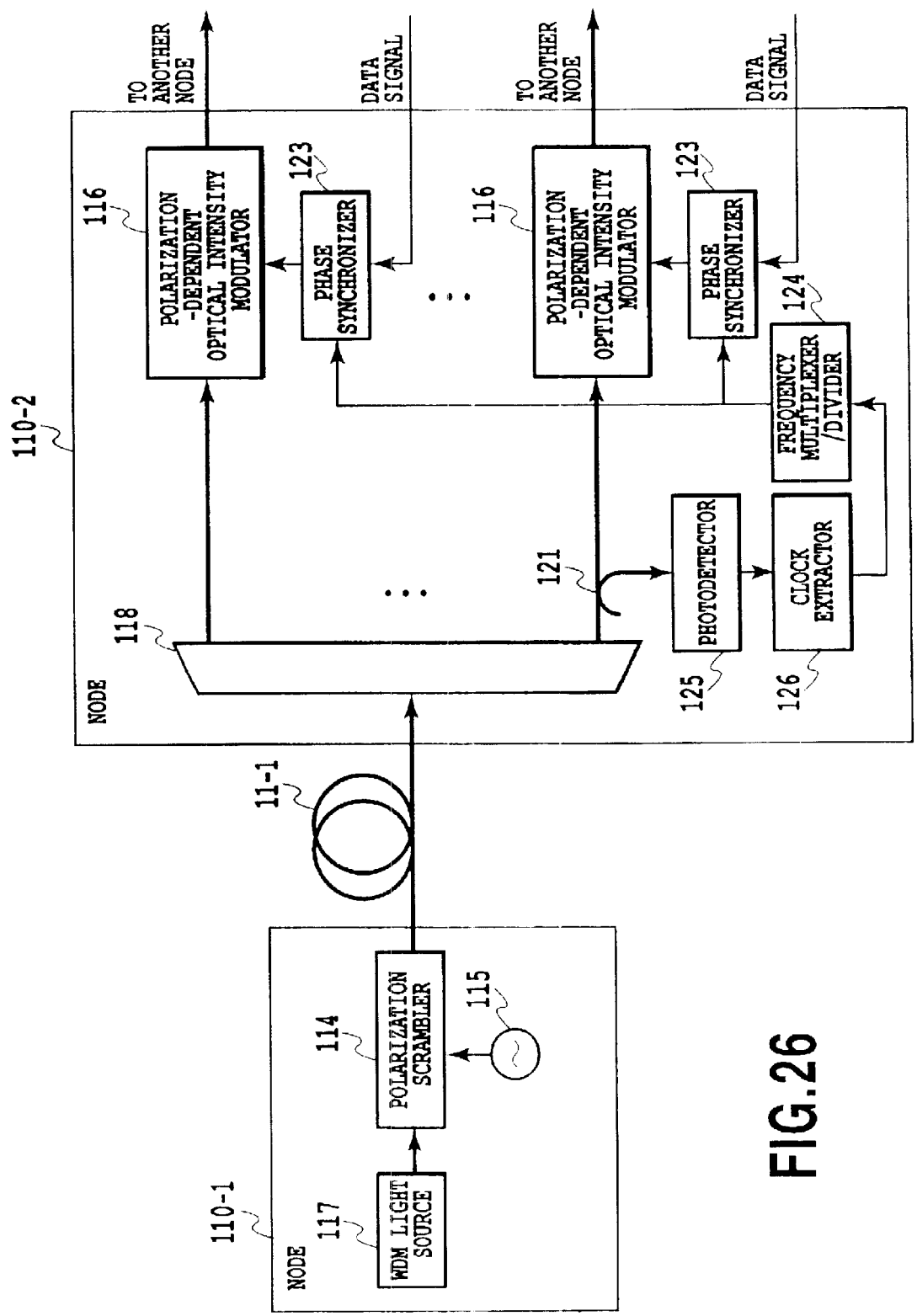
FIG. 26 is a diagram showing a sixth embodiment of the first optical network according to the present invention.

FIG. 26 shows a seventh embodiment of the first optical network of the present invention.

The configuration in the sixth embodiment extracts a clock electric signal for each wavelength and then subjects it to phase modulation. However, in the present embodiment, clock electric signals are extracted from scrambled beams with the respective wavelengths from the optical splitter 118. The clock electric signals are then distributed to the phase synchronizers 123 for the respective wavelengths and are synchronized to the data signal bit rate clock. In addition, any of the above embodiments may also be used as a configuration in which the polarization scrambler 114 and the node 110-2 extract a clock electric signal.

Second Optical Network

An embodiment of a second optical network according to the present invention will be described below in detail with reference to the drawings. In the drawings, components having similar functions are denoted by the same reference numerals.

The polarization scramblers described above with reference to FIGS. 1A–1B, 3A–3C, and FIGS. 6A to 15B are applicable to the second optical network, described later.

(First Embodiment of Second Optical Network)

Figure 27:
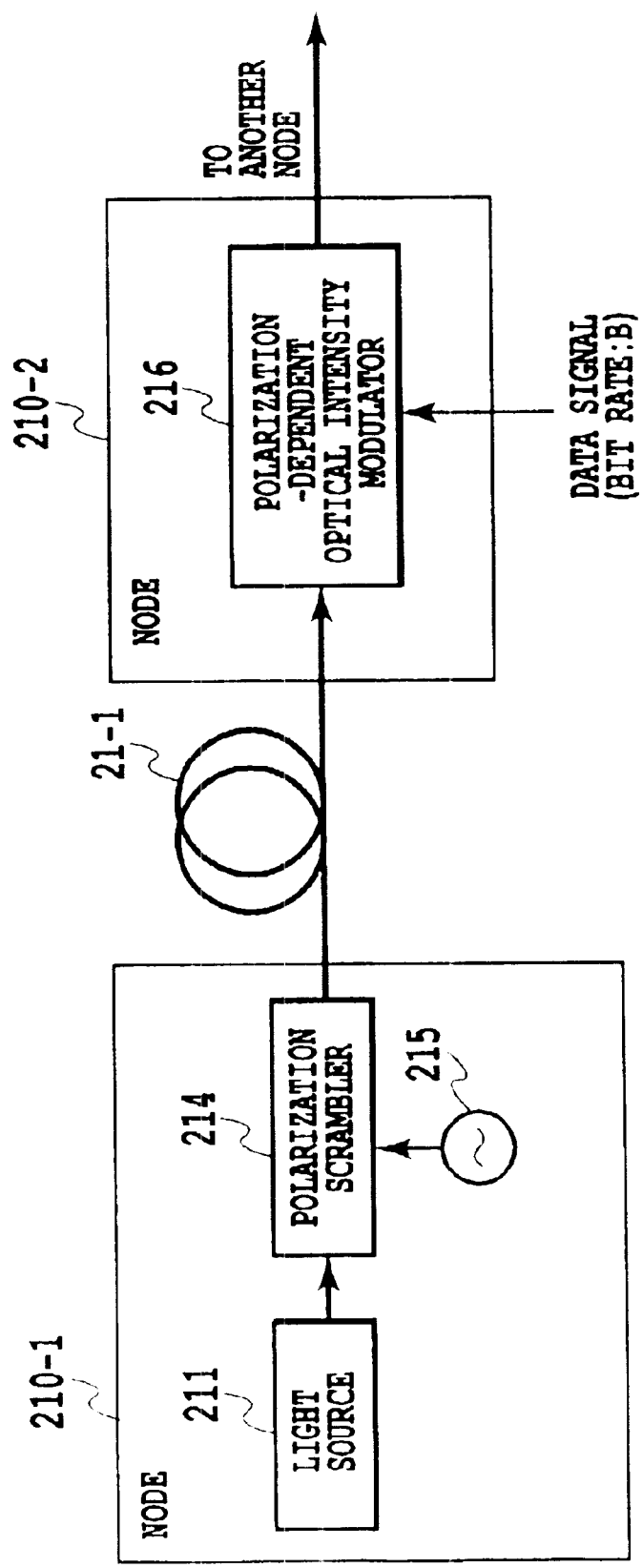
FIG. 27 is a diagram showing a first embodiment of a second optical network according to the present invention.

FIG. 27 shows a first embodiment of the second optical network of the present invention. In this case, an optical transmission system operating between two nodes will be described byway of example. In this figure, alight source 211, a polarization scrambler 214, and an oscillator 215 arranged at a node 210-1, and a polarization-dependent optical intensity modulator 216 arranged at a node 210-2 and connected to the node 210-1 via an optical fiber 21-1 are similar to those shown in FIG. 4B.

However, in the present embodiment, a data signal from the node 210-2 has a bit rate B (bps). Further, a sinusoidal signal from the oscillator 215 which drives the polarization scrambler 214 at the node 210-1 and a data signal are asynchronous. Furthermore, the polarization scrambling frequency $f_{sc}$ of scrambled light is set so that $B \leq f_{sc} < 2B$.

Figure 28:
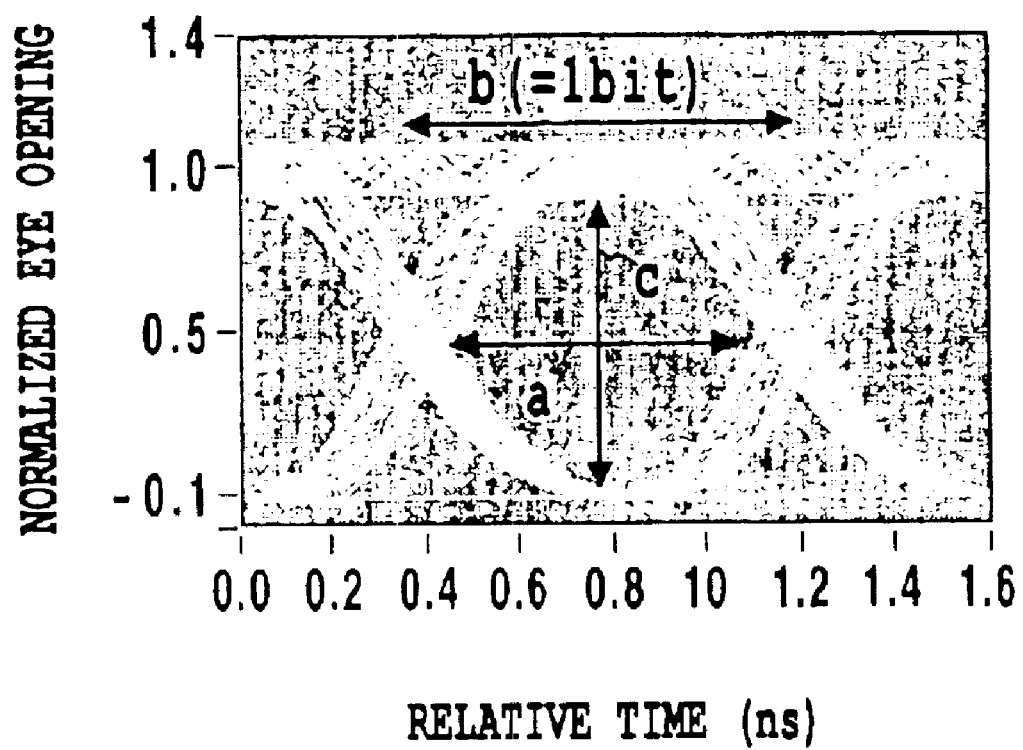
FIG. 28 is a diagram showing an example of calculations for an eye diagram according to the first embodiment.

FIG. 28 shows an eye diaphragm (pseudo random pattern=$2^{7-1}$) obtained if the optical phase modulator shown in FIG. 1B is used as the polarization scrambler 214 in the present embodiment. However, an output from the polarization scrambler is assumed to have a zero degree of polarization. A sinusoidal signal driving the polarization scrambler is assumed to have a frequency of 2.48 GHz. A data signal is assumed to have a bit rate of 1.25 Gbit/s. It is further assumed that a received electric signal is passed through a low pass filter whose 3 dB bandwidth is seven-tenths of the bit rate of the data signal. Even if the configuration shown in FIGS. 3A to 3C is used as the polarization scrambler 214, a similar eye diagram is obtained because there is no principle difference between these two configurations.

The frequency of the sinusoidal signal is reduced by 0.02 GHz from 2.5 GHz, which is double that of the data signal bit rate, in order to simulate the asynchronous operation of these signals. The SOP of light incident on the polarization-dependent optical intensity modulator 216 is selected so that a and c, defined in the figure, are smallest. Further, as is apparent from the figure, because of the asynchronization between the sinusoidal signal frequency and the data signal bit rate clock, the output eye diagram shows a certain eye opening in spite of jitters occurring in the diaphragm in the direction of a time axis. To avoid these jitters, it is possible to match the frequency of the sinusoidal wave driving the polarization scrambler with a natural number multiple of that of the data signal bit rate clock to synchronize these signals to each other. However, this is not carried out in this case.

Figure 29:
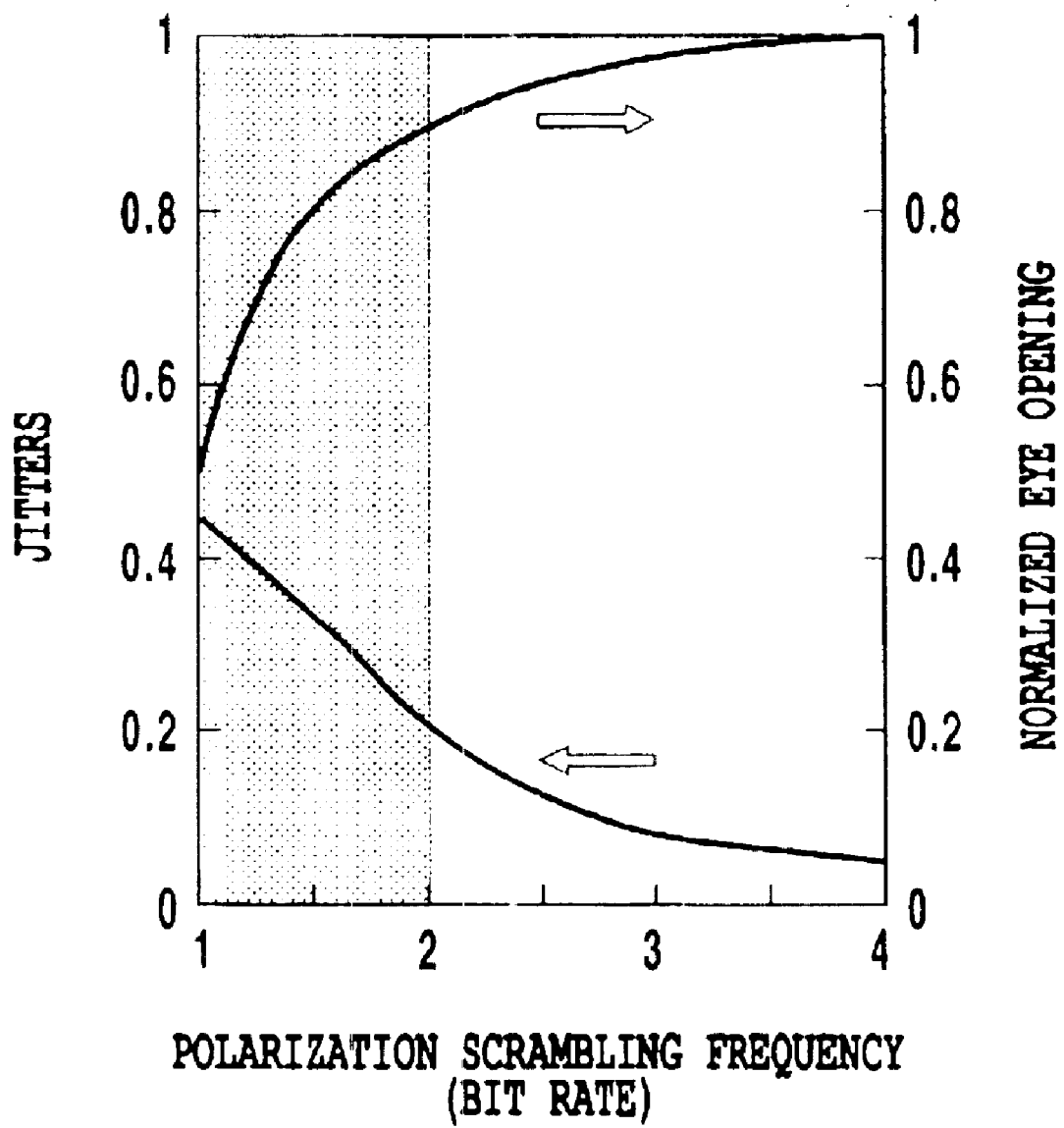
FIG. 29 is a chart showing an example of calculations for jitters and eye opening vs. polarization scrambling frequency.

FIG. 29 shows the results of calculations for jitters (=(b−a)/b) and a normalized eye opening (=a) observed when the polarization scrambling frequency (=sinusoidal signal frequency) $f_{sc}$ is varied so that $B \leq f_{sc} < 4B$. The figure indicates that a and c are ensured to have certain large values even if the polarization scrambling frequency is lower than the double of that of the data signal bit rate clock. This in turn indicates that the data signal can be received even if the polarization scrambling frequency $f_{sc}$ is set so that $B \leq f_{sc} < 2B$.

(Example of Configuration of Polarization Scrambler)

Figure 30A:
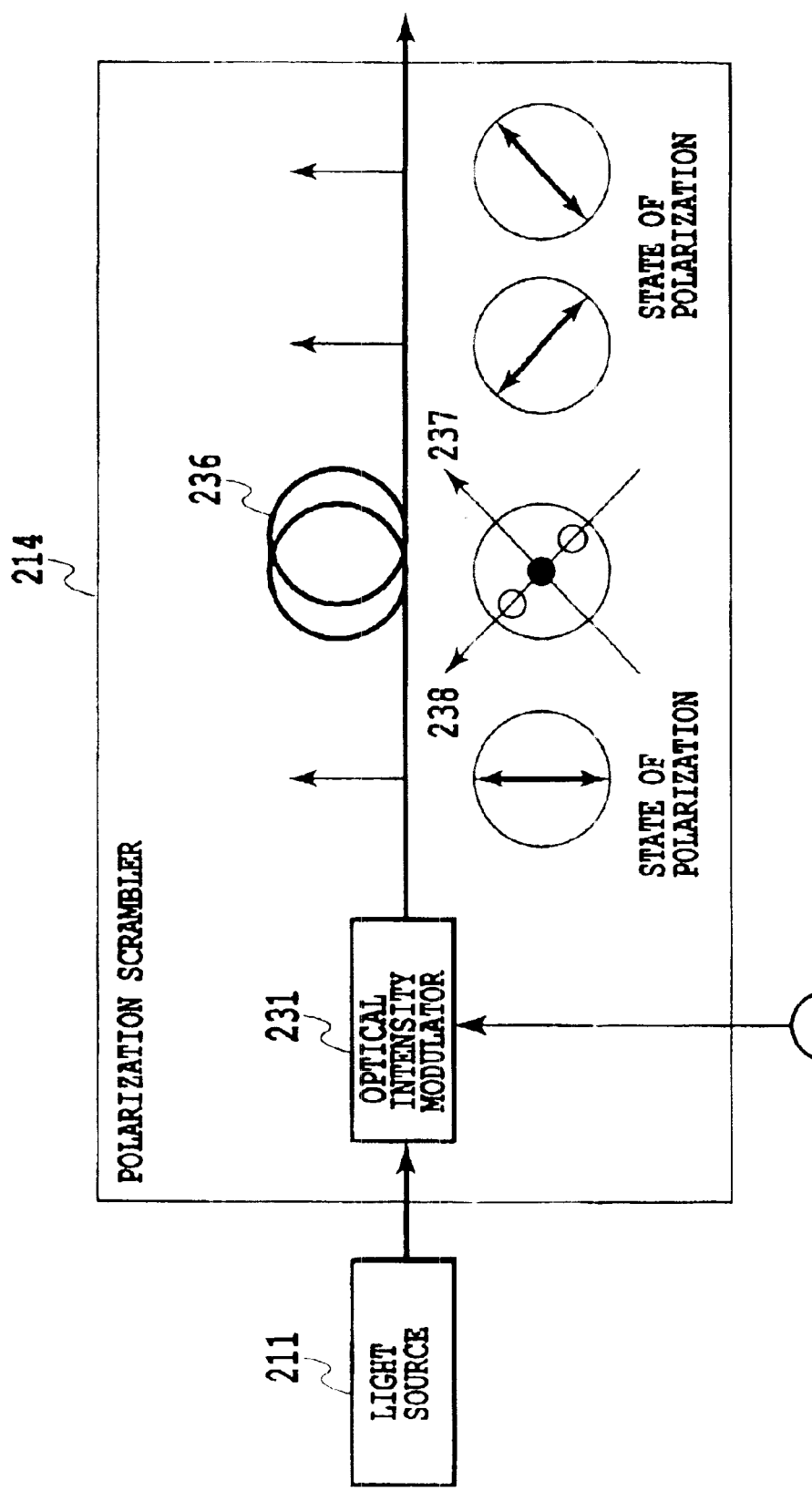

FIGS. 30A, 30B, and 30C show an example of basic configuration of the polarization scrambler 214. The polarization scrambler shown below is similar to those proposed in the chapters "Polarization Scrambler" and "First Optical Network", described above.

Figure 31:
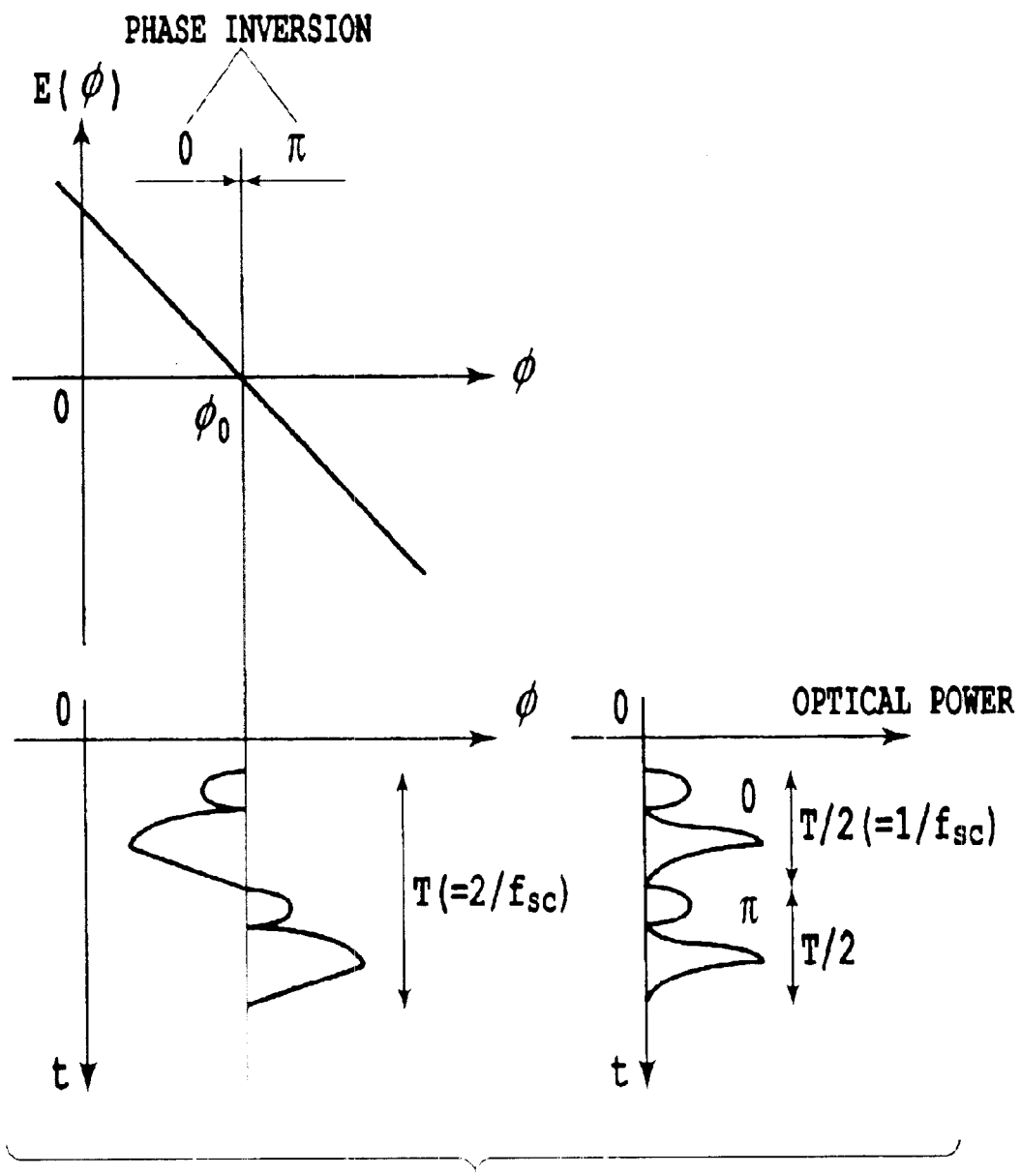
FIG. 31 is a chart showing the transmission characteristics of the optical intensity modulator 31.

In these figures, the polarization scrambler 214 is composed of an optical intensity modulator 131 that modulates a CW from the light source 111 using a sinusoidal signal from an oscillator 215, and a polarization maintaining fiber 236 that receives output optical pulses from the optical intensity modulator 231. The optical intensity modulator 231 is driven by a sinusoidal signal from the oscillator 215 to output optical pulses with the repetition period T/2 (=$1/f_{sc}$) in which electrical fields are inverted every pulse as shown in FIG. 30B. The optical pulses are incident at an angle of 45° with a fast axis 237 and slow axis 238 of the polarization maintaining fiber 236 (power ratio: 1:1). The length of the polarization maintaining fiber 236 is set so as to provide a delay (2n−1)T/4 between optical pulses passed through the fast axis 237 and the slow axis 238 (n is a natural number). As a result, one optical pulse is separated into two optical pulses with orthogonal states of polarization. Therefore, light is generated so that each pulse is polarized orthogonally to the succeeding pulse as shown in FIG. 30C. In this case, to realize the optical pulses shown in FIG. 30B, for example, the optical intensity modulator 231 having the input signal φ(t) and such a transmission characteristic that for the particular input signal $φ_0$, output electrical fields are expressed by $E(φ(t)−φ_0)=−E(−φ(t)−φ_0)$ may be driven by a signal with the repetition period T (=$2/f_{sc}$) repeated around $φ_0$, as shown in FIG. 31. As described above in the chapter "Polarization Scrambler", the DOP of the output scrambled light can be zeroed even with temporal overlapping between its optical pulses.

Figure 32A:
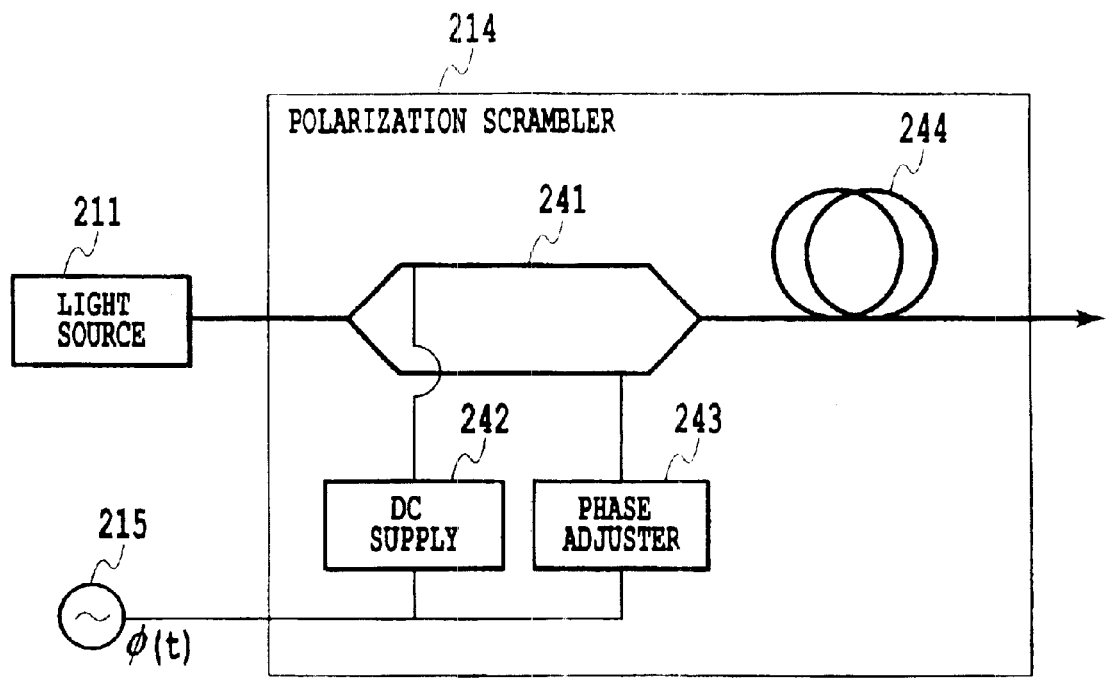
FIGS. 32A and 32B show an example of configuration of the polarization scrambler 14.
Figure 32B:
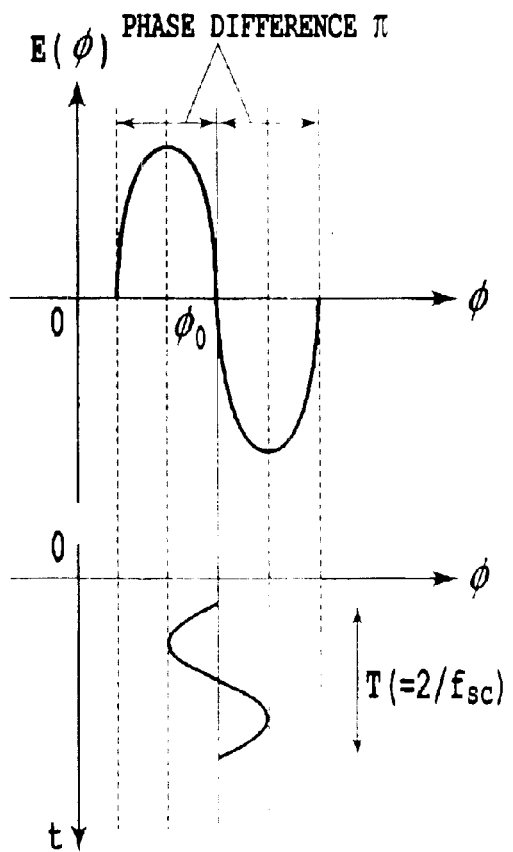

FIGS. 32A and 32B show an example of configuration of the polarization scrambler 214.

In these figures, the polarization scrambler 214 is composed of a Mach Zehnder type optical intensity modulator 241 that receives a CW from the light source 211, a DC supply 242 and a phase adjuster 243 that receive a sinusoidal signal from the oscillator 215 and output a signal driving the Mach Zehnder type optical intensity modulator 241, and a polarization maintaining fiber 244 that receives output optical pulses from the Mach Zehnder optical intensity modulator 241.

The Mach Zehnder type optical intensity modulator 241 receives an input CW from the light source 211 and carries out amplitude modulation according to a relative phase difference applied to the paths into which optical power is evenly split. In particular, if the two paths are subjected to phase modulation using signals with an equal magnitude and opposite phases (opposite signs), a sinusoidal electrical field transmission characteristic such as the one shown in FIG. 32B is obtained. In this regard, $\phi$ denotes a difference in phase between the signals with the opposite phases, and $\phi_0$ denotes a time average difference (an amount enough to cause a difference $\pi$ in phase between the two separated paths). Optical pulses (repetition period T/2=1/fsc) are generated by carrying out phase modulation using a sinusoidal signal (repetition period T=2/fsc) with the opposite phase which cause a phase difference $\pi$ on a peak-to-peak basis. However, the time average difference $\phi_0$ and phase difference applied to the two sinusoidal signals by the DC supply 242 and the phase adjuster 243, respectively. Optical pulses generated are input to the polarization maintaining optical fiber 244 and converted into scrambled light in which each pulse is polarized orthogonally to the succeeding pulse as in the case with the first example of configuration diagram.

Figure 33:
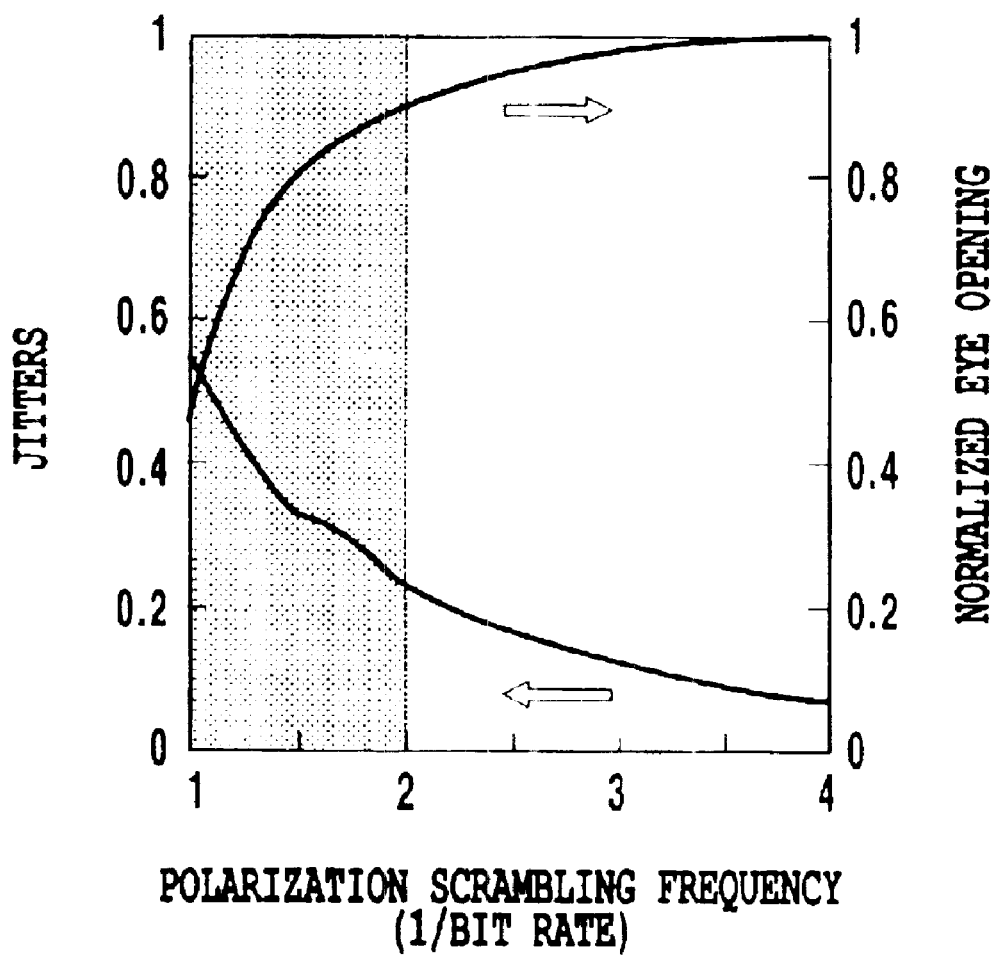
FIG. 33 is a chart showing an example of calculations for jitters and eye opening vs. polarization scrambling frequency.

An example of calculations for an eye diagram obtained if the polarization scrambler 214 according to this example of configuration is used is similar to that shown in FIG. 28. FIG. 33 shows the results of calculations for jitters (=(b−a)/b) and the normalized eye opening (=a) observed when the polarization scrambling frequency (=sinusoidal signal frequency) $f_{sc}$ is varied so that $B \leq f_{sc} < 4B$. The figure indicates that a and c are ensured to have certain large values even if the polarization scrambling frequency is lower than the double of that of the data signal bit rate clock. This in turn indicates that the data signal can be received even if the polarization scrambling frequency $f_{sc}$ is set so that $B \leq f_{sc} < 2B$.

Figure 34:
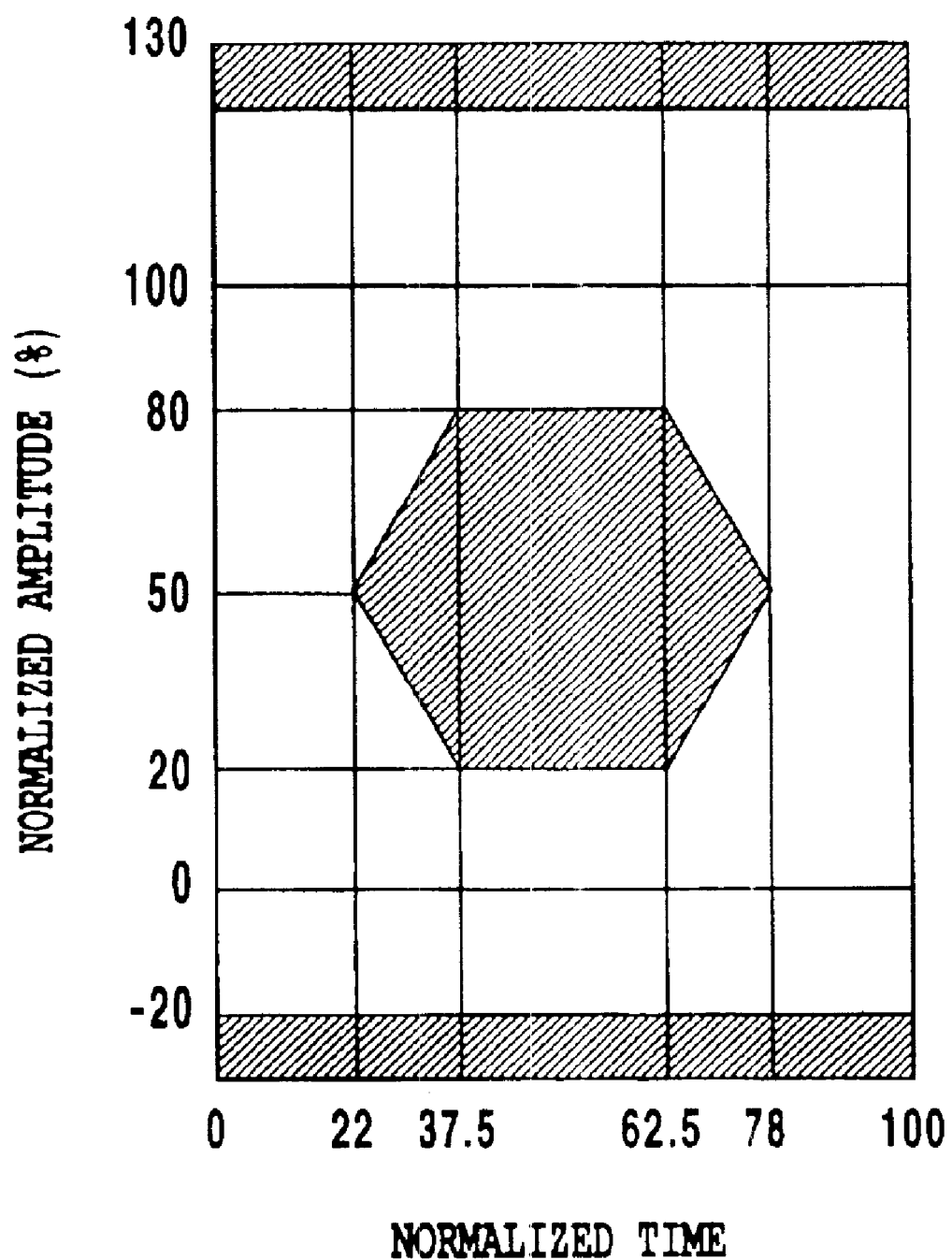
FIG. 34 is the eye mask definition described in IEEE 802.3.
Figure 35A:
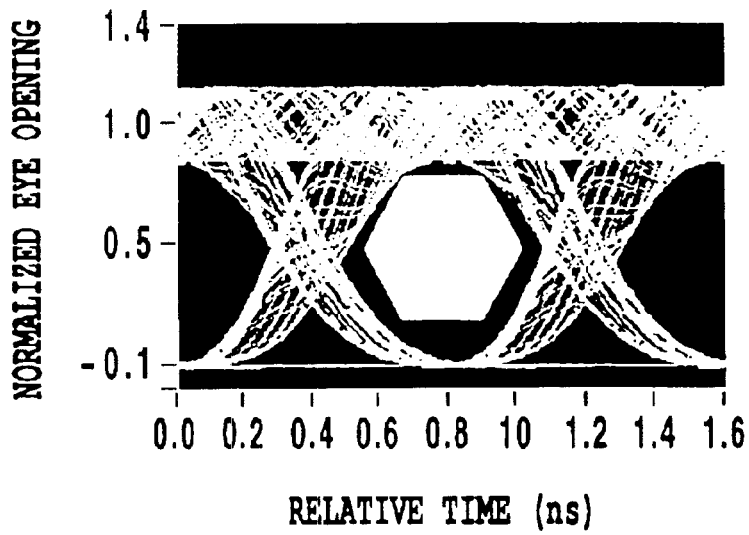
FIGS. 35A and 35B are diagrams showing the results of calculations for a send-out eye diagram.
Figure 35B:
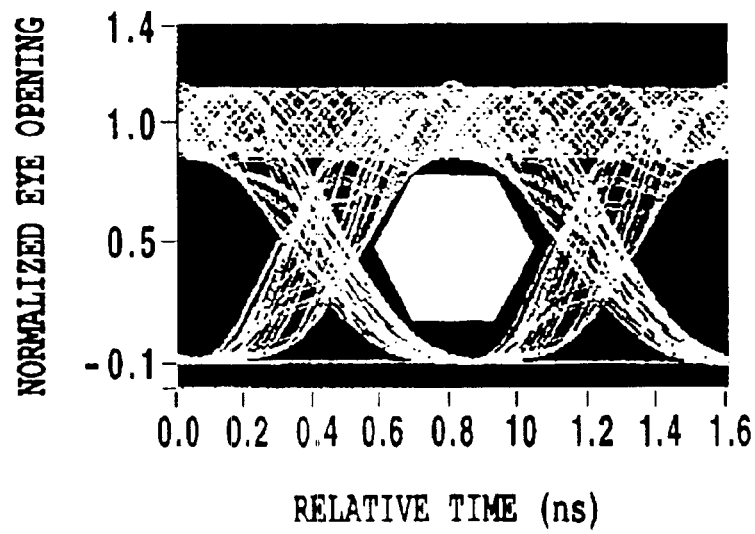

FIG. 34 shows the eye mask definition for a send-out eye diagram for 1000BASE-SX and 1000BASE-LX described in IEEE802.3. This send-out eye diaphragm is obtained by converting an optical signal into an electric signal and transmitting the electric signal through an electric low pass filter if required. FIGS. 35A and 35B show the results of calculations for send-out eye diaphragms obtained using the polarization scrambler in FIG. 1B and the polarization scrambler in FIGS. 32A and 32B (claim 3), respectively. In this case, an output from the polarization scrambler is assumed to have a zero degree of polarization. A data signal is assumed to have a bit rate B of 1.25 Gbit/s. Sinusoidal signals driving the polarization scrambler are assumed to have frequencies of 1.98 GHz (1.6 B) and 1.0525 GHz (1.7 B), respectively. It is further assumed that a received electric signal is passed through a low pass filter whose 3 dB bandwidth is seven-tenths of the bit rate of the data signal.

In this case, the frequencies of the sinusoidal signals are set unequal to values 1.6 and 1.7 times as large as that of frequency of the data signal bit rate clock, in order to simulate the asynchronous operation of these signals. The SOP of light incident on the polarization-dependent optical intensity modulator 216 is selected so that a and c, defined in the figure, are smallest. FIGS. 35A and 35B are consistent with the eye mask definition in FIG. 34. As is apparent from the figures, under the above conditions, the use of each polarization scrambler meets the eye mask definition in FIG. 34.

(Second Embodiment of Second Optical Network)

Figure 36:
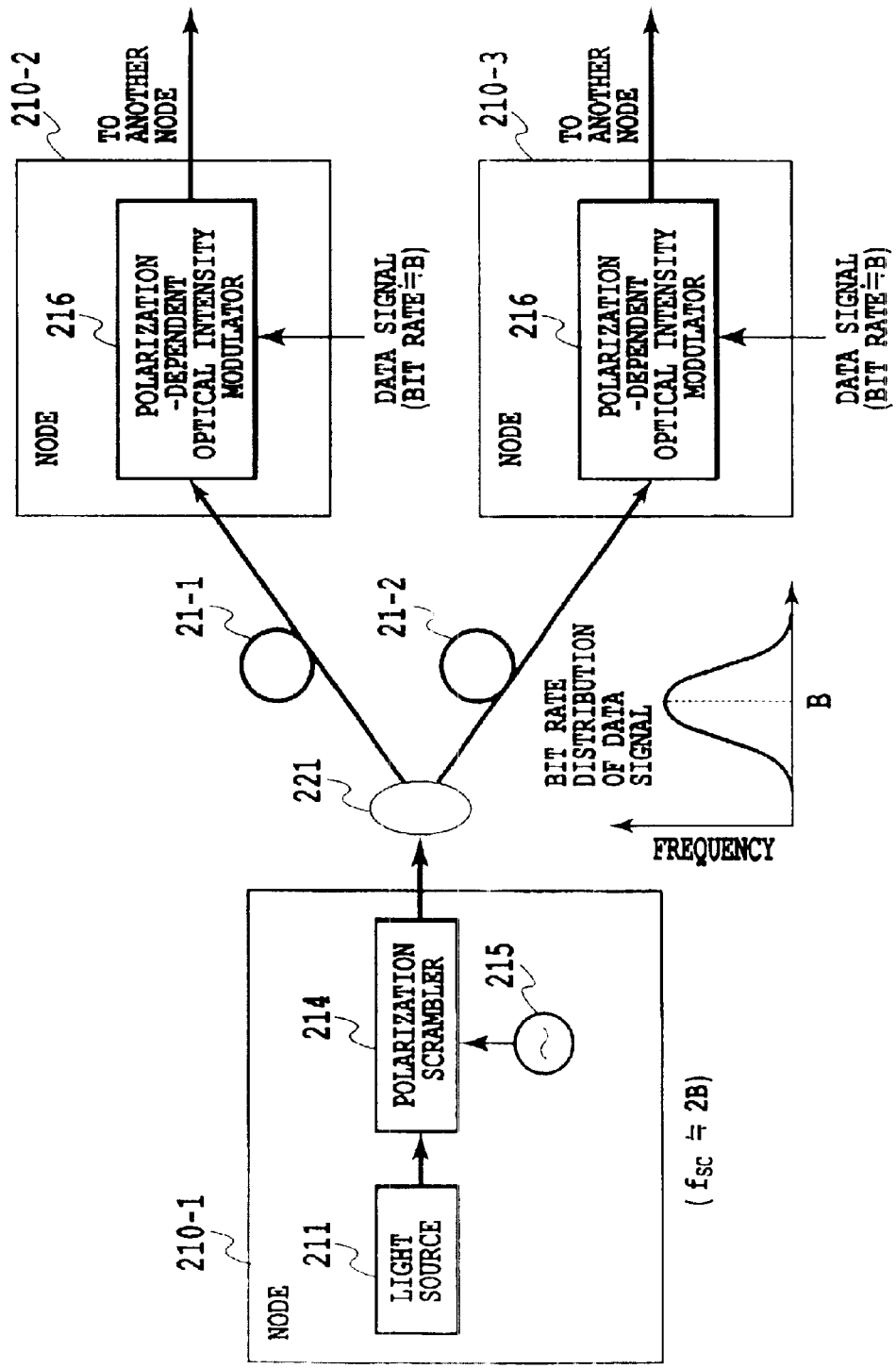
FIG. 36 is a diagram showing a second embodiment of the second optical network according to the present invention.

FIG. 36 shows a second embodiment of a second optical network according to the present invention. In this figure, the nodes 210-1 is connected to the node 210-2 and a node 210-3 via an optical splitter 221 through the optical fiber 21-1 and an optical fiber 21-2, respectively. The light source 211, the polarization scrambler 214, and the oscillator 215 are arranged at the node 210-1. The polarization-dependent optical intensity modulator 216 is arranged at both nodes 210-2 and 210-3. Scrambled light output by the node 210-1 is split and the beams obtained are supplied to the nodes 210-2 and 210-3, respectively.

In this case, data signals driving the polarization-dependent optical intensity modulators 216 at the nodes 210-2 and 210-3, respectively, have a bit rate of about B (bps). However, the data signals operate according to their own clock signals, so that their bit rates vary as in, for example, a normal distribution. In this case, setting the polarization scrambling frequency to be double that of the data signal bit rate clock means setting the polarization scrambling frequency to be sufficiently higher than the double of the maximum frequency in the distribution of the data signal bit rate. On the other hand, according to the present invention, a sufficient eye opening is obtained without setting the polarization scrambling frequency to be double that of the data signal bit rate clock. That is, in a system that supplies output light from a polarization scrambler to two or more optical intensity modulators as in the present embodiment, the present invention enables a variation in the bit rates of the data signals to be easily dealt with by setting the polarization scrambling frequency to be double that of the data bit rate clock.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical network in which a continuous wave transmitted via an optical fiber from a light source arranged at one node is input to an optical intensity modulator at the other node, the optical intensity modulator then modulating the continuous wave using an externally input data signal, the resulting modulated signal light being transmitted to a next node, said one node comprising a polarization scrambler converting the continuous wave output by the light source into scrambled light with a zero degree of polarization and then outputting the scrambled light, said polarization scrambler comprising:

an optical pulse generator that generates optical pulses with an intensity waveform repetition period T/2 and an electrical field period T in which the same intensity waveform is repeated every repetition period T/2 and in which phase is inverted every repetition period T/2; and an orthogonal polarization delay unit which receives each of said optical pulses, separates the optical pulse into two optical pulses with orthogonal states of polarization, and relatively shifts the temporal position of one of the two optical pulses from that of the other optical pulse by (2n−1)T/4 (n is a natural number) to generate light in which each pulse is polarized orthogonally to a succeeding pulse, and said other node comprising:

a polarization-dependent optical intensity modulator used as an optical intensity modulator;

clock electric signal extracting means for splitting part of power of the input scrambled light, converting this part into an electric signal, and extracting from the electric signal a clock electric signal with a frequency n times (n is an natural number) as high as that of an electric signal driving an optical pulse generator in said polarization scrambler; and phase synchronization means for synchronizing a phase of a data signal bit rate clock input by said polarization scrambler to a phase of said extracted clock electric signal and inputting the resulting signal to said polarization-dependent optical intensity modulator.

2. An optical network according to claim 1, further comprising frequency multiplying/dividing means for multiplying or dividing a frequency of said clock electric signal output by said clock electric signal extracting means and providing the resulting signal to said phase synchronizing means.

3. An optical network according to claim 2, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

4. An optical network according to claim 3, wherein a clock electric signal is extracted from at least one of said scrambled beams with the respective wavelengths and is used to modulate said scrambled beams with the respective wavelengths.

5. An optical network according to claim 1, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

6. An optical network according to claim 5, wherein a clock electric signal is extracted from at least one of said scrambled beams with the respective wavelengths and is used to modulate said scrambled beams with the respective wavelengths.

7. An optical network according to claim 1, wherein said optical pulse generator comprises a light source that generates a continuous wave and an optical intensity modulator which has an input signal $\phi(t)$ (t denotes time) and such a transmission characteristic that for a particular input signal $\phi_0$, output electrical fields are expressed by:

$$E(\phi(t)-\phi_0)=-E(-\phi(t)-\phi_0)$$

the optical intensity modulator being driven by the input signal $\phi(t)$ having such a repetition period T that:

$$\phi(t)-\phi_0=\phi(t-T)-\phi_0=-\phi(t-T/2)-\phi_0(\neq 0),$$

the optical pulse generator modulates uses said input signal $\phi(t)$ of the repetition period T to modulate said continuous wave to generate optical pulses with an intensity waveform repetition period T/2 and an electrical field repetition period T which provide electrical fields expressed by:

$$E(t)=E(\phi(t)).$$

8. An optical network according to claim 7, wherein when a data signal bit rate is defined as B, a signal input to said optical intensity modulator has a repetition period T=2/mB (m is a natural number), and a phase of a data signal bit rate clock is synchronized to a phase of the input signal to said optical intensity modulator.

9. An optical network according to claim 8, further comprising frequency multiplying/dividing means for multiplying or dividing a frequency of said clock electric signal output by said clock electric signal extracting means and providing the resulting signal to said phase synchronizing means.

10. An optical network according to claim 9, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

11. An optical network according to claim 10, wherein a clock electric signal is extracted from at least one of said scrambled beams with the respective wavelengths and is used to modulate said scrambled beams with the respective wavelengths.

12. An optical network according to claim 8, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

13. An optical network according to claim 12, wherein a clock electric signal is extracted from at least one of said scrambled beams with the respective wavelengths and is used to modulate said scrambled beams with the respective wavelengths.

14. An optical network according to claim 7, further comprising frequency multiplying/dividing means for multiplying or dividing a frequency of said clock electric signal output by said clock electric signal extracting means and providing the resulting signal to said phase synchronizing means.

15. An optical network according to claim 14, wherein said light source arranged at said one node is a WDM light source that generates continuous waves with respective wavelengths, and said polarization scrambler converts said continuous waves with the respective wavelengths together into scramble beams with a zero degree of polarization, and wherein said other node comprises means for splitting each of said scramble beams with the respective wavelengths to extract a clock electric signal for each scramble beam with a corresponding wavelength.

16. An optical network according to claim 15, wherein a clock electric signal is extracted from at least one of said scrambled beams with the respective wavelengths and is used to modulate said scrambled beams with the respective wavelengths.

17. An optical network according to claim 7, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

18. An optical network according to claim 17, wherein a clock electric signal is extracted from at least one of said scramble beams with the respective wavelengths and is used to modulate said scrambled beams with the respective wavelengths.

19. An optical network according to claim 7, wherein said optical intensity modulator has a periodic transmission characteristic for the input signal.

20. An optical network according to claim 19, wherein when a data signal bit rate is defined as B, a signal input to said optical intensity modulator has a repetition period $T=2/mB$ (m is a natural number), and a phase of a data signal bit rate clock is synchronized to a phase of the input signal to said optical intensity modulator.

21. An optical network according to claim 20, further comprising frequency multiplying/dividing means for multiplying or dividing a frequency of said clock electric signal output by said clock electric signal extracting means and providing the resulting signal to said phase synchronizing means.

22. An optical network according to claim 21, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scramble beams with the respective wavelengths to extract a clock electric signal for each scrambled beam with a corresponding wavelength.

23. An optical network according to claim 22, wherein a clock electric signal is extracted from at least one of said scrambled beams with the respective wavelengths and is used to modulate said scrambled beams with the respective wavelengths.

24. An optical network according to claim 20, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scramble beams with the respective wavelengths to extract a clock electric signal for each scrambled beam with a corresponding wavelength.

25. An optical network according to claim 24, wherein a clock electric signal is extracted from at least one of said scrambled beams with the respective wavelengths and is used to modulate said scrambled beams with the respective wavelengths.

26. An optical network according to claim 19, further comprising frequency multiplying/dividing means for multiplying or dividing a frequency of said clock electric signal output by said clock electric signal extracting means and providing the resulting signal to said phase synchronizing means.

27. An optical network according to claim 26, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scramble beams with the respective wavelengths to extract a clock electric signal for each scrambled beam with a corresponding wavelength.

28. An optical network according to claim 27, wherein a clock electric signal is extracted from at least one of said scramble beams with the respective wavelengths and is used to modulate said scrambled beams with the respective wavelengths.

29. An optical network according to claim 19, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

30. An optical network according to claim 29, wherein a clock electric signal is extracted from at least one of said scramble beams with the respective wavelengths and is used to modulate said scramble beams with the respective wavelengths.

31. An optical network according to claim 19, wherein said optical intensity modulator is a Mach Zehnder type optical intensity modulator and subjects paths into which optical power is split, to phase modulation using sinusoidal signals with opposite phases which have a time average difference $\phi_0$ and cause a phase difference $\pi$ on a peak-to-peak basis.

32. An optical network according to claim 31, further comprising frequency multiplying/dividing means for multiplying or dividing a frequency of said clock electric signal output by said clock electric signal extracting means and providing the resulting signal to said phase synchronizing means.

33. An optical network according to claim 32, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

34. An optical network according to claim 33, wherein a clock electric signal is extracted from at least one of said scrambled beams with the respective wavelengths and is used to modulate said scramble beams with the respective wavelengths.

35. An optical network according to claim 31, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

36. An optical network according to claim 35, wherein a clock electric signal is extracted from at least one of said scrambled beams with the respective wavelengths and is used to modulate said scrambled beams with the respective wavelengths.

37. An optical network according to claim 31, wherein when a data signal bit rate is defined as B, a signal input to said optical intensity modulator has a repetition period T=2/mB (m is a natural number), and a phase of a data signal bit rate clock is synchronized to a phase of the input signal to said optical intensity modulator.

38. An optical network according to claim 37, further comprising frequency multiplying/dividing means for multiplying or dividing a frequency of said clock electric signal output by said clock electric signal extracting means and providing the resulting signal to said phase synchronizing means.

39. An optical network according to claim 38, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scramble beams with the respective wavelengths to extract a clock electric signal for each scrambled beam with a corresponding wavelength.

40. An optical network according to claim 39, wherein a clock electric signal is extracted from at least one of said scramble beams with the respective wavelengths and is used to modulate said scrambled beams with the respective wavelengths.

41. An optical network according to claim 37, wherein said light source arranged at said one node is a WDM light source that generates continuous waves with respective wavelengths, and said polarization scrambler converts said continuous waves with the respective wavelengths together into scrambled beams with a zero degree of polarization, and wherein said other node comprises means for splitting each of said scrambled beams with the respective wavelengths to extract a clock electric signal for each scrambled beam with a corresponding wavelength.

42. An optical network according to claim 41, wherein a clock electric signal is extracted from at least one of said scrambled beams with the respective wavelengths and is used to modulate said scrambled beams with the respective wavelengths.

* * * * *

UNITED STATES PATENT AND TRADEMARK OFFICE
CERTIFICATE OF CORRECTION

PATENT NO.        : 6,959,152 B2  
APPLICATION NO.   : 10/370888  
DATED             : October 25, 2005  
INVENTOR(S)       : Fujiwara et al.

Page 1 of 1

It is certified that error appears in the above-identified patent and that said Letters Patent is hereby corrected as shown below:

Column 1  
Line 28, remove "using,"  
Line 29, after "consideration," insert --using--  
Line 40, remove "using,"  
Line 42, after "consideration," insert --using--

Column 2  
Line 3, change "fluctuates" to --fluctuate--

Column 3  
Lines 39-40, change "Expression (4)" to --Expressions (5) and (6)--  
Line 40, change "changes" to --change--  
Line 52, change "pulses" to --pulse--  
Line 61, change "its" to --their--

Column 5  
Line 1, change "(Local Area Network)" to --(Local Area Network))--

Column 6  
Line 35, after "scrambler" remove ","

Signed and Sealed this

Eleventh Day of September, 2007

JON W. DUDAS  
*Director of the United States Patent and Trademark Office*

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Column 1
Line 28, remove "using,"
Line 29, after "consideration," insert --using--
Line 40, remove "using,"
Line 42, after "consideration," insert --using--

Column 2
Line 3, change "fluctuates" to --fluctuate--

Column 3
Lines 39-40, change "Expression (4)" to --Expressions (5) and (6)--
Line 40, change "changes" to --change--
Line 52, change "pulses" to --pulse--
Line 61, change "its" to --their--

Column 5
Line 1, change "(Local Area Network)" to --(Local Area Network))--

Column 6
Line 35, after "scrambler" remove ","

Column 7
Line 60, change "of power" to --of the power--
Line 63, before "natural", change "an" to --a--

Column 9
Line 20, change "third" to --second--
Line 56, change "fifth" to --sixth--
Line 58, change "sixth" to --seventh--

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Column 10
Line 4, change "31" to --231--

Column 11
Line 61, change "modulator" to --modulators--
Line 62, change "polarization scrambler" to --polarization rotator--$_2$ Column 12
Lines 9-10, change "Expression (4)" to --Expressions (5) and (6)--
Line 10, change "changes" to --change--
Equation 8, change "$\phi_2 = -(0.7655\pi / 2) \sin 2f_{sc}t$" to
--$\phi_2 = -(0.7655\pi / 2) \sin 2\pi f_{sc}t$--
Line 31, change "its" to --their--
Line 65, change "(4)" to --(10)--

Column 13
Line 23, change "12" to --112--
Line 31, change "user'" to --user's--
Line 32, change "Network)" to --Network))--
Line 58, change "LiNbO3" to --LiNbO$_3$--
Line 59, change "has a" to --is--
Line 67, change "the" to --for the--

UNITED STATES PATENT AND TRADEMARK OFFICE
CERTIFICATE OF CORRECTION

PATENT NO.         : 6,959,152 B2
APPLICATION NO. : 10/370888
DATED                 : October 25, 2005
INVENTOR(S)       : Fujiwara et al.

It is certified that error appears in the above-identified patent and that said Letters Patent is hereby corrected as shown below:

Column 16
Line 30, before "a light source", remove [a light]
Line 30, after "source" insert --11--

Column 17
Line 45, after "phase difference" insert --are--

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Column 18
Lines 14-43, replace Equation (24) with the equation depicted herein below, wherein the equals signs have been removed from lines 5, 7, 8, 10, and 11 of the equation and E functions have been added after the first integral on lines 4 and 9 of the equation.

$$
\begin{aligned}
J_{xy} &= \langle Ex(t)\, Ey(t) \rangle \\
&= \lim_{T \to \infty} \frac{1}{T} \int_{T/2}^{T/2} E(\phi(t)) E(\phi(t - T/4)) dt \\
&= \frac{1}{T} \int_0^T E(\phi(t)) E(\phi(t - T/4)) dt \\
&\phantom{=}\ \frac{1}{T} \int_0^{T/4} E(\phi(t)) E(\phi(t - T/4)) dt + \\
&\phantom{=}\ \frac{1}{T} \int_{T/4}^{T/2} E(\phi(t)) E(\phi(t - T/4)) dt + \\
&\phantom{=}\ \frac{1}{T} \int_{T/2}^{3T/4} E(\phi(t)) E(\phi(t - T/4)) dt + \\
&\phantom{=}\ \frac{1}{T} \int_{3T/4}^{T} E(\phi(t)) E(\phi(t - T/4)) dt \\
&= \frac{1}{T} \int_0^{T/4} E(\phi(t)) E(\phi(t - T/4)) dt + \\
&\phantom{=}\ \frac{1}{T} \int_0^{T/4} E(\phi(t'+T/4)) E(\phi(t')) dt' + \\
&\phantom{=}\ \frac{1}{T} \int_0^{T/4} E(\phi(t''+T/2)) E(\phi(t''+T/4)) dt'' + \\
&\phantom{=}\ \frac{1}{T} \int_0^{T/4} E(\phi(t'''+3T/4)) E(\phi(t'''+T/2)) dt''' \\
&= \frac{1}{T} \int_0^{T/4} E(\phi(t)) E(\phi(t - T/4)) dt + \\
&\phantom{=}\ \frac{1}{T} \int_0^{T/4} -E(\phi(t'-T/4)) E(\phi(t')) dt' + \\
&\phantom{=}\ \frac{1}{T} \int_0^{T/4} E(\phi(t'')) E(\phi(t''-T/4)) dt'' + \\
&\phantom{=}\ \frac{1}{T} \int_0^{T/4} -E(\phi(t'''-T/4)) E(\phi(t''')) dt''' \\
&= 0
\end{aligned}
$$

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Column 19
Equation (26), change "$\phi_{PM2} = (0.7655/2)\pi \sin 2\pi(t/T)$" to
--$\phi_{PM2} = -(0.7655/2)\pi \sin 2\pi(t/T)$--
Line 49, change "then" to --than--

Column 20
Line 29, change "21" to --31--
Line 48, change "photodetector" to --photodetection--
Lines 53-54, change "reference frequency generator" to --reference signal generator--

Column 21
Line 11, after "oscillator" insert --115--
Line 16, change "121. The clock extractor 121" to --122. The clock extractor 122--

Column 22
Line 34, change "14" to --114--
Line 46, change "24" to --135--
Line 48, change "scrambler" to --rotator--

Column 24
Line 13, after "even", change "of" to --if--
Line 24, change "14" to --141--
Line 24, change "11" to --111--

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Column 25
Line 34, change "alight" to --a light--

Column 26
Line 27, change "131" to --231--
Line 28, change "111" to --211--

Column 27
Line 11, change "T/2=1/fsc" to --T/2=1/$f_{sc}$--
Line 13, change "T=2/fsc" to --T=2/$f_{sc}$--
Line 14, change "cause" to --causes--
Line 16, before "applied" insert --are--
Line 66, change "nodes" to --node--

This certificate supersedes the Certificate of Correction issued September 11, 2007.

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO.         : 6,959,152 B2
APPLICATION NO.    : 10/370888
DATED              : October 25, 2005
INVENTOR(S)        : Fujiwara et al.

It is certified that error appears in the above-identified patent and that said Letters Patent is hereby corrected as shown below:

Drawings
Sheet 14, replace Figure 11A with the Figure depicted herein below, wherein the DC supply has been labeled with --15-- and Phase Adjuster has been labeled with --16-- and the optical intensity modulator has been labeled with --14--

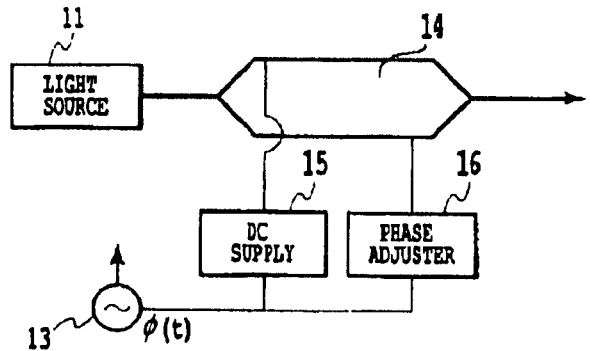

FIG.11A

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Drawings
Sheet 16, replace Figure 13C with the figure depicted herein below, wherein the legend has been changed to show a solid line for "Present Configuration"

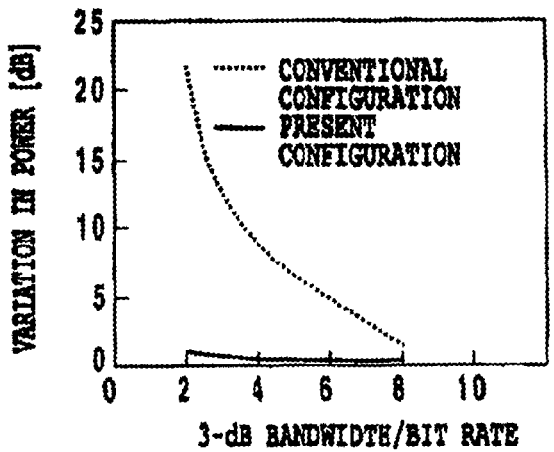

UNITED STATES PATENT AND TRADEMARK OFFICE
CERTIFICATE OF CORRECTION

PATENT NO. : 6,959,152 B2
APPLICATION NO. : 10/370888
DATED : October 25, 2005
INVENTOR(S) : Fujiwara et al.

It is certified that error appears in the above-identified patent and that said Letters Patent is hereby corrected as shown below:

Drawings
Sheet 27, replace Figure 22A with the figure depicted herein below, wherein the oscillator "15" has been relabeled --115--

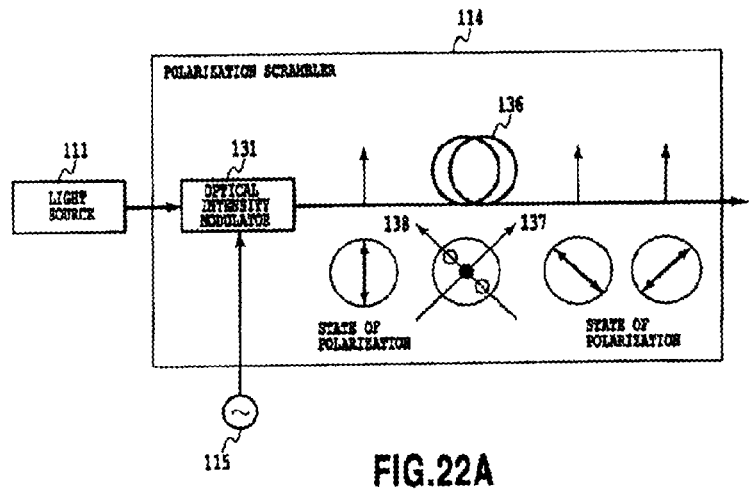

FIG.22A